(12) United States Patent
Kim

(10) Patent No.: US 9,294,614 B2
(45) Date of Patent: Mar. 22, 2016

(54) MOBILE TERMINAL AND CONTROLLING METHOD THEREOF

(75) Inventor: Jonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 14/235,399

(22) PCT Filed: Feb. 3, 2012

(86) PCT No.: PCT/KR2012/000644
§ 371 (c)(1),
(2), (4) Date: Jan. 27, 2014

(87) PCT Pub. No.: WO2013/027903
PCT Pub. Date: Feb. 28, 2013

(65) Prior Publication Data
US 2014/0162730 A1 Jun. 12, 2014

(30) Foreign Application Priority Data

Aug. 24, 2011 (KR) .................. 10-2011-0084377
Aug. 24, 2011 (KR) .................. 10-2011-0084378

(51) Int. Cl.
*H04M 1/725* (2006.01)
*G03H 1/22* (2006.01)
*H04M 1/57* (2006.01)

(52) U.S. Cl.
CPC ......... *H04M 1/72597* (2013.01); *G03H 1/2294* (2013.01); *H04M 1/576* (2013.01); *H04M 1/72547* (2013.01); *H04M 2250/54* (2013.01)

(58) Field of Classification Search
CPC .. G11B 7/0065; G11B 7/24044; G11B 7/083; G11B 7/00781; G11B 7/00772; G03H 1/02; G03H 1/0248; G03H 1/22; G03H 1/26; G03H 1/2249; G03H 1/0005; G03H 1/04; G03H 1/0891; G03H 2001/2284; G03H 2210/30; G03H 2001/0061; G03H 2001/0204; G03H 2001/186; G03H 2001/2236; G03H 2001/2242; G03H 2250/10; G03H 2001/0413; G03H 2001/0428; G03H 2001/0491; G03H 2001/2231; G03H 2001/2252; G03H 2001/2605; H04M 1/72519; H04M 19/048; H04M 1/72522; H04M 1/72597; H04M 1/22; H04M 3/42059; H04M 2250/52

See application file for complete search history.

(56) References Cited

U.S. PATENT DOCUMENTS 6,707,585 B2 * 3/2004 Tanaka .................. 359/35
8,130,606 B2 * 3/2012 Lee et al. .............. 369/47.19
(Continued)

FOREIGN PATENT DOCUMENTS

EP 2 040 133 A1 3/2009
KR 10-0800854 B1 2/2008
KR 10-2011-0045686 A 5/2011

OTHER PUBLICATIONS

Hariharan, "Optical Holography, Principles, Techniques and Applications," Cambridge University Press, XP055085933, 1991, pp. 65-69 (8 pages total).

*Primary Examiner* — Magdi Elhag
(74) *Attorney, Agent, or Firm* — Birch, Stewart, Kolasch & Birch, LLP

(57) ABSTRACT

A mobile terminal and controlling method thereof are disclosed, by which a holography user interface is provided. The present invention includes a controller, a holography storing medium configured to record an interference pattern generated by interference of light, and a holography output module, if at least one event among a plurality of trigger events occurs, outputting a holography image attributed to diffraction between the light applied to the holography storing medium and the interference pattern under the control of the controller, wherein the controller controls the holography image to be outputted in accordance with at least one holography pattern set previously.

17 Claims, 65 Drawing Sheets

(56) References Cited

U.S. PATENT DOCUMENTS

2007/0091395 A1* 4/2007 D'Amato et al. ............... 359/9
2007/0258343 A1* 11/2007 Jung et al. ................. 369/103
2009/0109176 A1* 4/2009 Fein et al. .................. 345/158
2010/0060809 A1 3/2010 Okuda et al.
2010/0097439 A1 4/2010 Kroll et al.
2010/0201532 A1 8/2010 Choi
2014/0282008 A1* 9/2014 Verard .................... G03H 1/00
715/728

* cited by examiner (a)

| Status bar | |
|---|---|
| Done | Holography |
| Default | |
| Symphony | ✓ |
| Standard holography patterns | |
| Heartbeat | |
| Sympohy | |
| Snowman | ~ 2840 |
| Custom | |
| 지그재그 | |

MOBILE TERMINAL AND CONTROLLING METHOD THEREOF

TECHNICAL FIELD

The present invention relates to a mobile terminal, and more particularly, to a mobile terminal and controlling method thereof. Although the present invention is suitable for a wide scope of applications, it is particularly suitable for providing a holography user interface.

BACKGROUND ART

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a terminal is capable of implementing a holography image, the demand for facilitating a method of manipulating a holography user interface is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a further convenient holography user interface may be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a controller, a holography storing medium configured to record an interference pattern generated by interference of light, and a holography output module, if at least one event among a plurality of trigger events occurs, outputting a holography image attributed to diffraction between the light applied to the holography storing medium and the interference pattern under the control of the controller, wherein the controller controls the holography image to be outputted in accordance with at least one holography pattern set previously.

Preferably, the at least one holography pattern may be determined by at least one of a distance difference between the holography output module and the outputted holography image and a shape of the outputted holography image and each of the distance difference and the shape of the outputted holography image may vary in accordance with time.

Preferably, the at least one holography pattern may be determined by at least one selected from the group consisting of shift, rotation, color change, size change and flickering of the outputted holography image and each of the shift, the rotation, the color change, the size change and the flicking may vary in accordance with time.

More preferably, the at least one holography pattern may apply to a preset partial region of the outputted holography image.

Preferably, the mobile terminal may further include a user input unit and a display unit. In this case, if the at least one event among a plurality of the trigger events occurs in association with an object previously designated via the user input unit, the controller may control the holography image to be outputted.

More preferably, the controller may control a visual effect to be displayed on a prescribed region of the display unit to indicate that the previously designated object is outputted as the holography image.

Preferably, a plurality of the trigger events may include a location event, a time event, an alarm event, a touch input event of a specific pattern, a reception or transmission event of a call connection signal, a reception or transmission event of a message, a preset application activating event, and a preset content activating event.

Preferably, the mobile terminal may further include a user input unit and a display unit. In this case, if a partial region of a whole region of the display unit is designated as a 1st region for a holography output via the user input unit, the controller may control the 1st region to be outputted as the holography image.

Preferably, the mobile terminal may further include a user input unit. In this case, if at least one of a plurality of contents is designated as a 1st content for a holography output via the user input unit, the controller may control the 1st content to be outputted as the holography image.

Preferably, the controller may control the at least one holography pattern to be automatically changed to correspond to a change of a preset condition.

More preferably, the mobile terminal may further include a wireless communication unit and the controller may control the at least one holography pattern to be automatically determined in accordance with a transmission complete ration variation of data and message transmitted to an external device via the wireless communication unit.

More preferably, the mobile terminal may further include a wireless communication unit and a user input unit configured to designate at least one holography pattern corresponding to each of a plurality of keywords, In this case, if at least one of a plurality of the keywords is included in message information received via the wireless communication unit or call connection attempting caller information received via the wireless communication unit, the controller may control the holography image to be outputted in accordance with the holography pattern corresponding to the included keyword.

More preferably, the controller may control the at least one holography pattern to be automatically determined in accordance with either a frequency change of sound externally outputted via an output unit or a screen brightness change.

Preferably, the mobile terminal may further include a wireless communication unit. In this case, if information on a holography pattern is received from an external device via the wireless communication unit together with a call connection signal or a message, the controller may control the holography image to be outputted in accordance with the received holography pattern.

Preferably, the mobile terminal may further include a wireless communication unit. In this case, if a call connection signal or a message is transmitted to an external device via the wireless communication unit, the controller may control information on the at least one holography pattern to be transmitted together with the call connection signal or the message.

Preferably, the mobile terminal may further include a display unit, a user input unit, and a wireless communication unit. In this case, the controller may establish data path to a plurality of external devices via the wireless communication unit, the controller may display a 1st list of a plurality of the external devices on the display unit, and if at least one external device is selected from the 1st list via the user input unit, the controller may control information on the at least one holography pattern to be transmitted to or received from the selected external device via the established data path.

In another aspect of the present invention, a method of controlling a mobile terminal includes the steps of generating at least one event from a plurality of trigger events and outputting a holography image attributed to diffraction between a light applied to a holography storing medium for recording an interference pattern generated by interference of the light and the interference pattern, wherein the holography image is outputted in accordance with at least one holography pattern set previously.

Preferably, the at least one holography pattern may be determined by at least one of a distance difference between a holography output module and the outputted holography image and a shape of the outputted holography image and each of the distance difference and the shape of the outputted holography image may vary in accordance with time.

Preferably, the method may further include the step of designating at least one of a plurality of objects via a user input unit. In this case, if the at least one event among a plurality of the trigger events occurs in association with an object previously designated, the holography image may be outputted.

Preferably, the at least one holography pattern may be automatically changed to correspond to a change of a preset condition.

Accordingly, the present invention provides the following effects and/or advantages.

First of all, the above-configured mobile terminal according to one embodiment of the present invention may be more conveniently manipulated using a holography user interface.

Secondly, according to the present invention, a user may be further facilitated to manipulate a mobile terminal by controlling a holography operation in accordance with a presence or non-presence of an occurrence of a trigger event.

Thirdly, according to the present invention, a holography image provided with a holography pattern effect may be projected.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
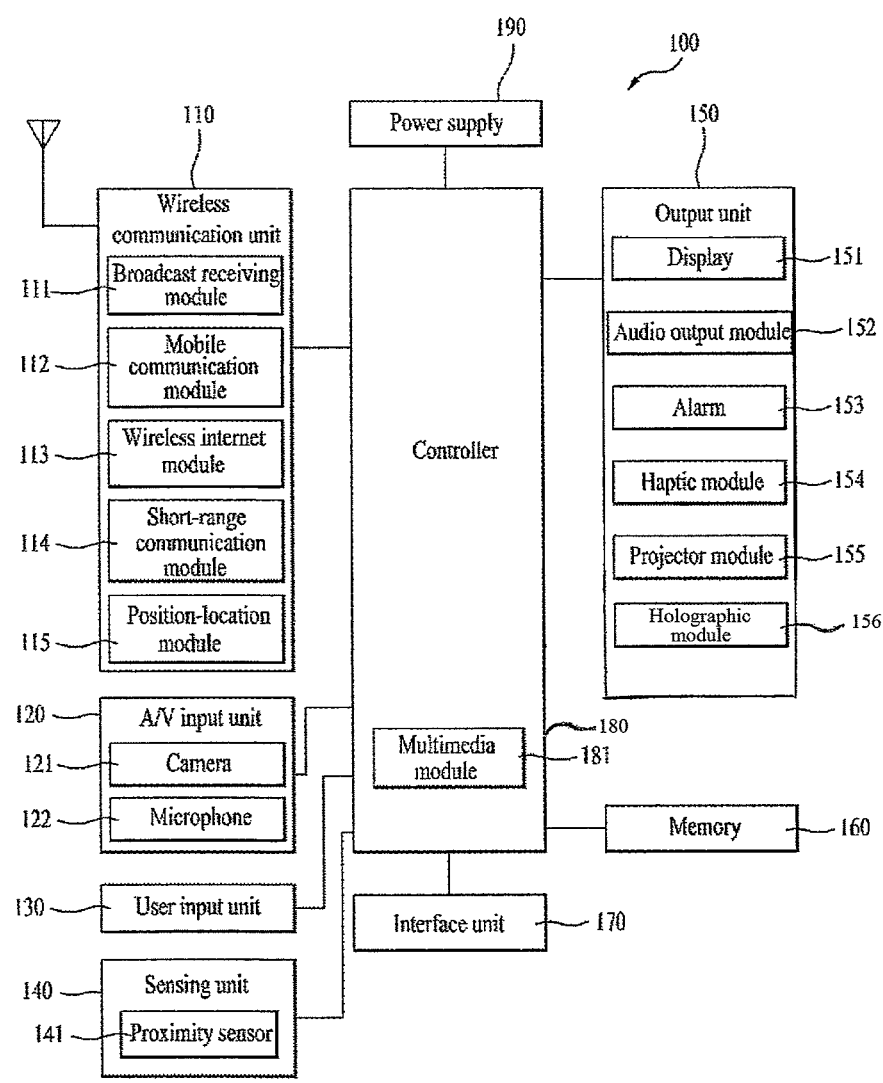
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

Therefore, the sensing unit 140 generates a sensing signal by detecting one of motions in various shapes through a location change and a direction change of the mobile terminal 100. And, at least one function can be executed to correspond to the sensing signal in accordance with each of the motions. Moreover, the relation between the motion and the function executed through the corresponding motion can be saved in the memory unit.

And, the sensing unit 140 is able to sense whether a power is supplied by the power supply unit 190, whether an external device is connected to the interface unit 170, and the like. Besides, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, a holography module 156 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, the proximity sensor 141 can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-minor device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

Subsequently, the holography module 156 may include a holography storing medium and a holography output module. And, the holography module 156 may be able to project a holography image externally.

The holography storing medium is the storing medium for recording an interference pattern generated from interference between an applied object wave and a reference wave and may be formed of such a material reacting with light intensity as photopolymer and the like.

In this case, the holography output module applies a reconstructing wave equal to the reference wave to the holography output module and then outputs a holography image generated from the diffraction effect between the applied reconstructing wave and the interference pattern recorded in the holography storing medium, under the control of the controller 180.

A holography image projecting method shall be described in detail with reference to FIGS. 4 to 7 later.

In the above description, the holography storing medium and the holography output module are implemented in a manner of being included together in the holography module 156, which is just exemplary. Alternatively, the holography storing medium and the holography output module may be separately configured and included in the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, in order to support the holography image projection of the holography module 156, information on the holography interference pattern may be saved. In particular, user's voice, application activated result and the like can be externally outputted via the holography module 156 using the information saved in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

Meanwhile, the sensing unit 140 is able to generate a sensing signal by detecting one of motions in various shapes through the location and direction changes of the mobile terminal 100. And, at least one function can be executed to correspond to the sensing signal in accordance with each of the motions. Moreover, the relation between the motion and the function executed through the corresponding motion can be saved in the memory unit 160.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
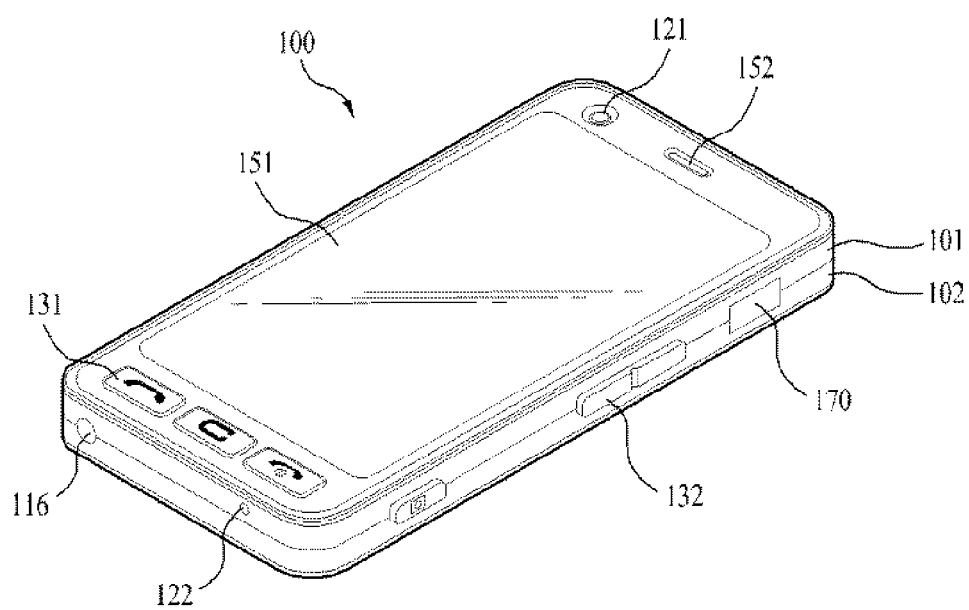
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130, a microphone 122, an interface 170 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be input to the second manipulating unit 132.

Interconnected operational mechanism between the display 151 and the touchpad 135 are explained with reference to FIG. 3 as follows.

Figure 3:
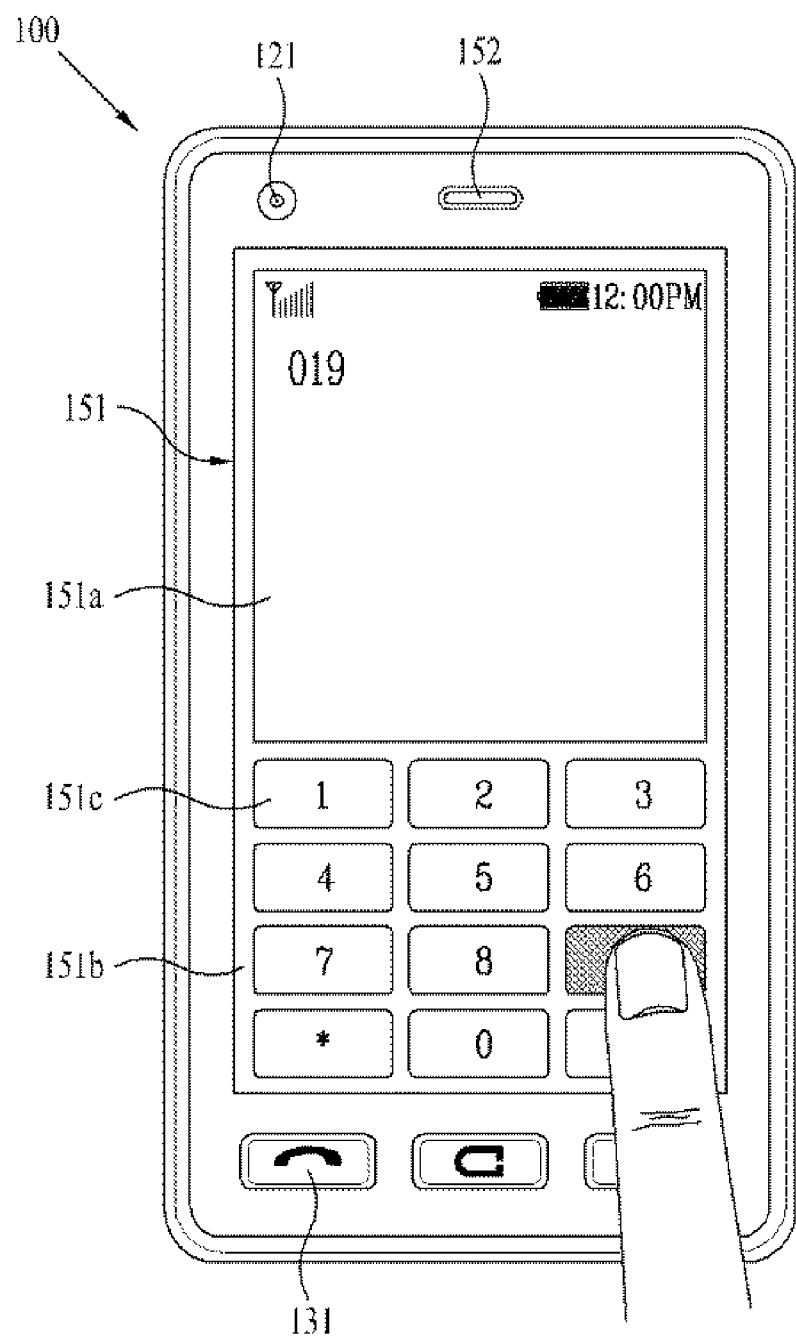
FIG. 3 is a front diagram of a mobile terminal according to one embodiment of the present invention to describe one operating status thereof.

FIG. 3 is a front-view of terminal 100 according to various embodiment of the present invention. Various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151*a* and an input window 151*b* are displayed on the display 151. A soft key 151*c* representing a digit for inputting a phone number or the like is outputted to the input window 151*b*. If the soft key 151*c* is touched, a digit corresponding to the touched soft key is output to the output window 151*a*. If the first manipulating unit 131 is manipulated, a call connection for the phone number displayed on the output window 151*a* is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

In the following description, a method of representing a holography image in a mobile terminal and a structure therefor, which are applicable to embodiments of the present invention, are explained as follows.

Prior to the detailed description of holography image, a configuration of a mobile terminal including a holography module 156 is described with reference to FIG. 4.

First of all, the holography module 156 may be installed in the mobile terminal in a manner of being loaded on a front side or backside of the mobile terminal.

FIG. 4 is a diagram of a mobile terminal including a holography module according to one embodiment of the present invention.

Figure 4A:
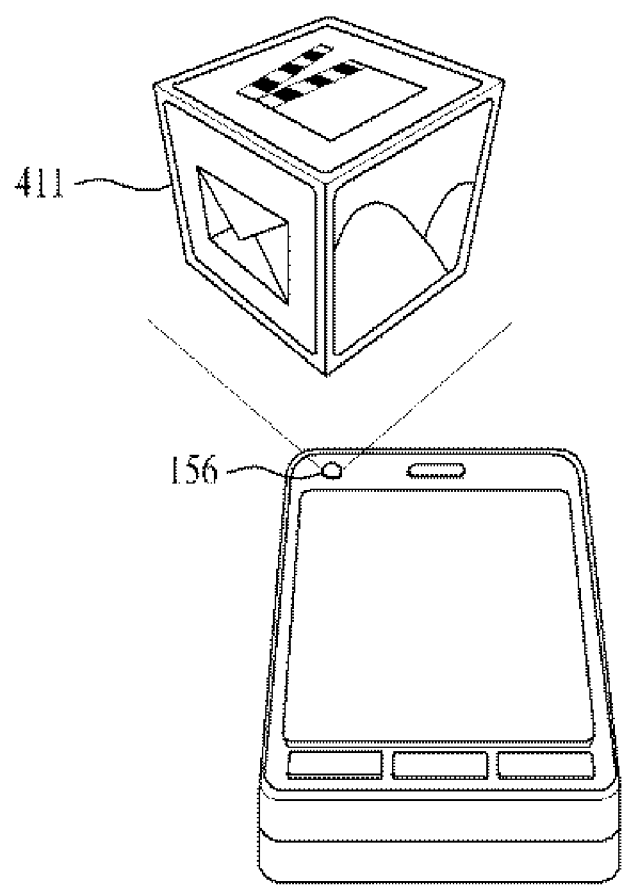
FIG. 4 is a diagram of a mobile terminal including a holography module according to one embodiment of the present invention.

Referring to FIG. 4A, the holography module 156 is provided to the front side of the mobile terminal. In particular, the holography module 156 may be provided to the front side of the mobile terminal together with the camera 121. And, the holography module 156 may be able to project and display a holography image 411 created under the control of the controller 180.

Figure 4B:
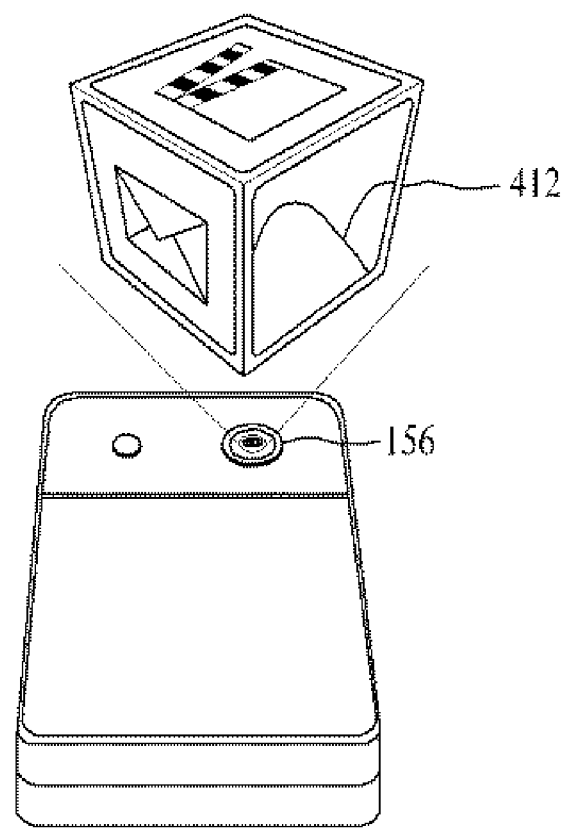

Referring to FIG. 4B, the holography module 156 may be provided to a prescribed portion of the backside of the mobile terminal. In particular, the holography module 156 may be included together with the camera 121. And, the holography module 156 may be able to project and display a holography image 412 created under the control of the controller 180.

The holography images implemented through the holography module 156 may include a planar image and a stereoscopic image both.

In particular, the stereoscopic image implemented through the holography module 156 may be mainly classified into a 2D (2-dimensional) stereoscopic image and a 3D (3-dimensional) stereoscopic image.

Substantially, a 2D stereoscopic image system is a monoscopic system that provides the same image to both eyes. In particular, according to the 2D stereoscopic image system, a polyhedron created using at least one point, at least one line, at least one plane and a combination thereof is placed in a virtual stereoscopic space and an image generated from viewing the placed polyhedron in a specific view is then displayed, under the control of the controller 180.

A 3D stereoscopic image system is a stereoscopic system that provides different images to both eyes, respectively. And, the 3D stereoscopic image system adopts the principle of sensing a 3D effect of an object viewed via bare eyes of a human. In particular, human eyes sense different planar images in viewing the same object due to a distance between both eyes. The sensed different planar images are delivered to a brain through retinas. And, the brain synthesizes the delivered different images together to sense depth and reality of the corresponding stereoscopic image. Although there is a slight difference between humans, binocular disparity attributed to a distance between both eyes enables a 3D effect. Thus, the 3D stereoscopic image system may correspond to a method of displaying an image using this binocular disparity.

Holography image created through the holography module 156 may include both of the planar image and the stereoscopic image. For clarity and convenience of the following description, assume that the holography image may be displayed by the 2D stereoscopic image system, by which the present invention may be non-limited.

In the following description, a method of representing a holography image in a mobile terminal and a structure therefor, which are applicable to embodiments of the present invention, are explained in detail as follows.

First of all, a holography image representing method may be understood as an image displaying method of simultaneously cumulating and playing all information (i.e., amplitude and phase) on a light (i.e., wave motion), whereas a related art image is a recording of distribution of bright and dark sides of an object.

A holography image representing method is described with reference to FIG. 5 as follows.

Figure 5:
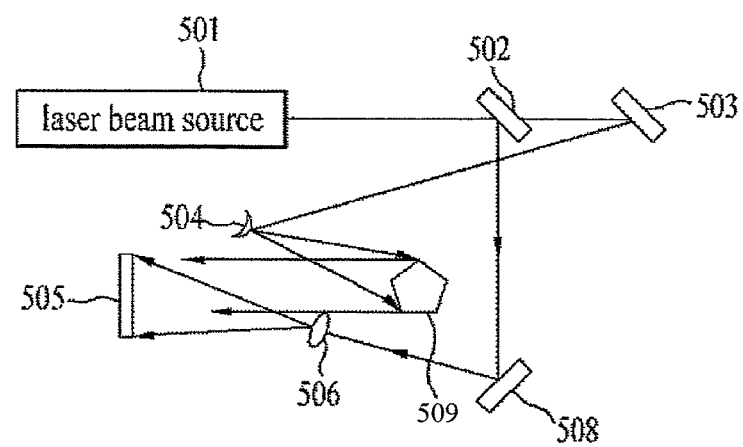
FIG. 5 is a diagram for explaining holography principle conceptionally.
Figure 5:
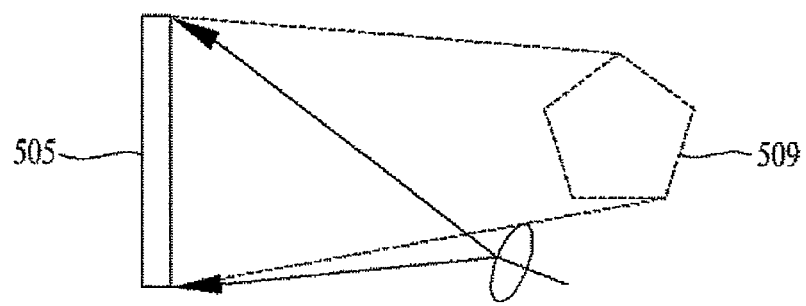

FIG. 5 is a diagram for explaining holography principle conceptionally.

Referring to FIG. 5 (a), a coherent light from a laser beam source 501 is slit into two beams via a splitter 502.

In particular, if one of the two beams is applied to a subject 509, a surface of the subject 509 reflects the corresponding light. And, this beam will be named an object wave in the following description.

The other beam is diffused through a lens 506 to be directly applied to a front face of a holography photosensitive material 505. And, this beam will be named a reference wave in the following description.

As the object wave and the reference wave cause an interference effect in-between, about 500~1,500 delicate and complicated interference patterns per 1 mm are generated. And, a photo of recording these interference patterns is called a hologram. Reflectors 503, 504 and 508 are also shown.

Referring to FIG. 5 (b), if such a beam as the generated reference wave is projected on the photosensitive material 505, a light diffracts at a position different from an incident direction of the reference wave in a manner of being affected by the interference patterns. Subsequently, the diffractive lights gather together to form the light initially reflected by the object. Hence, a holography image 509 is projected. In particular, an initial object wave is reconstructed from hologram. And, an image representing method using the reconstructed initial object wave may be named a holography image representing method.

Looking into an inside of a reconstructed wave surface, an object is initially seen as if situated inside. If a viewing point moves, a viewed position of the object changes correspondingly. Moreover, since an original wave surface of the object is reconstructed, it may interfere with a wave surface coming from a slightly modified object.

A holography image representing method may be classified into a transmittive type holography image representing system and a reflective type holography image display system.

(1) Transmittive Type Holography Image Representing System

According to the transmittive type holography image representing system, an image generated from light, which transmits a hologram if applied in rear of the hologram, is observed in front of the hologram. In the transmittive type holography image representing system, an object wave and a reference wave are applied to a photo film in the same direction to generate a holography image. And, the generated holography image is characterized in having clear and bright colors.

(2) Reflective Type Holography Image Displaying System

According to the reflective type holography image displaying system, an image generated from light, which is reflected if applied in front of the hologram, is observed in front of the hologram. In the reflective type holography image displaying system, an object wave and a reference wave are incident on a photosensitive material in directions opposite to each other, respectively. And, the holography image generated by the reflective type holography image displaying system is characterized in having an excellent 3D effect.

The transmittive type holography image representing system and the reflective type holography image displaying system are described in detail with reference to FIG. 6 and FIG. 7 as follows.

FIG. 6 is a diagram for conceptionally explaining a transmittive type holography system.

Figure 6A:
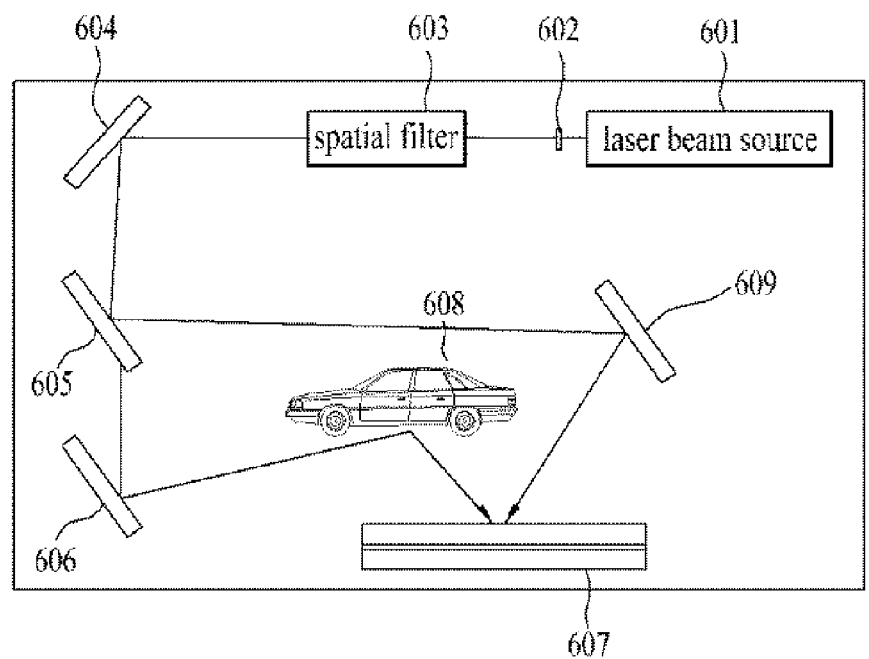
FIG. 6 is a diagram for conceptionally explaining a transmittive type holography system.

Referring to FIG. 6A, a light from a laser beam source 601 passes through a lens 602 and a spatial filter 603 and is then spread as a smooth spherical wave. The spherical wave is split into two beams by a 50:50 beam splitter 605. One of the two beams of the spherical wave illuminates an object 608 to produce an object wave, while the other intactly illuminates a film 607 to produce a reference wave. In doing so, the object wave created from the object 608 illuminates the film 607 as well. Reflectors 604, 606 and 609 are also shown.

Subsequently, the object and reference waves having illuminated the film 607 cause an interference effect on each other to produce an interference pattern. The interference pattern is then imprinted on the film 607.

Figure 6B:
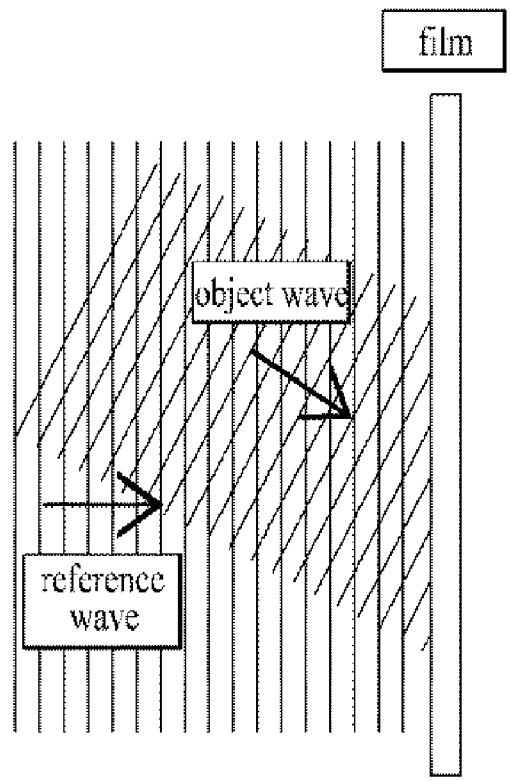

In particular, referring to FIG. 6B, the object wave and the reference wave are projected on the same surface of the film 607 to produce the interference pattern.

Figure 6C:
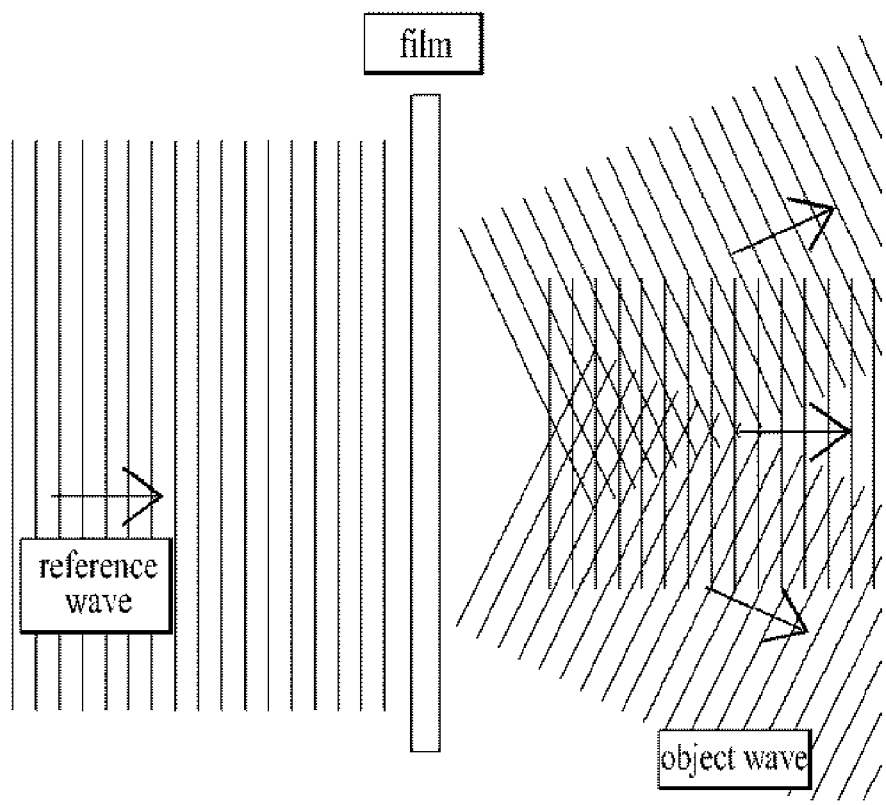

Subsequently, referring to FIG. 6C, if the reference wave is projected on the film 607, an object wave transmits in a direction of a surface opposite to the incident surface of the previous object and reference waves, thereby creating a holography image.

Figure 7A:
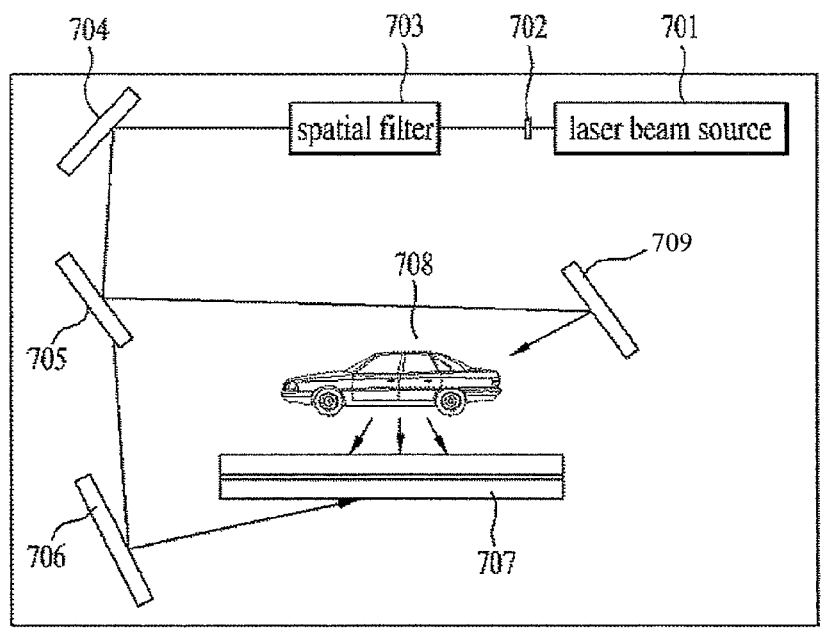
FIG. 7 is a diagram for conceptionally explaining a reflective type holography system.
Figure 7B:
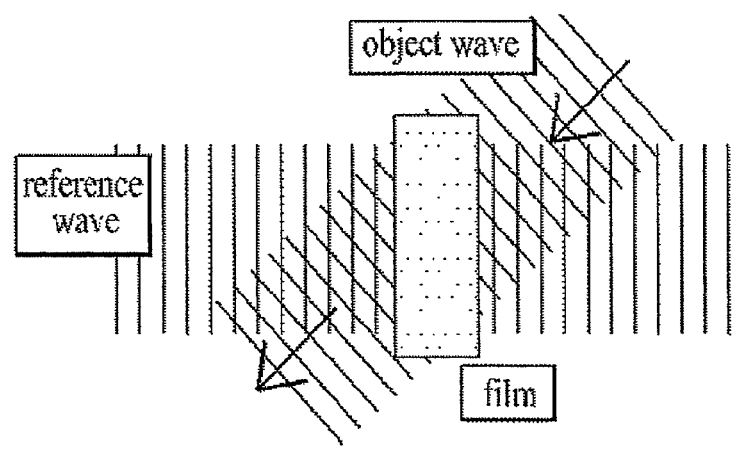
Figure 7C:
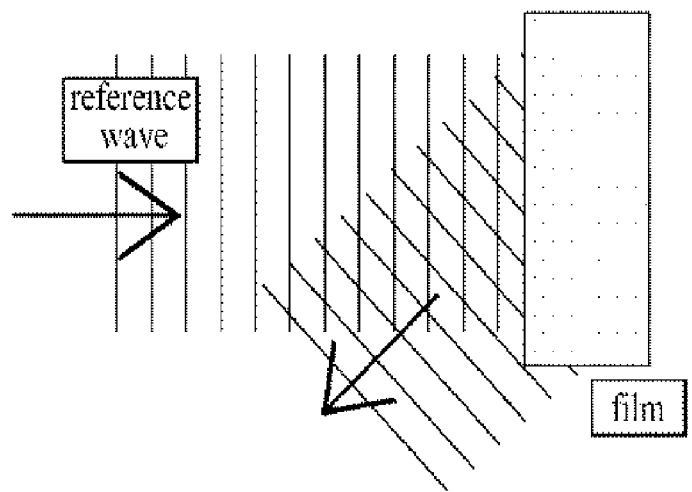

FIG. 7 is a diagram for conceptionally explaining a reflective type holography system.

Referring to FIG. 7A, like FIG. 6A, a light from a laser beam source 701 passes through a spatial filter 703 and is then spread as a smooth spherical wave. The spherical wave is split into two beams by a 50:50 beam splitter 705. One of the two beams of the spherical wave illuminates an object 708 to produce an object wave, while the other intactly illuminates a film 707 to produce a reference wave.

Unlike FIG. 6A, FIG. 7A shows that the reference wave and the object wave illuminate the film 707 in directions opposite to each other, respectively.

In particular, the reference wave is projected on a left surface of the film 707 and the object wave is projected on a right top surface of the film 707. Subsequently, referring to FIG. 7C, if the reference wave is projected on the film, the object wave transmits the film in opposite direction to create a holography image.

In the above descriptions, each of the films 607 and 707 is represented as a holography storing medium and another component capable of creating a holography image by emitting a light to the film is represented as a holography output module in this specification.

As mentioned in the foregoing description, for clarity and convenience of the description of this specification, the holography storing medium and the holography output module are implemented in a manner of being included in the holography module 156, which is just exemplary. Alternatively, the holography storing medium and the holography output module may be included as separate components in the mobile terminal 100.

For clarity and convenience, assume that a mobile terminal mentioned in the following description includes at least one of the components shown in FIG. 1 and that a display unit 151 includes a touchscreen.

Generally, a graphic of an arrow or finger type to point out a specific object or select a menu on the display unit 151 is called a pointer or a cursor.

Specifically, the pointer may be frequently regarded as a finger or a stylus pen for a touch manipulation or the like.

In this specification, in order to clearly discriminate the pointer and the cursor from each other, a graphic displayed on the display unit 151 may be named a cursor, while such a physical means for performing a touch, a proximity touch, a gesture and the like as a finger, a stylus pen and the like may be named a pointer.

As mentioned in the foregoing description, a holography image may include a planar image and a stereoscopic image both. For clarity and convenience of the following description, assume that a holography image is displayed by 2D stereoscopic image system.

Regarding a holography image representing method, the present invention provides a method of setting a holography pattern and representing a holography image in accordance with the set holography pattern.

Prior to the detailed description of a holography pattern, a method of triggering a projection of a holography image is explained as follows.

First of all, it may be able to control a holography image to be displayed in accordance with a user's menu selection in general.

And, a holography image may be displayed only if a prescribed trigger event occurs. In this case, the prescribed trigger may become a target of holography pattern assignment basically provided by a terminal as well as a holography pattern previously set by a user.

A trigger event used for a terminal to display a holography image may be mainly classified into a user-designated event and a system event.

First of all, a user-designated event may mean an event previously set by a user for convenience in utilizing a holography image.

For instance, if a specific event (e.g., an event that a terminal is shifted to a pre-designated location, an event that a pre-designated time is up, an event of reception/transmission of call and/or message, an event of a touch input of a specific pattern, etc.) is activated or a previously set content among a plurality of contents is activated, it may be able to display a holography image without separate manipulation.

In particular, after a user has set up a condition for activating a holography image in a manner of discriminating an environment of utilizing a holography image frequently from an environment not suitable for displaying a holography image, if the condition is met, the holography image may be instantly displayed for user/s convenience.

Secondly, a system event may mean an event related to whether a terminal is in mode of displaying a holography image.

For instance, a holography image may be displayed only if a battery level of a terminal is equal to or higher than a predetermined level, a terminal is still charging, ambient brightness of a terminal is equal or lower than a predetermined level, or the holography image is projected via a holography module in accordance with a type of a terminal.

In particular, in order to prevent power consumed for displaying a holography image to provide another function (e.g., call reception, message reception, internet access, etc.) of a terminal or prevent power from being wasted in displaying a holography image unnecessarily despite an environment in which a user is unable to recognize the holography image, the holography image may be displayed only if a prescribed system event is satisfied.

Yet, the above-mentioned detailed examples of the user-designated event and the system event are just exemplary, by which the present invention may be non-limited.

Particularly, the user-designated event may include any event previously settable for user's convenience in utilizing a holography image. And, the system event may include any event related to whether a terminal is able to display a holography image.

Moreover, details of the user-designated event and the system event may be modified by a user. In particular, through a separate event setting or modifying menu, an event related to a trigger condition may be deleted, added or modified.

Therefore, through the trigger condition, a user is facilitated to display a holography image in an environment having the holography image utilized frequently therein and prevent power from being wasted in displaying the holography image unnecessarily.

FIG. 8 is a diagram for one example of triggering a holography operation based on a location event among user-designated events according to one embodiment of the present invention.

Figure 8A:
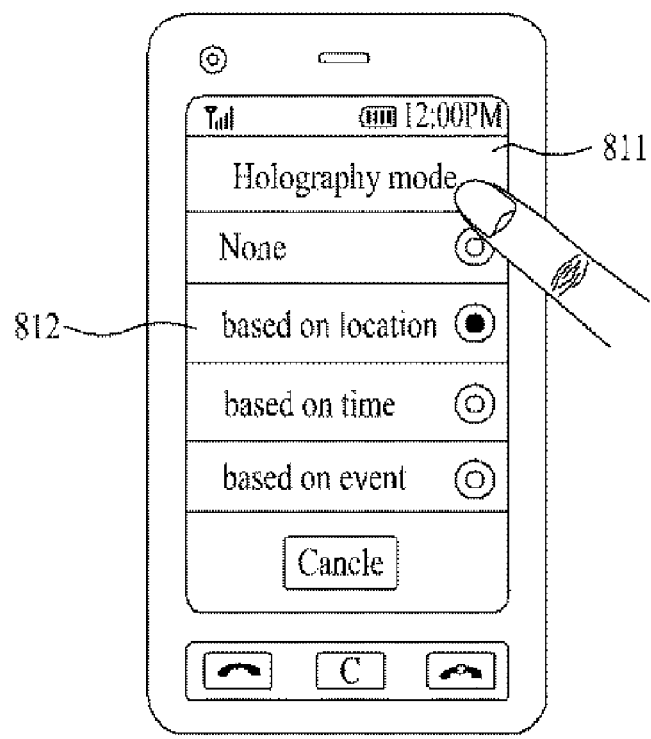
FIG. 8 is a diagram for one example of triggering a holography operation based on a location event among user-designated events according to one embodiment of the present invention.

Referring to FIG. 8A, a user activates a holography mode 811 and is then able to set a holography image to be displayed based on a location event 812 among user-designated events.

Figure 8B:
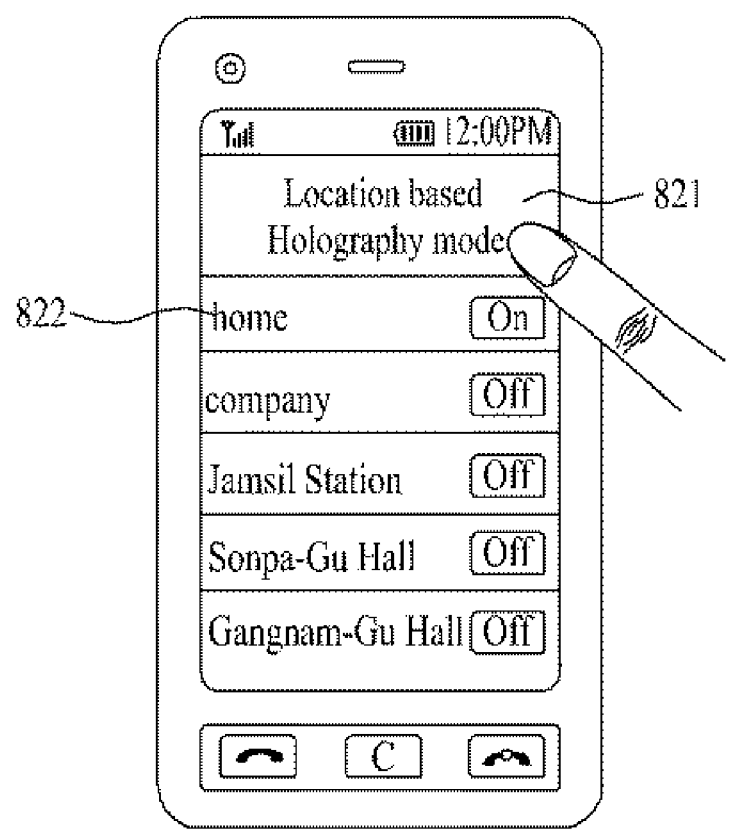
Figure 8C:
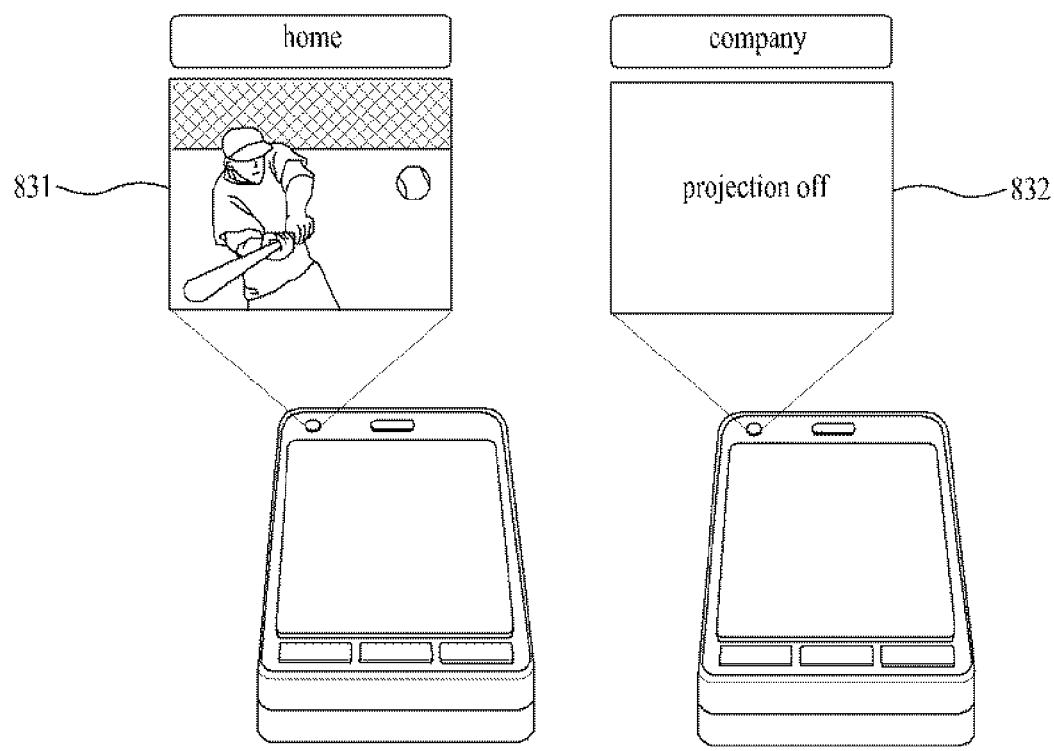

Referring to FIG. 8B, a location 822 for displaying a holography image may be designated in a location based holography mode 821. In FIG. 8B, home, company, Jamsil Station, Sonpa-Gu Hall and Gangnam-Gu Hall are shown as examples of locations to be designated. Optionally, a user may be able to add various locations through a map search application or the like. In doing so, a user sets 'On' for the home only and may set 'Off' for others (i.e., company, Jamsil Station, Sonpa-Gu Hall and Gangnam-Gu Hall).

Thereafter, a holography image may (or may not) be projected in accordance with a location of a terminal. In particular, referring to FIG. 8C, if a location of a terminal is home, a prescribed holography image 831 may be displayed. If a location of a terminal is company, a holography image 832 is not projected.

A method of triggering a holography operation based on a time event is described with reference to FIG. 9 as follows.

FIG. 9 is a diagram for one example of triggering a holography operation based on a time event among user-designated events according to one embodiment of the present invention.

Figure 9A:
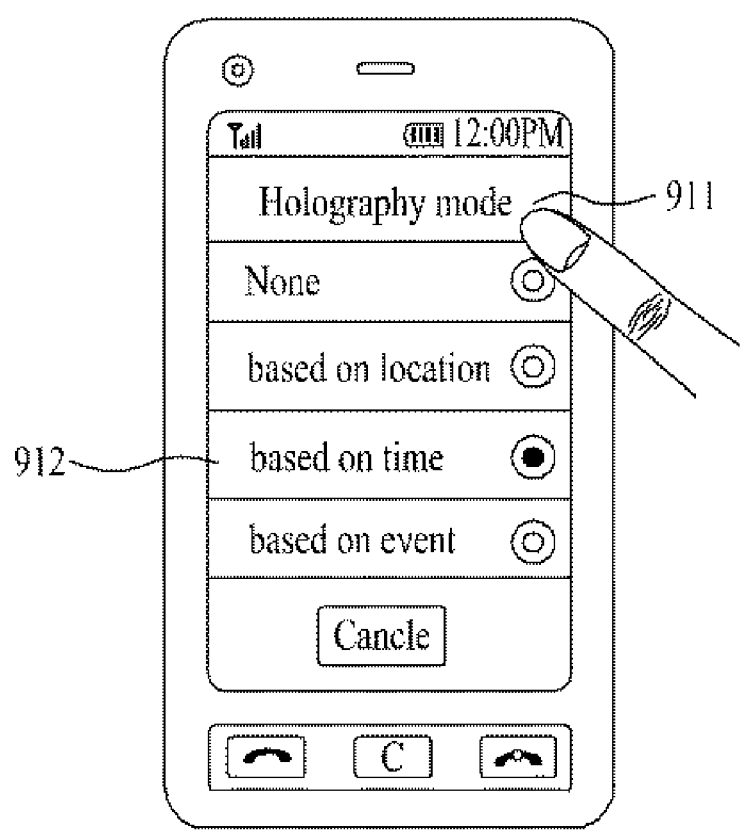
FIG. 9 is a diagram for one example of triggering a holography operation based on a time event among user-designated events according to one embodiment of the present invention.

Referring to FIG. 9A, a user activates a holography mode 911 and is then able to set a holography image to be displayed based on a time event 912 among user-designated events.

Figure 9B:
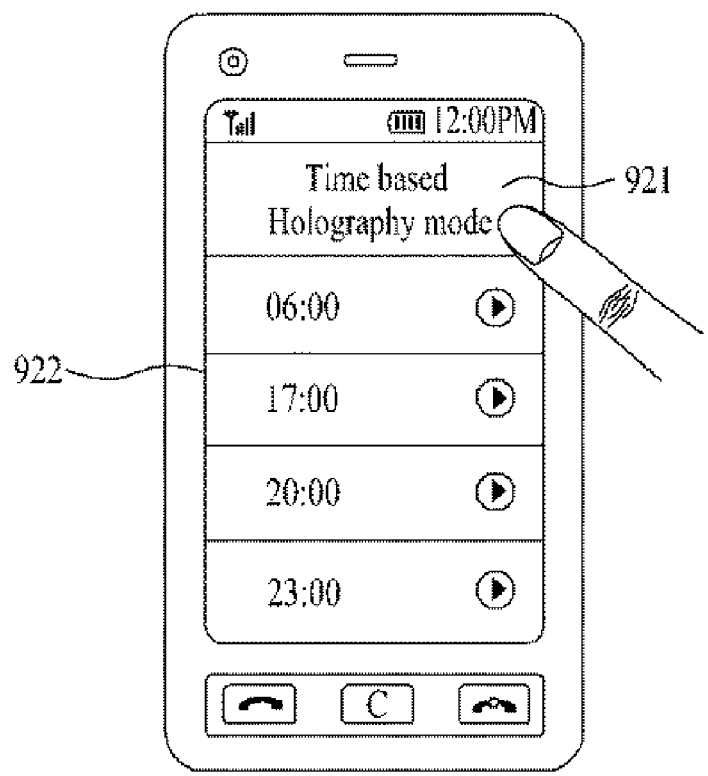

Referring to FIG. 9B, a time 922 for displaying a holography image may be designated in a time based holography mode 921. FIG. 9B exemplarily shows that a time may be set to 06:00, 17:00, 20:00 and 23:00. Alternatively, a time may be set to such a unit as a time range (e.g., 09:00.about.12:00), a time zone (e.g., morning, noon, evening, night, dawn, etc.), a weekday (e.g., Monday, Tuesday, Wednesday, etc.), a month (e.g., January, February, March, etc.), a season (e.g., Spring, Summer, Fall, and Winter) and the like as well as a specific time.

In doing so, a user may be able to set a holography image to be displayed at 06:00, 17:00, 20:00 and 23:00.

Thereafter, a holography image may (or may not) be projected. In particular, the holography image will be displayed at the designated time (i.e., 06:00, 17:00, 20:00 and 23:00) and may not be displayed for the rest of time.

Meanwhile, a holography image according to one embodiment of the present invention may be displayed in accordance with a set holography pattern.

In this case, the holography pattern means that a holography image projected via the holography module 156 is changed into a preset pattern in accordance with a time so as to be provided to a user.

The holography pattern may be set in various ways as follows.

First of all, it may be able to set a holography pattern in a manner of varying a distance difference between a holography output module and a holography image in accordance with time.

In particular, as the distance difference between the holography output module 156 and the holography image is changed in accordance with time, the holography image projected via the holography module 156 may be shifted upward and downward, thereby enabling a setting of a prescribed holography pattern.

It may be able to set a holography pattern in a manner of varying a shape of a holography image projected by the holography module 156.

For instance, the controller 180 controls a holography image projected by the holography module 156 to have a circular shape in the first time and then controls the shape of the holography image to be changed into a rectangular shape. Thus, as the shape of the holography image is changed into various forms in accordance with time, a setting of the holography pattern is enabled.

It may be able to apply a method of shifting or rotating a holography image projected by the holography module 156 in right or left direction.

In particular, while a distance difference between a holography module and a holography image is constantly maintained, it may be able to set a holography pattern in a manner of moving or rotating the projected holography image in right and left directions in accordance with time or rotating the projected holography image by moving it in right and left directions.

It may be able to set a holography pattern in a manner of modifying a color or size of a projected holography image in accordance with time or controlling a holography image to flicker. And, it may be able to set a holography pattern in a manner of controlling at least one of projection brightness, play frequency, illumination, vibration feedback, sound insertion, image insertion, repetitive projection and the like.

Although the above description is based on the assumption that a holography pattern is set by an individual factor, it may be able to set a holography pattern by a plurality of factors.

For instance, it may be able to set a holography pattern in a manner of moving an rotating a projected holography image in left and right directions by changing a distance difference between the holography module 156 and a holography image in accordance with time.

The above description is made on the assumption that a holography pattern is set for a whole holography image, which is just exemplary. Optionally, it may be able to apply a holography pattern to a prescribed portion of the holography image.

In the following description, a holography pattern set for a holography image is explained in detail with reference to FIGS. 10 to 12.

First of all, a holography pattern may be set in a manner of adjusting a distance difference between a holography image and a terminal.

In particular, a holography pattern may be controlled to display a pattern of moving a projected holography image upward and downward by increasing or decreasing a distance difference between a holography image and a terminal in accordance with time.

This is described with reference to FIG. 10 as follows.

FIG. 10 is a diagram for one example of setting a holography pattern by adjusting a distance difference between a holography image and a terminal according to one embodiment of the present invention.

Figure 10A:
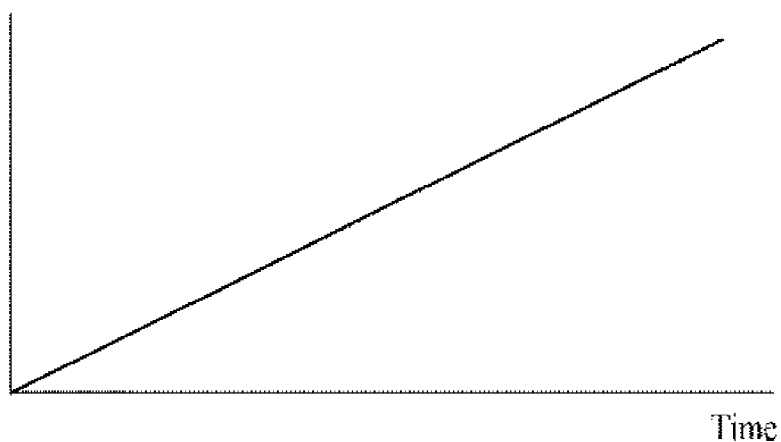
FIG. 10 is a diagram for one example of setting a holography pattern by adjusting a distance difference between a holography image and a terminal according to one embodiment of the present invention.

Referring to FIG. 10A, a distance difference between a holography image and a terminal is set to increase in proportion to time.

Figure 10B:
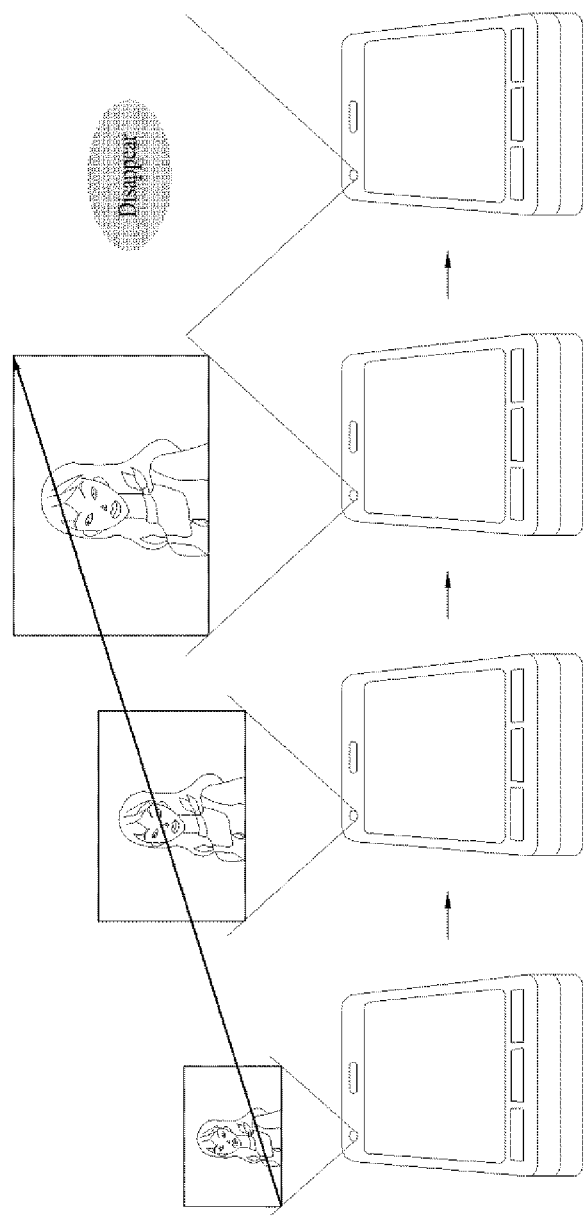

Referring to FIG. 10B, a holography image projected from a terminal moves upward by getting distant from the terminal as time goes by. If the total time set in FIG. 10A expires, the projected holography image disappears.

Hence, by adjusting a distance difference between a holography image and a terminal, it may be able to form a pattern of moving a projected holography image upward and downward.

It may be able to control a holography pattern to be set by changing a projected shape of a holography image.

In particular, by moving an image projected by the holography module 156 in right and left directions, rotating the projected image, or changing a size of the projected image, it may be able to change a shape of a projected holography image.

In the above description, a holography pattern is formed by moving or rotating an image, which is exemplary. Alternatively, it may be able to form a holography pattern in a manner of changing a displayed shape by maintaining a same distance difference between a terminal and a projected holography image.

This is described with reference to FIG. 11 as follows.

FIG. 11 is a diagram for one example of setting a holography pattern by modifying a holography projected shape according to one embodiment of the present invention.

Figure 11A:
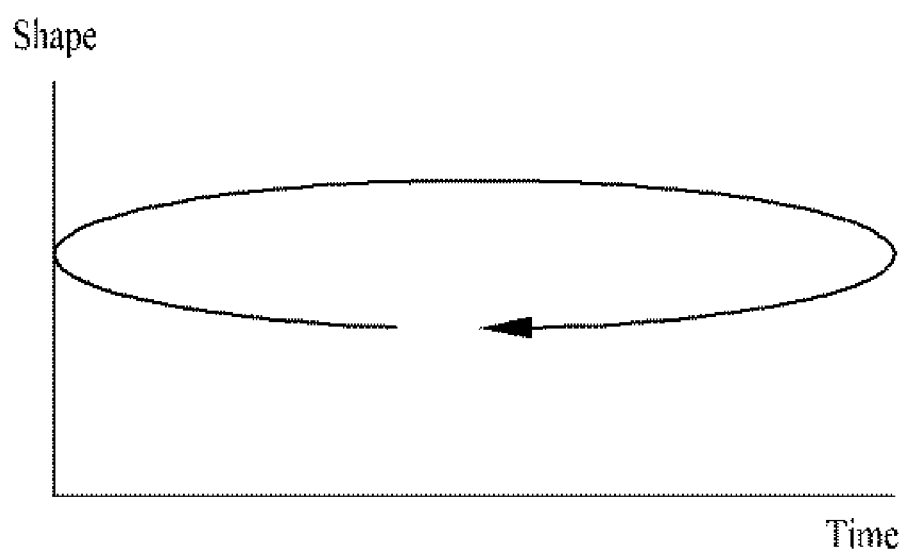
FIG. 11 is a diagram for one example of setting a holography pattern by modifying a holography projected shape according to one embodiment of the present invention.

Referring to FIG. 11A, a projected holography image is set to rotate by maintaining the same distance from a terminal.

Figure 11B:
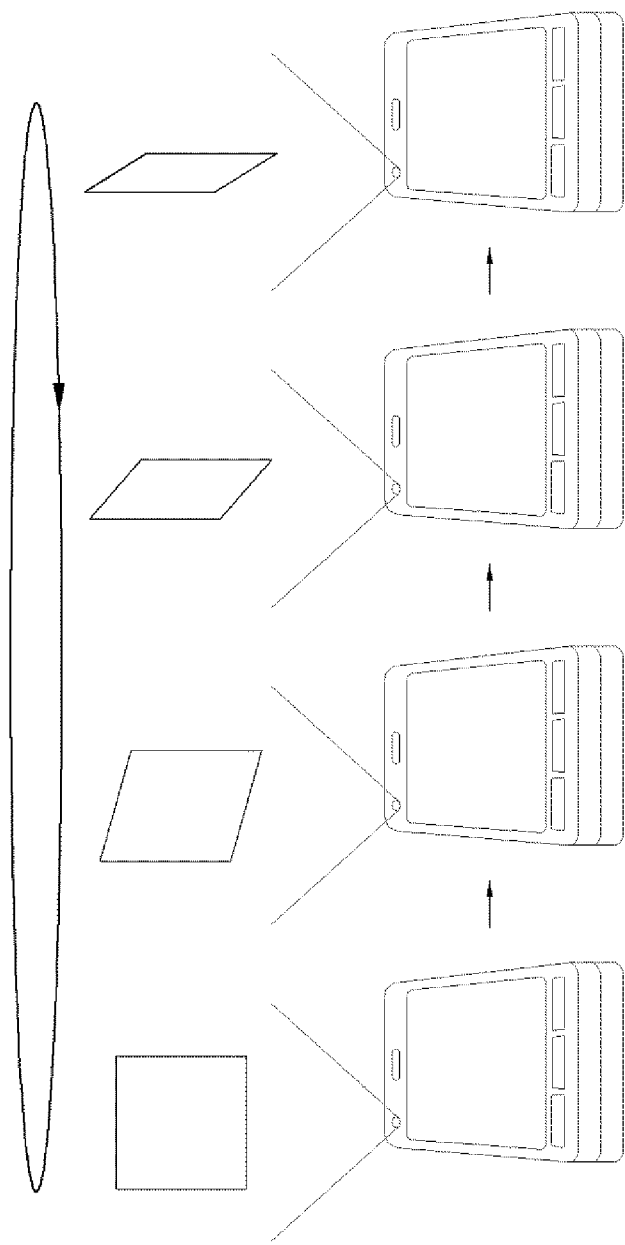

Accordingly, referring to FIG. 11B, the image projected from the terminal rotates in accordance with elapse of time by maintaining the same distance difference from the terminal.

Moreover, it may be able to set a holography pattern by changing a distance difference between a holography image and a terminal and a shape of a projected holography image together.

In particular, it may be able various kinds of holography patterns by changing a distance difference between a holography image and a terminal in accordance with time and also changing a shape of the holography image.

This is described with reference to FIG. 12 as follows.

FIG. 12 is a diagram for one example of setting a holography pattern by adjusting a distance difference and a holography projected shape according to one embodiment of the present invention.

Figure 12A:
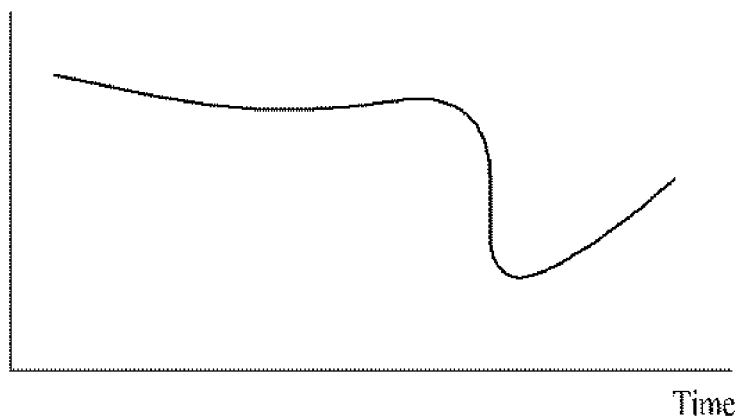
FIG. 12 is a diagram for one example of setting a holography pattern by adjusting a distance difference and a holography projected shape according to one embodiment of the present invention.
Figure 12A:
Figure 12A:
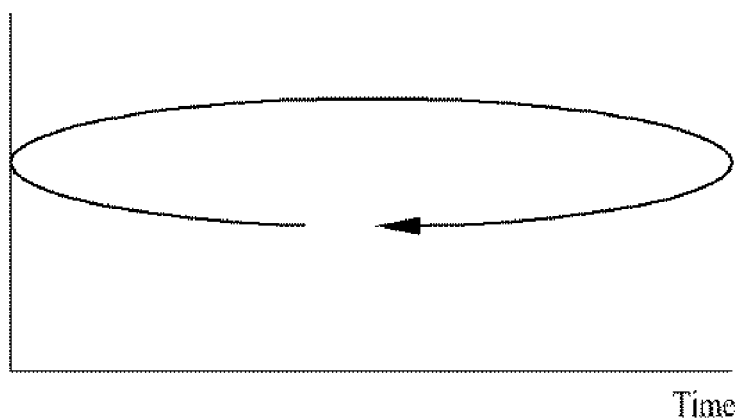

Referring to FIG. 12A, a distance difference between a holography image and a terminal is set to be maintained constantly, decreased and then increased in accordance with time. And, assume that the holography image is projected by rotating.

Figure 12B:
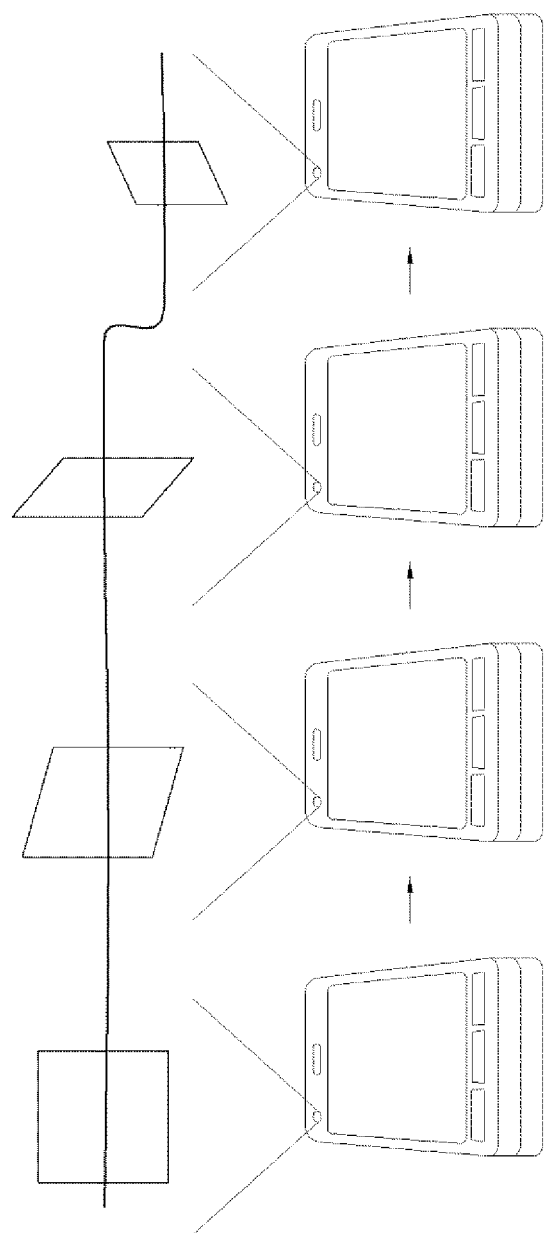

Accordingly, referring to FIG. 12B, a holography image projected by the holography module 156 is displayed by maintaining a distance difference from a terminal, a distance difference between the holography image and the terminal is decreased and then increased, while the holography image keeps being rotated and projected.

Therefore, as the holography image is moving and rotating simultaneously, it may be able to provide a user with various effects.

Meanwhile, a user may be able to set a specific target to apply a holography pattern thereto according to one embodiment of the present invention. And, the user is ale to set a content of a holography image projected by having the holography pattern applied thereto.

First of all, a target, to which a holography pattern will be applied, may include one of an address book, a plurality of applications, a name of a specific object and the like. In particular, a holography pattern may be applied in case of activating the address book or one of a plurality of the applications or displaying the name of the specific object. The above description is just exemplary. Optionally, a user may be able to randomly designate a new target or change a target.

The content of the holography image projected by having the holography pattern applied thereto may include a plurality of contents, a whole or partial region displayed on the display unit, at least one of a plurality of objects, or the like.

In particular, a plurality of the contents may include texts, icons, widgets, emoticons, images, videos and the like.

A part, which will be projected as a holography image by having a holography pattern applied thereto, may be set on a whole screen of the display unit. For instance, a screen amounting to 70% of the display unit may be projected as a holography image by being set to have a holography pattern applied thereto.

At least one object designated by a user among a plurality of objects displayed on the display unit may be controlled to become a holography image.

This is described in detail with reference to FIG. 13 and FIG. 14 as follows.

FIG. 13 is a diagram for one example of a holography pattern settable target according to one embodiment of the present invention.

Figure 13A:
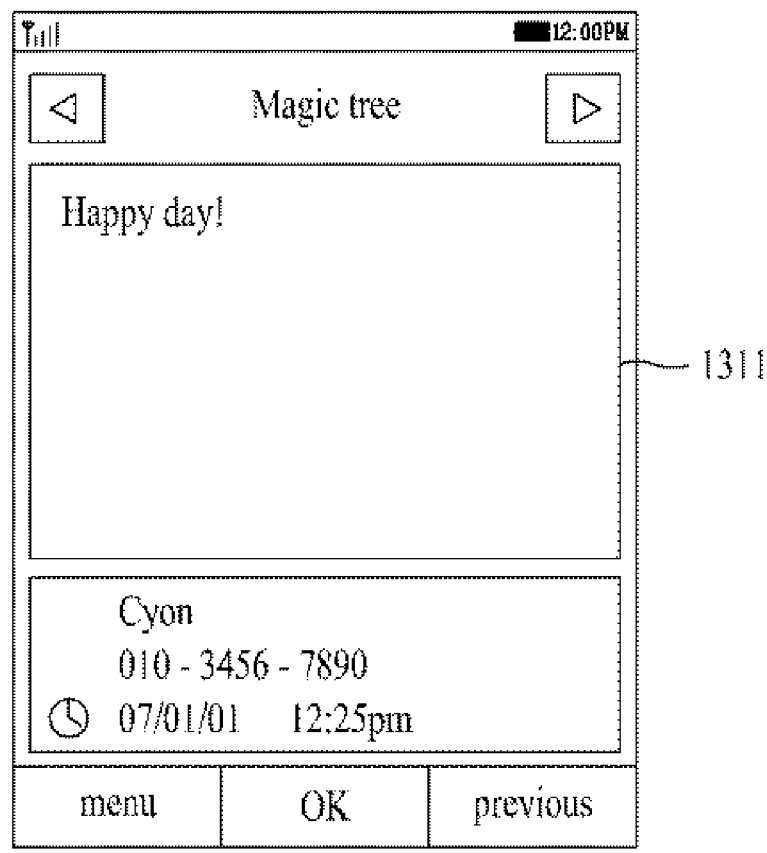
FIG. 13 is a diagram for one example of a holography pattern settable target according to one embodiment of the present invention.

Referring to FIG. 13A, a text 1311 included in a message may be set as a target to which a holography pattern will be applied.

Figure 13B:
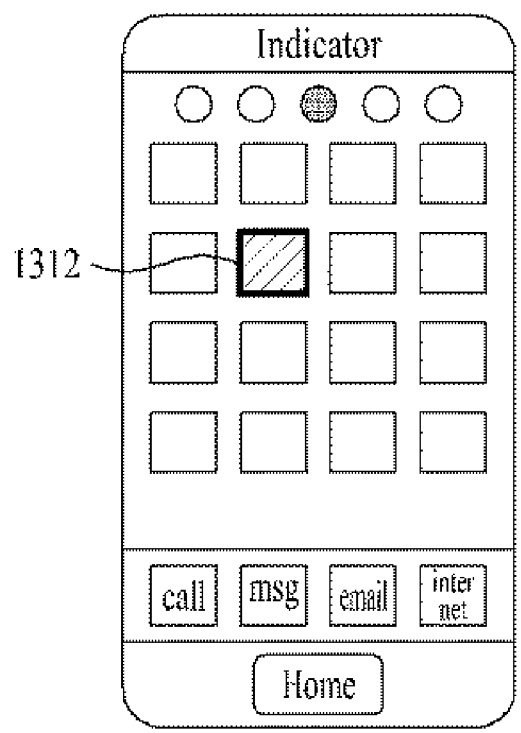

Referring to FIG. 13B, a specific icon 1312 among a plurality of icons may be set as a target to which a holography pattern will be applied. In this case, the example is related to icons. Alternatively, a widget, an emoticon or the like may become a holography pattern settable target as well.

Figure 13C:
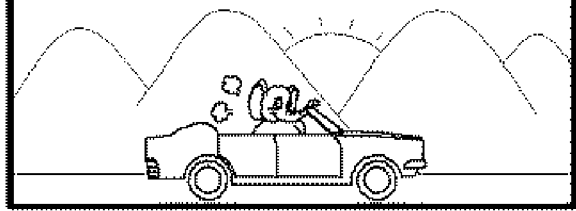

Referring to FIG. 13C, an image 1331 among information saved in a phonebook may be set as a target to which a holography pattern will be applied.

FIG. 14 is a diagram for one example of a holography pattern settable screen according to one embodiment of the present invention.

Figure 14A:
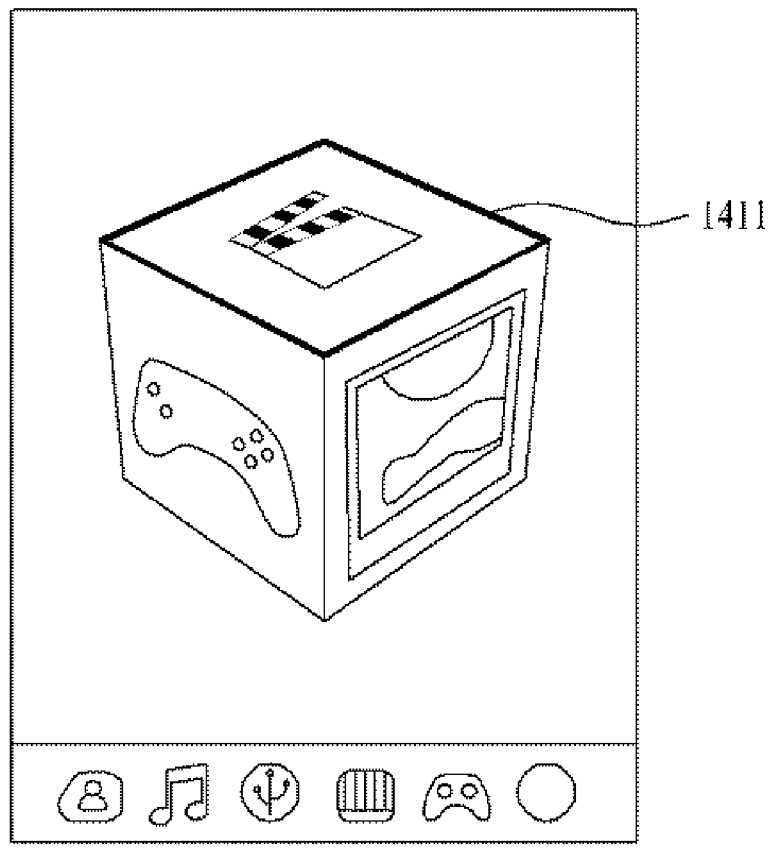
FIG. 14 is a diagram for one example of a holography pattern settable screen according to one embodiment of the present invention.

Referring to FIG. 14A, a plurality of information are displayed as a cube on a display unit.

If a user designates a specific face 1411 among a plurality of faces of the cube, on which a plurality of the information are displayed, respectively, the designated specific face 1411 may be projected as a holography image.

In particular, a partial region displayed on a screen may be controlled to be displayed as a holography image in accordance with a holography pattern.

Figure 14B:
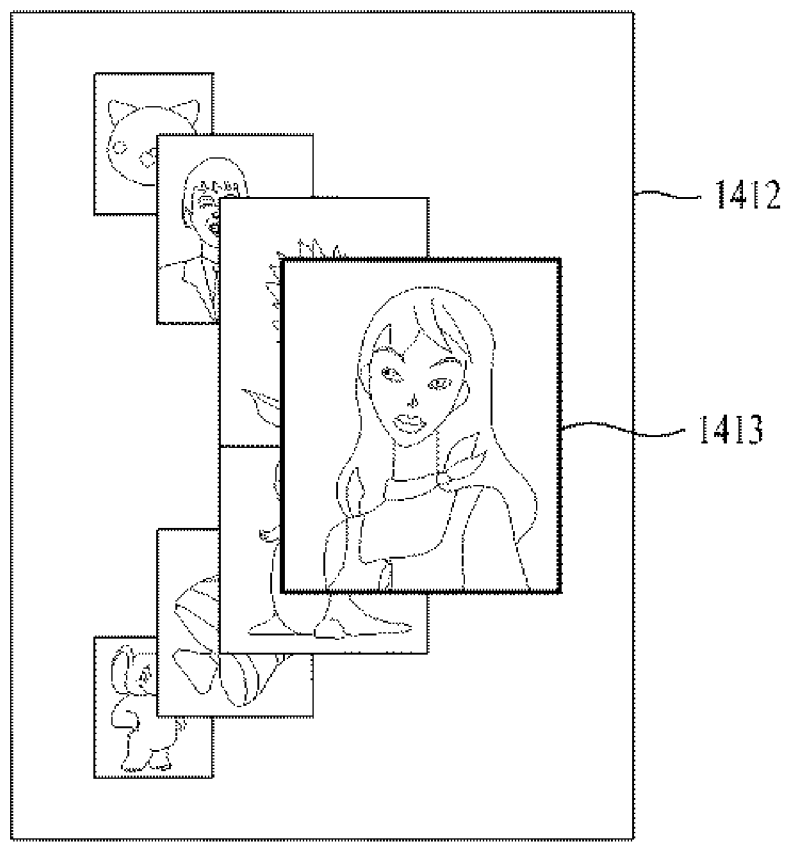

Referring to FIG. 14B, depths are given to a plurality of images, respectively. And a whole screen region 1412 may be controlled to be projected as a holography image in a manner of applying a holography pattern to the whole screen region 1412.

A region corresponding to a partial image 1413 among a plurality of the images may be controlled to be projected as a holography image only.

Meanwhile, according to one embodiment of the present invention, a target, to which a holography pattern will be applied, may become a specific target or group designated by a user.

This is described in detail with reference to FIG. 15 as follows.

FIG. 15 is a diagram for one example of setting a holography pattern for a specific target or a specific group according to one embodiment of the present invention.

Figure 15A:
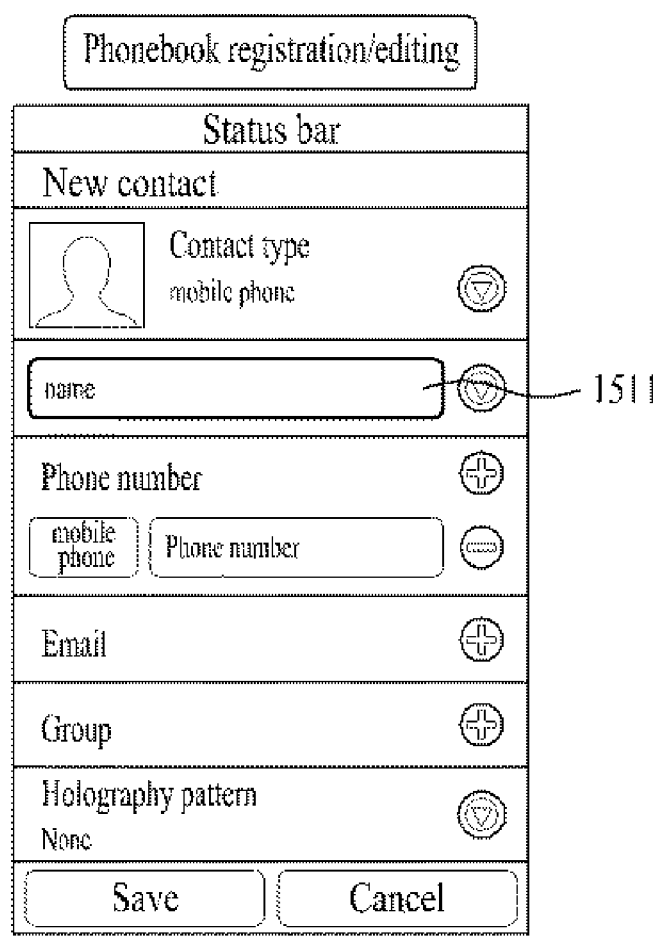
FIG. 15 is a diagram for one example of setting a holography pattern for a specific target or a specific group according to one embodiment of the present invention.

Referring to FIG. 15A, a holography pattern may be set for a specific target added via an editing menu 1511 of a phonebook only.

Figure 15B:
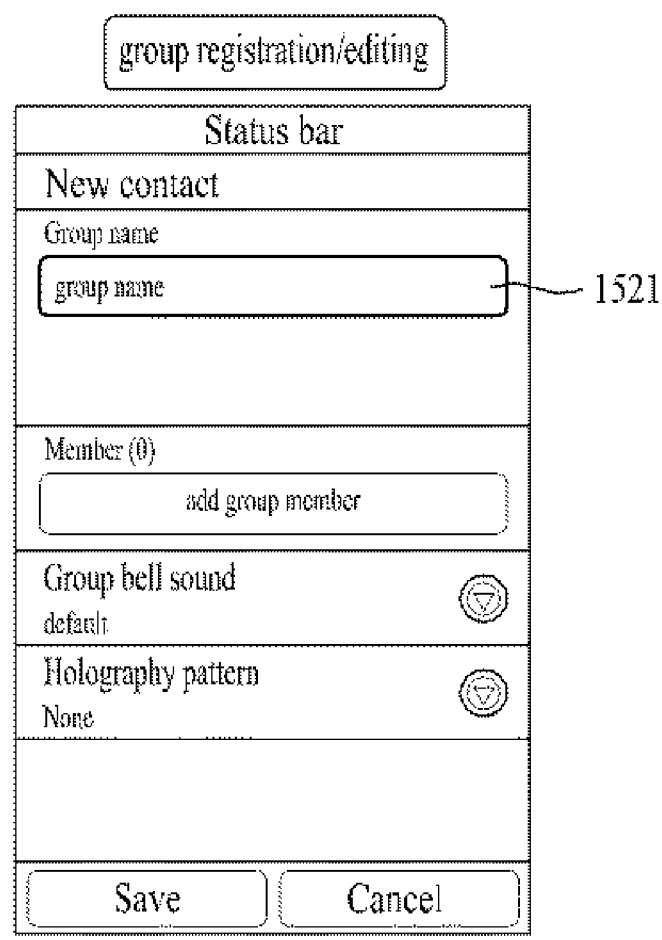

Referring to FIG. 15B, a holography pattern may be set for a target sorted as a specific group via a group menu 1521 of a phonebook only.

Therefore, it may be able to conveniently manage a target, to which a holography pattern will be applied, by a specific target or group unit.

Moreover, according to one embodiment of the present invention, the controller 180 may be able to give a prescribed visual effect to a holography pattern set target.

In this case, the visual effect may play a role as an indicator in informing a user that a holography pattern has been set for a corresponding target.

This visual effect may be implemented using various effects including a pattern of surface texture, flickering, size variation, at least one shape-transformed or twisted portion and the like. Yet, the visual effect is non-limited by the above-mentioned effects. And, the visual effect may be implemented using other effects in various ways.

This is described in detail with reference to FIG. 16 as follows.

FIG. 16 is a diagram for one example of a visual effect to indicate a holography pattern set target according to one embodiment of the present invention.

Figure 16A:
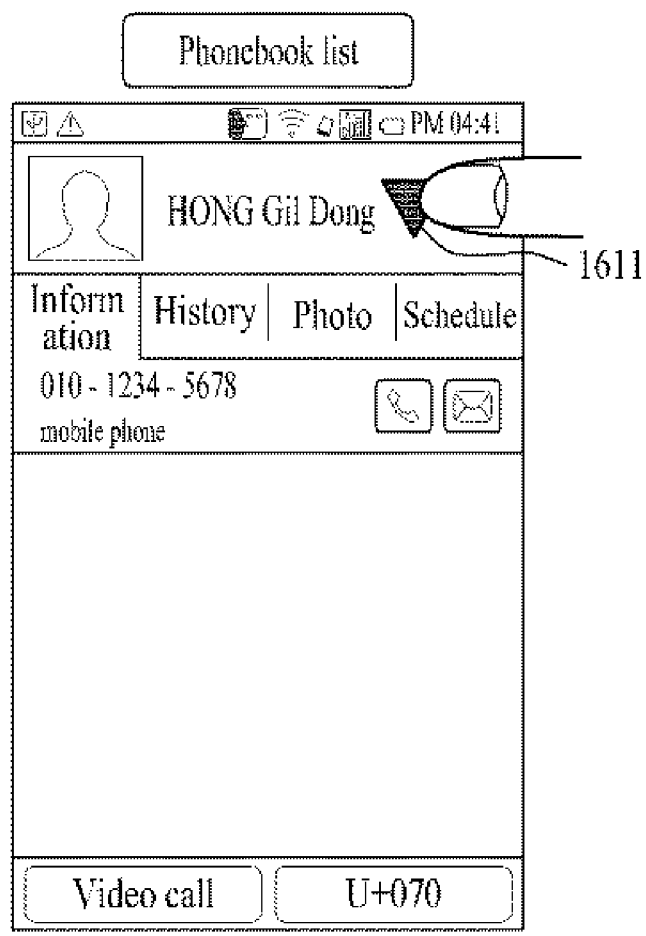
FIG. 16 is a diagram for one example of a visual effect to indicate a holography pattern set target according to one embodiment of the present invention.

Referring to FIG. 16A, an indicator 1611 may be displayed on a right top end portion of a touchscreen in a phonebook read menu to indicate that a holography pattern is set for a character object 'HONG Gil Dong'.

Moreover, the indicator 1611 may be utilized as a factor of a trigger event to project a holography image. In particular, if a user selects the indicator 1611 by a touch input, an image displayed on a screen may be projected as a holography image in accordance with a holography pattern.

Figure 16B:
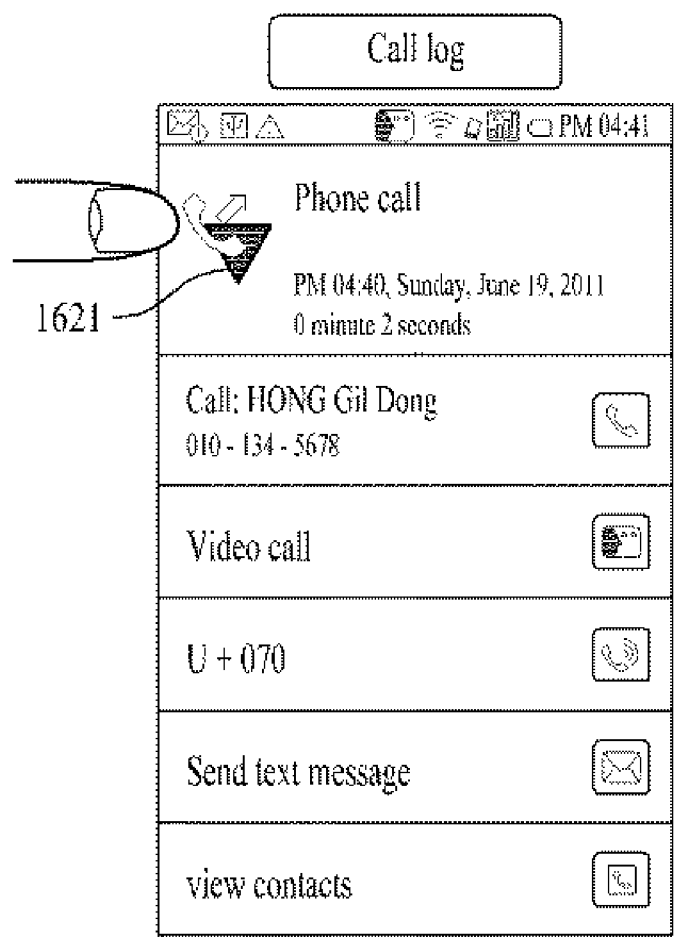

Referring to FIG. 16B, an indicator 1621 may be displayed on a left top end portion of a touchscreen in a call log read menu to indicate that a holography pattern is set for a character object 'HONG Gil Dong'.

Moreover, like FIG. 16A, if a user selects the indicator 1621 by a touch input, an image displayed on a screen may be projected as a holography image in accordance with a holography pattern.

Figure 16C:
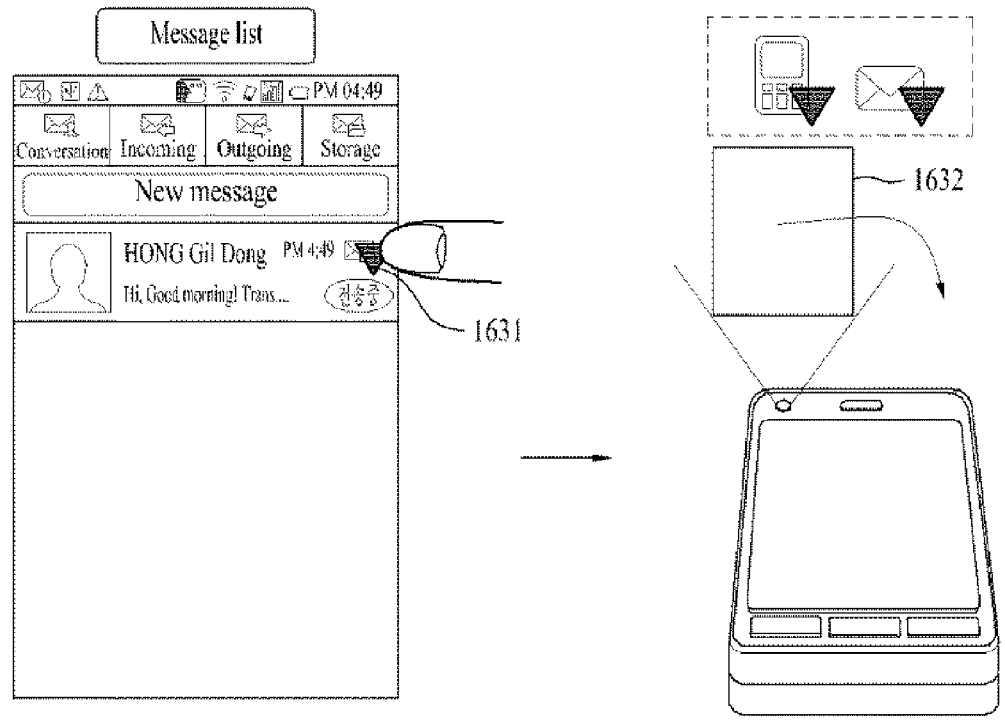

Referring to FIG. 16C, if a message is sent to a specific object or a message is received from a specific object, it may be able to display an indicator together with the message to indicate that a holography pattern has been set for the specific object.

In particular, when a message received from a character object 'HONG Gil Dong' is displayed in a message list shown in FIG. 16C, it may be able to inform a user that a holography pattern is set for the character object using an indicator 1631.

In doing so, if a user selects the indicator 1631 by a touch input, an image displayed on a screen may be projected as a holography image 1632 in accordance with the holography pattern.

Figure 16D:
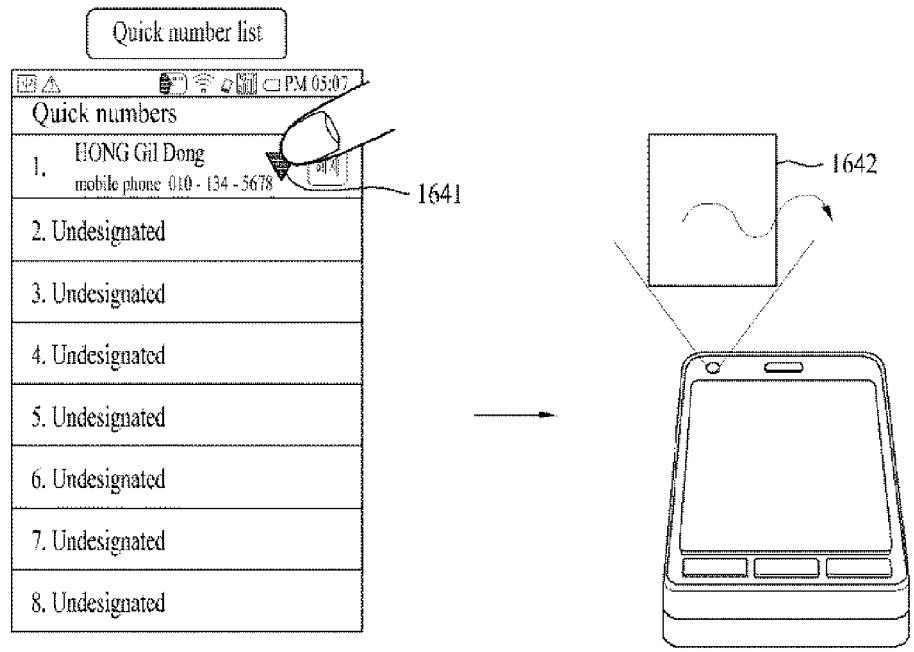

Referring to FIG. 16D, while a quick number list is displayed, a user may be informed that a holography pattern is set for a character object 'HONG Gil Dong' using an indicator 1641.

In doing so, if a user selects the indicator 1641 by a touch input, an image displayed on a screen may be projected as a holography image 1642 in accordance with the holography pattern.

Therefore, a user is facilitated to identify a holography pattern set target among a plurality of targets using such a visual effect as an indicator and the like. And, a displayed visual effect may be utilized as a trigger event to display a holography image.

Meanwhile, according to one embodiment of the present invention, a holography pattern may be set in a manner of being classified into an auto mode and a manual mode.

In particular, the manual mode is a mode for displaying a prescribed target as a holography image in accordance with a holography pattern manually set by a user in advance.

And, the auto mode is a mode for applying a holography pattern to cope with a content displayed on a display unit or a change of a screen.

In the following description, the auto mode is explained with reference to detailed examples.

First of all, it may be able to set a holography pattern in accordance with a change of a screen status.

For instance, a holography pattern may be set in accordance with one of activation of a prescribed application, cancellation of application activation, a screen shift to a previous or next screen in accordance with a user touch, enlargement or reduction (zoom-in or zoom-out) of an image displayed on a screen, terminal inclination sensed by a sensing unit, terminal location change sensed by a sensing unit, indicator status, status of connection with another external device, presence or non-presence of error, remaining battery level and the like.

It may be able to set a holography pattern in accordance with a motion change of an object.

For instance, a holography pattern may be set in accordance with a change of a position for touching an object or the like.

It may be able to set a holography pattern in accordance with a brightness change of a screen. In particular, it may be able to output an image by changing a holography pattern in accordance with a screen brightness setup value of a display unit.

It may be able to set a holography pattern in accordance with a change of volume of an output unit. In particular, a holography image may be outputted by setting a holography pattern in accordance with a volume value of an outputted sound.

It may be able to set a holography pattern in accordance with a change of sound of an output unit. In particular, a holography pattern may be determined in accordance with a change of waveform, pitch, frequency, amplitude or the like for an outputted sound.

The above description of the auto mode with reference to the detailed examples is just exemplary, by which the present invention may be non-limited. Alternatively, a holography pattern may be implemented to correspond to a different change of a content or screen displayed on the display unit.

In the following description, a method of setting a holography pattern by discriminating an auto mode and a manual mode from each other is explained in detail with reference to FIGS. 17 to 27.

Figure 17:
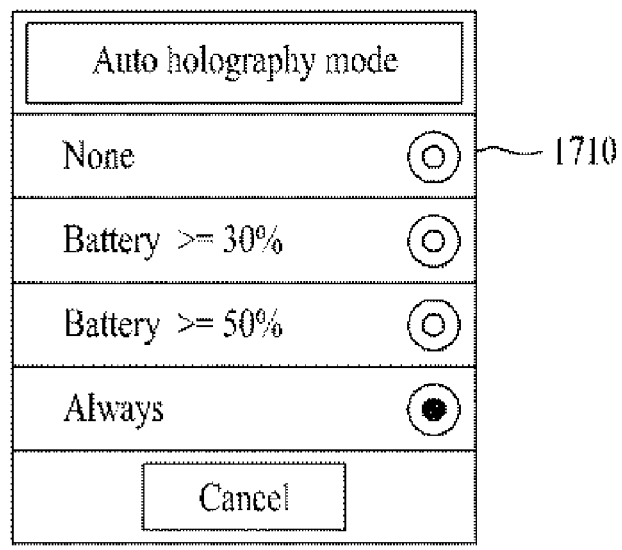
FIG. 17 is a diagram for one example of a holography pattern setting menu according to one embodiment of the present invention.

FIG. 17 is a diagram for one example of a holography pattern setting menu according to one embodiment of the present invention.

Referring to FIG. 17, if a menu 'None' is selected from a plurality of menus displayed in a holography pattern setting menu 1710, it may be able to set up a manual mode. If a user selects a menu 'Always', it may be able to set up an auto mode. And, it may be able to set up a menu 'Battery≥50%' for enabling a holography pattern to be set in consideration of a remaining battery level of a terminal only if a battery level is equal to or greater than 50%. Moreover, it may be able to set up a menu 'Battery≥50%' for enabling a holography pattern to be set in consideration of a remaining battery level of a terminal only if a battery level is equal to or greater than 30%.

The auto menu 'Always' among a plurality of the menus displayed in the holography pattern setting menu 1710 is described with reference to FIGS. 18 to 26 as follows.

Figure 18:
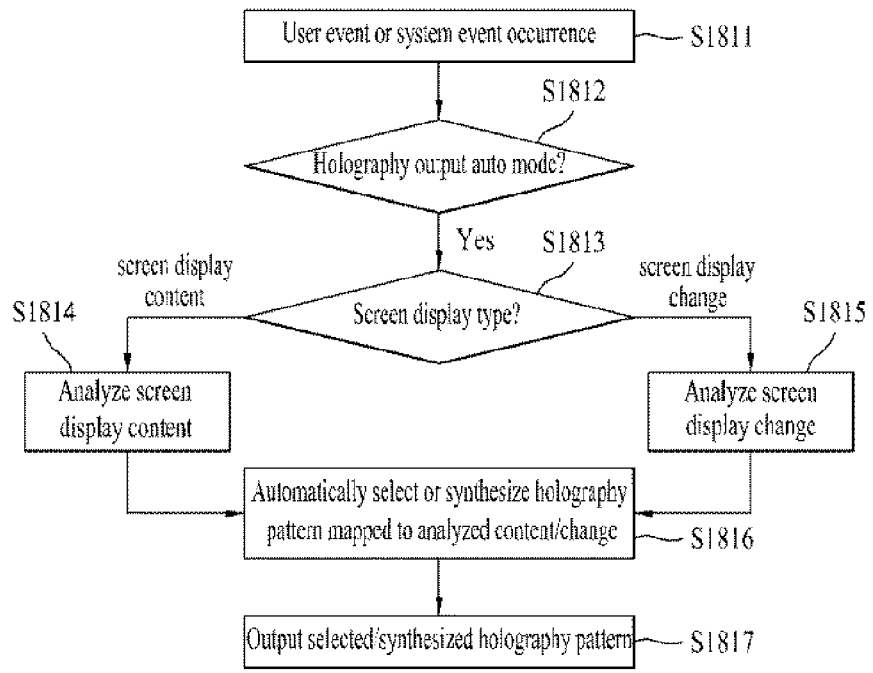
FIG. 18 is a flowchart for an operation of a holography auto mode according to one embodiment of the present invention.

FIG. 18 is a flowchart for an operation of a holography auto mode according to one embodiment of the present invention.

Referring to FIG. 18, as mentioned in the foregoing description, a user designated event or a system event may occur as a trigger event used for a terminal to display a holography image [S1811].

Subsequently, the controller 180 determines whether a holography auto mode is set [S1812].

If the holography auto mode is set, the controller 180 identifies a screen display type [S1813]. If a content is displayed, the controller 180 analyzes the content displayed on the screen [S1814].

In doing so, the analysis of the displayed content may be performed using a keyword. In particular, if a pre-designated keyword is contained in the displayed content, it may be able to determine a holography pattern corresponding to the keyword. Alternatively, a holography pattern may be determined in accordance with information on an external device related to a call signal or message transmitted/received by the terminal. And, corresponding details shall be described with reference to FIG. 19 later.

Moreover, if a displayed screen is changed, the controller 180 analyzes a change of the displayed screen [S1815].

Thereafter, the controller 180 automatically selects or synthesizes a holography pattern in accordance with the analyzed content or the analyzed change of the screen [S1816].

Once the holography pattern is determined, a holography image is projected in accordance with the determined holography pattern [S1817]. Thus, an operation of projecting a holography pattern in auto mode can be performed.

FIG. 19 is a diagram for one example of projecting a holography image in holography auto mode according to one embodiment of the present invention.

In FIG. 19, assume that a call signal is transmitted to a specific object.

Figure 19A:
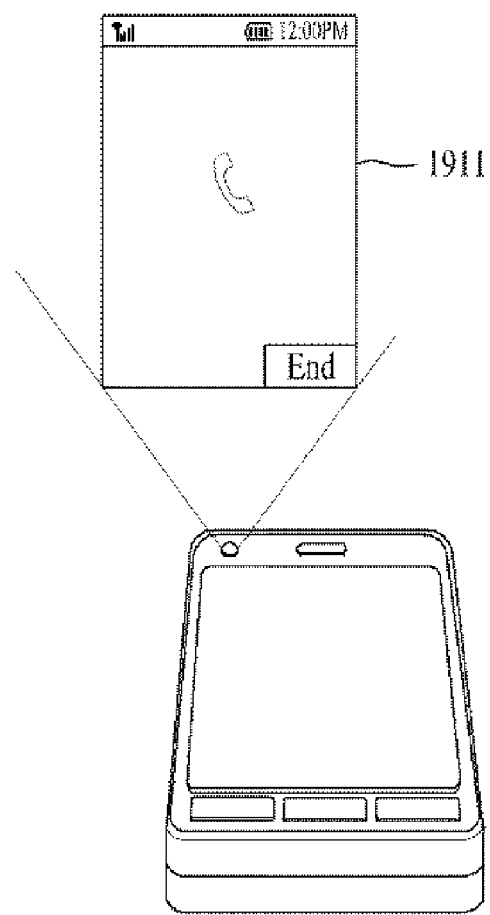
FIG. 19 is a diagram for one example of projecting a holography image in holography auto mode according to one embodiment of the present invention.

Referring to FIG. 19A, the controller 180 may be able to set a holography pattern using information related to a specific object to which a call signal is transmitted.

In particular, the controller 180 may be able to create a holography pattern by analyzing such information of the specific object as name, phone number and the like, which are saved in a memory.

Figure 19B:
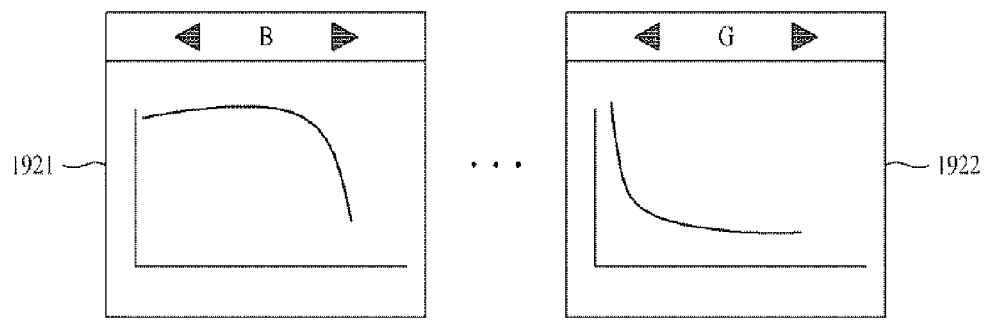

FIG. 19B shows one example of determining a holography pattern in accordance with a name of a specific object.

Referring to FIG. 19B, if a name of a specific object starts with B, a holography image may be projected in such a pattern 1921 as shown in FIG. 19B. If a name of a specific object starts with G, a holography image may be projected in such a pattern 1922 as shown in FIG. 19B.

Figure 19C:
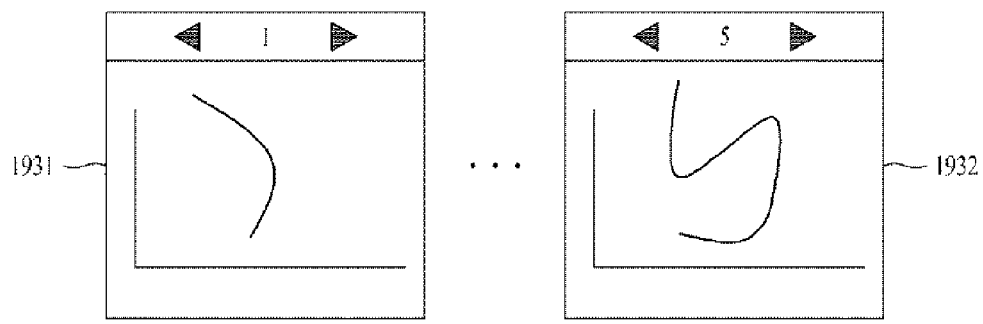

FIG. 19C shows one example of determining a holography pattern in accordance with a phone number of a specific object saved in a memory.

Referring to FIG. 19C, if '1' is included in a phone number of a specific object, a holography image may be projected in such a pattern 1931 as shown in FIG. 19C. If '5' is included in a phone number of a specific object, a holography image may be projected in such a pattern 1932 shown in FIG. 19C.

FIG. 20 is a diagram for one example of projecting a holography image using a keyword in holography auto mode according to one embodiment of the present invention.

Referring to FIG. 20, assume a case that a terminal sends a message to a specific object.

In doing so, the controller 180 may be able to set a holography pattern using keyword information included in the message sent to the specific object.

In particular, the controller 180 determines whether a preset keyword is included in a sent message. If the keyword is included, the controller 180 projects a holography image by applying a holography pattern corresponding to the keyword.

In FIG. 20, assume that a word 'happy' is set as a keyword and that a holography pattern of a heart shape is set in advance by a user to correspond to the keyword 'happy'.

Figure 20A:
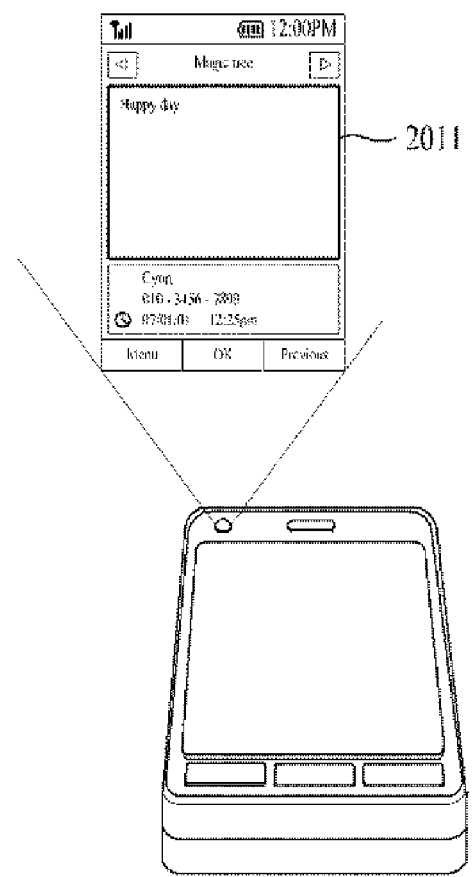
FIG. 20 is a diagram for one example of projecting a holography image using a keyword in holography auto mode according to one embodiment of the present invention.

Referring to FIG. 20A, a user writes a message 2011 and then sends the message 2011 to a specific object.

In doing so, the controller 180 determines whether a keyword 'happy' is included in the sent message 2011.

Figure 20B:
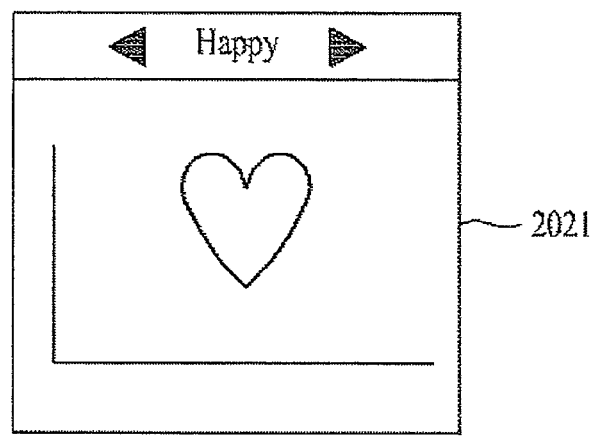

Referring to FIG. 20B, if the keyword 'happy' is included in the message 2011, a holography image 2021 is projected by applying a holography pattern of a heart shape.

Meanwhile, a holography pattern may be determined in accordance with a maintained time of a call signal or message transmitted to a specific object.

This is described in detail with reference to FIG. 21 and FIG. 22 as follows.

FIG. 21 is a diagram for one example of projecting a holography image in case of transmitting a call signal in holography auto mode according to one embodiment of the present invention.

Figure 21A:
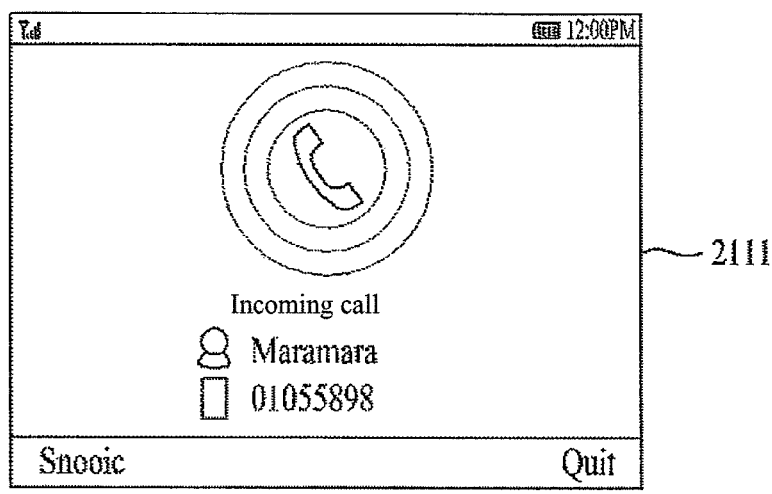
FIG. 21 is a diagram for one example of projecting a holography image in case of transmitting a call signal in holography auto mode according to one embodiment of the present invention.

Referring to FIG. 21A, a user may be able to transmit a call connection signal to a specific object.

Figure 21B:
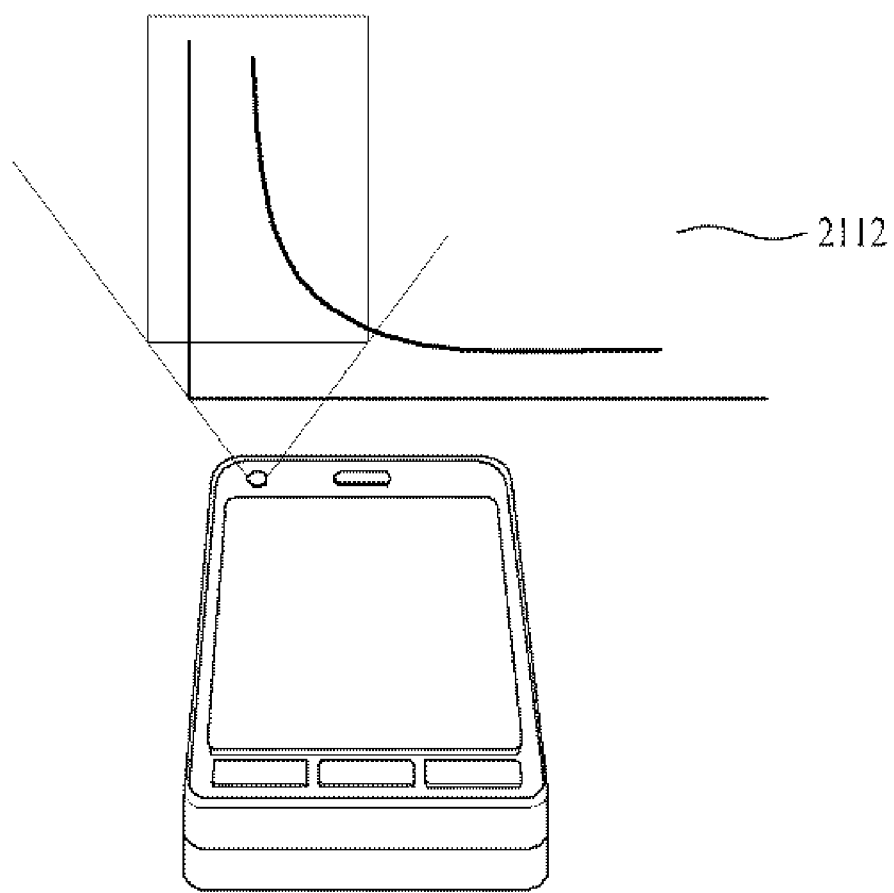

In doing so, as a call connection attempt is elongated, a holography pattern 2112 may change as shown in FIG. 21B.

Hence, since a holography pattern is determined in accordance with an attempted time of a call connection, a holography image is correspondingly projected.

FIG. 22 is a diagram for one example of projecting a holography image in case of transmitting a message in holography auto mode according to one embodiment of the present invention.

Referring to FIG. 22, a holography pattern is determined in accordance with time taken to completion of a message transmission.

Figure 22A:
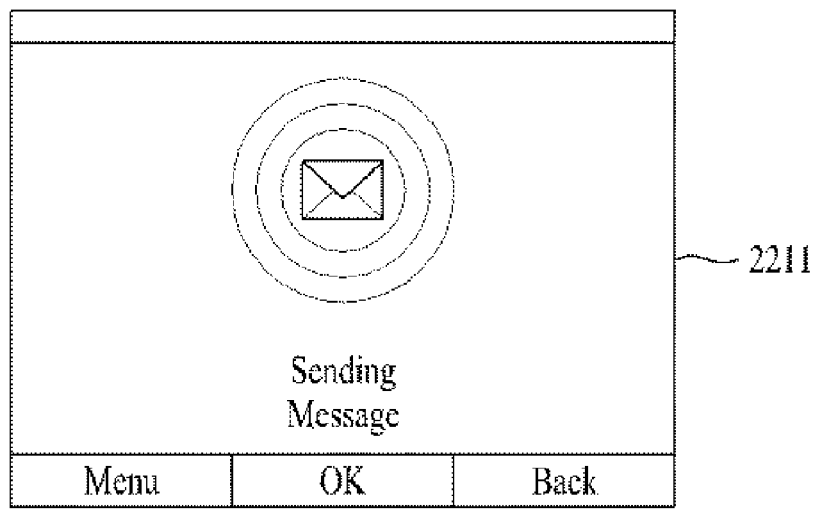
FIG. 22 is a diagram for one example of projecting a holography image in case of transmitting a message in holography auto mode according to one embodiment of the present invention.

Referring to FIG. 22A, a prescribed message 2211 may be sent to a specific object.

In doing so, a total time to complete a transmission of the message may vary in accordance with a communication status.

Figure 22B:
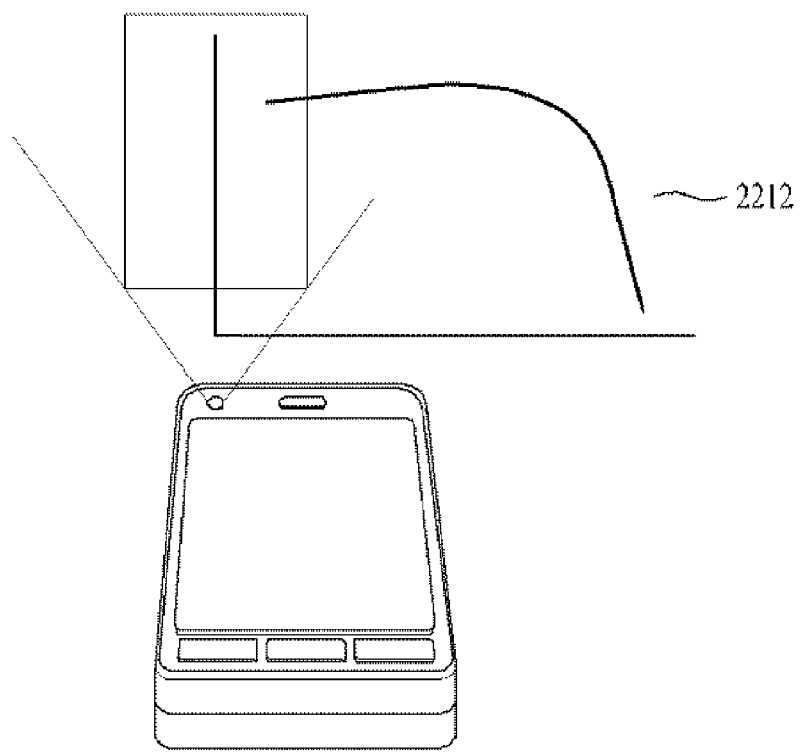

Hence, referring to FIG. 22B, a holography pattern 2212 may be determined and projected in accordance with time taken to complete the transmission of the message.

Meanwhile, in case of transmitting a prescribed file to a specific object as well as a message, a holography pattern may be determined in accordance with time taken to complete the corresponding transmission.

FIG. 23 is a diagram for one example of projecting a holography image in case of transmitting a file in holography auto mode according to one embodiment of the present invention.

In FIG. 23, assume a situation that an image file 2311 saved in a terminal is transmitted to a specific object.

Figure 23A:
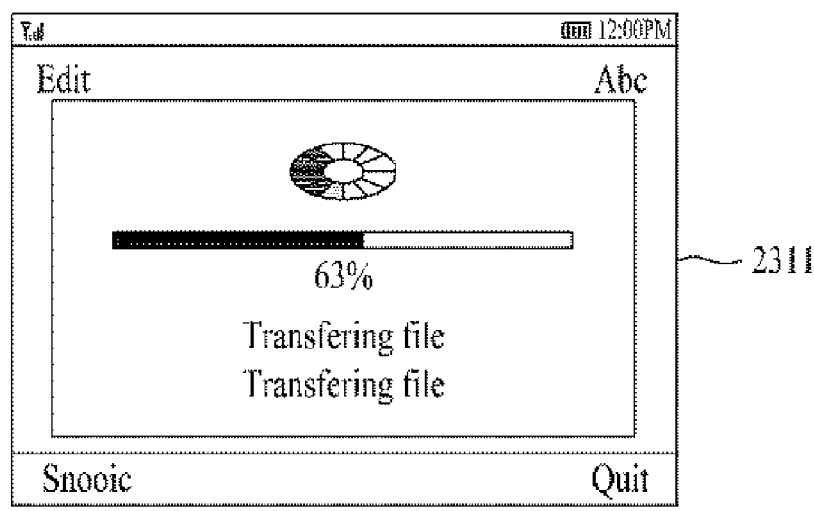
FIG. 23 is a diagram for one example of projecting a holography image in case of transmitting a file in holography auto mode according to one embodiment of the present invention.

Referring to FIG. 23A, it may take a considerable time until an image file is completely transmitted to a specific object.

Figure 23B:
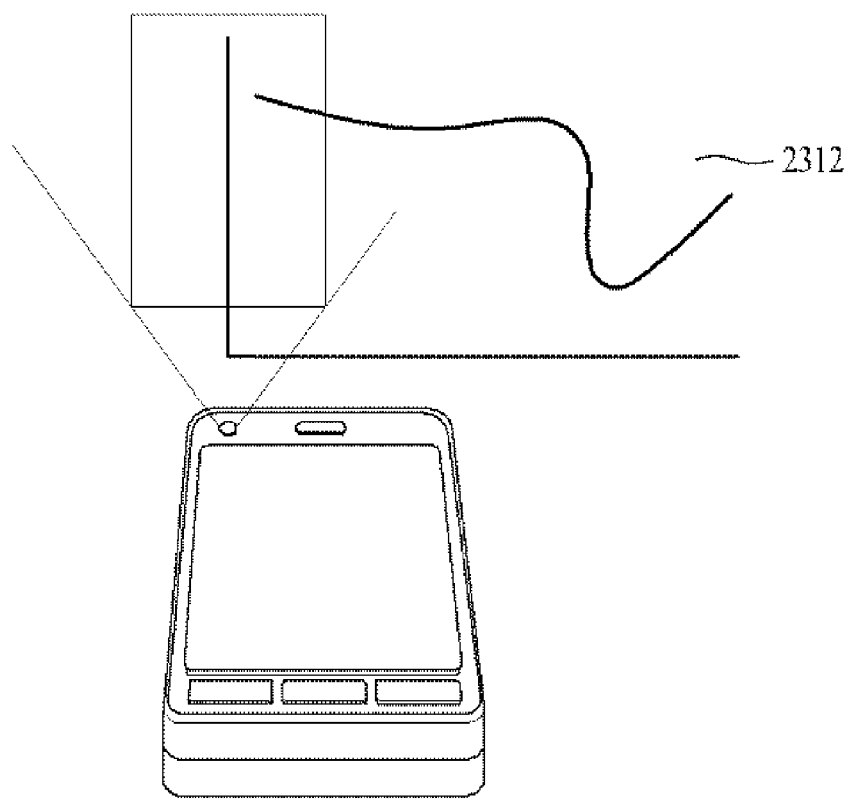

In doing so, referring to FIG. 23B, a holography pattern 2312 may be determined in accordance with variation of a total time taken to complete the transmission of the image file.

FIG. 24 is a diagram for one example of projecting a holography image in accordance with enlargement of an image in holography auto mode according to one embodiment of the present invention.

In FIG. 24, a holography pattern is determined in accordance with an enlargement ratio of an image displayed on a display unit.

Figure 24A:
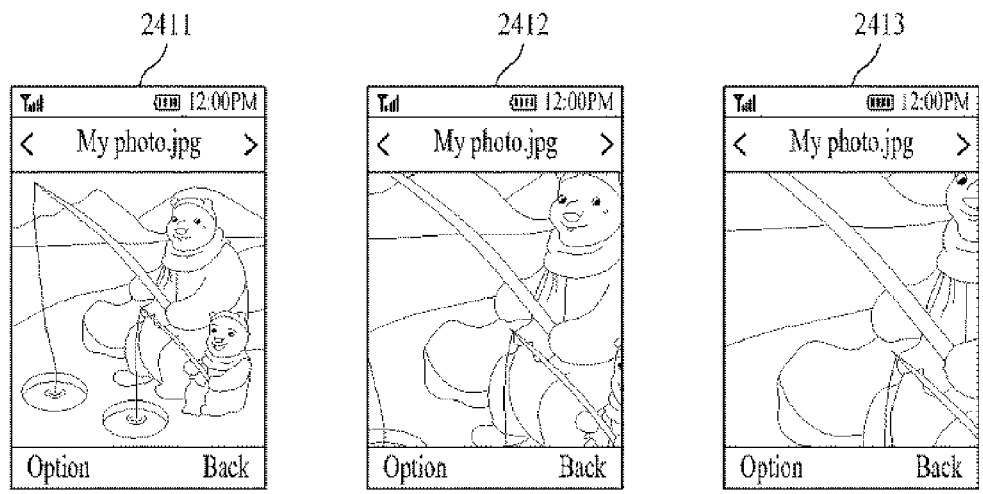
FIG. 24 is a diagram for one example of projecting a holography image in accordance with enlargement of an image in holography auto mode according to one embodiment of the present invention.

Referring to FIG. 24A, a size of a display region of an image displayed on a display unit may be changed into an enlarged size 2412 and 2413 from a reference size 2411 in accordance with a user touch or key input manipulation.

Figure 24B:
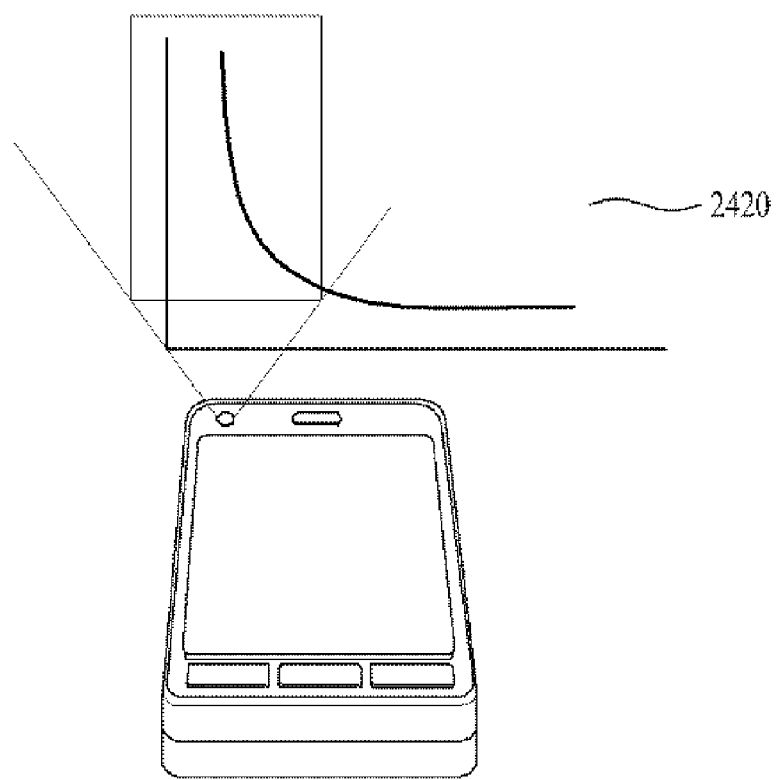

In doing so, referring to FIG. 24B, the controller 180 determines a holography pattern 2420 in accordance with an enlargement or reduction ratio of the image and then controls a holography image to be projected in accordance with the determined holography pattern.

FIG. 25 is a diagram for one example of projecting a holography image in accordance with variation of a frequency in holography auto mode according to one embodiment of the present invention.

In FIG. 25, a holography pattern is determined in accordance with frequency variation of an outputted sound.

Figure 25A:
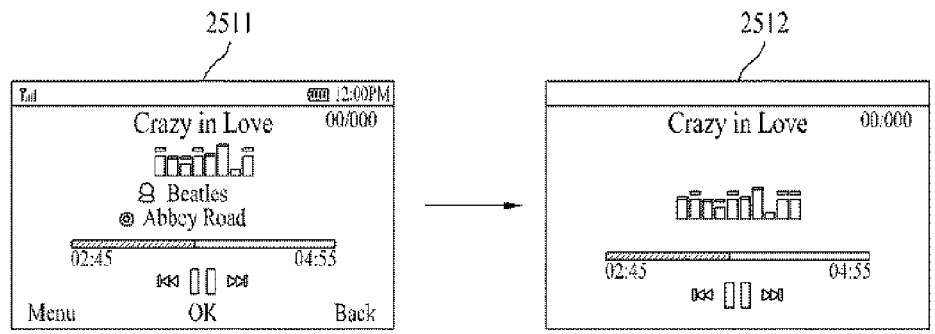
FIG. 25 is a diagram for one example of projecting a holography image in accordance with variation of a frequency in holography auto mode according to one embodiment of the present invention.

Referring to FIG. 25A, a status of an outputted sound may be changed into a status 2512 from a status 2511.

In doing so, the controller 180 may be able to set a holography pattern 2521 and 2522 by utilizing at least one of a variation rate of frequency, a varying frequency band and the like.

Figure 25B:
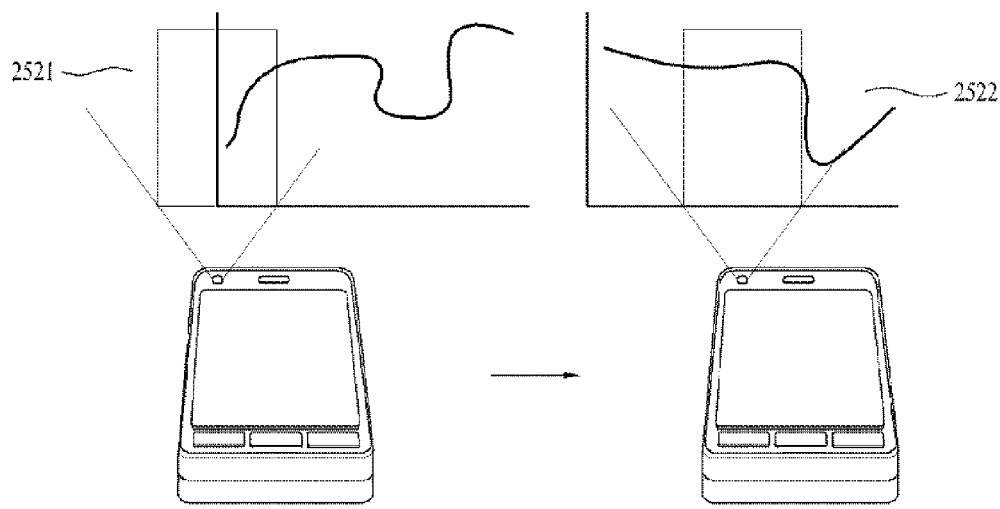

The holography pattern determined in accordance with the frequency variation in FIG. 25A is shown in FIG. 25B.

Hence, a holography image is projected in a manner of changing in accordance with a frequency variation of a sound outputted in auto mode.

FIG. 26 is a diagram for one example of projecting a holography image in accordance with a change of a screen for a played image in holography auto mode according to one embodiment of the present invention.

In FIG. 26, a holography pattern is determined in accordance with variation of screen brightness in association with a video played in a terminal.

Figure 26A:
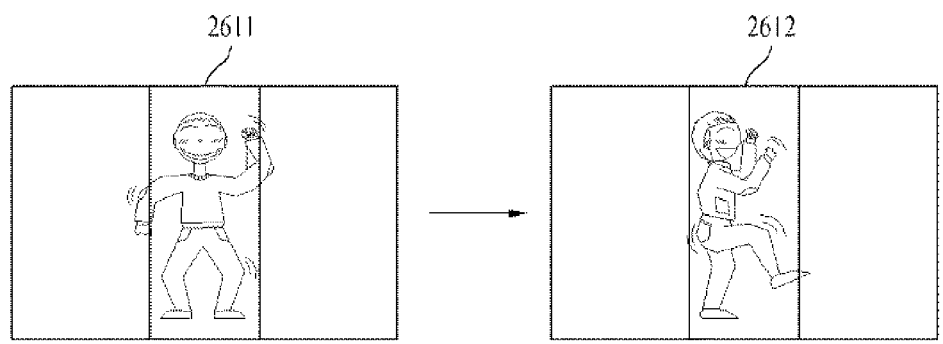
FIG. 26 is a diagram for one example of projecting a holography image in accordance with a change of a screen for a played image in holography auto mode according to one embodiment of the present invention.

Referring to FIG. 26A, as a video is played back, it may be displayed at different screen brightness. The same region 2611/2612 of a display unit is displayed at screen brightness differing in color of a displayed target or the like.

Figure 26B:
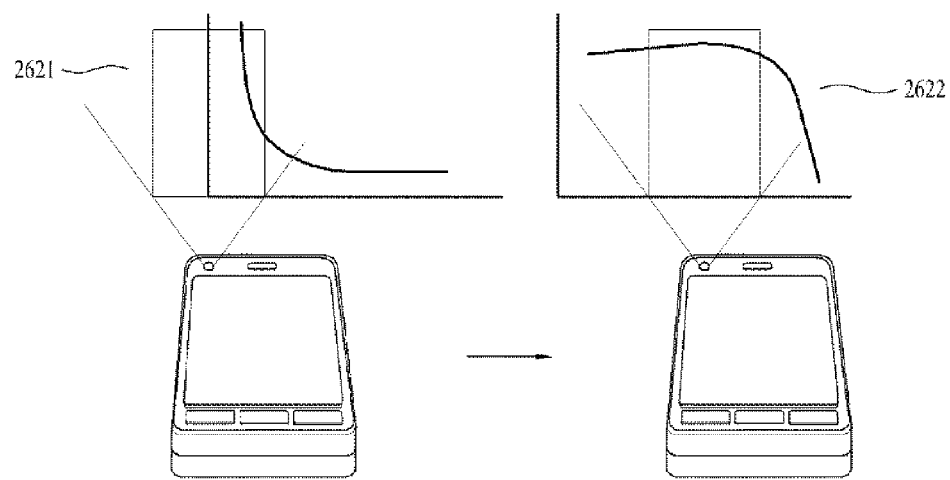

In doing so, the controller 180 detects the variation of the screen brightness and then determines a holography pattern 2621/2622 shown in FIG. 26B.

In the following description, a method of setting a manual mode by selecting a menu 'None' from a plurality of the menus displayed in the holography pattern setting menu 1710 is explained in detail with reference to FIG. 27.

FIG. 27 is a diagram for one example of setting a holography pattern in holography manual mode according to one embodiment of the present invention.

Figure 27A:
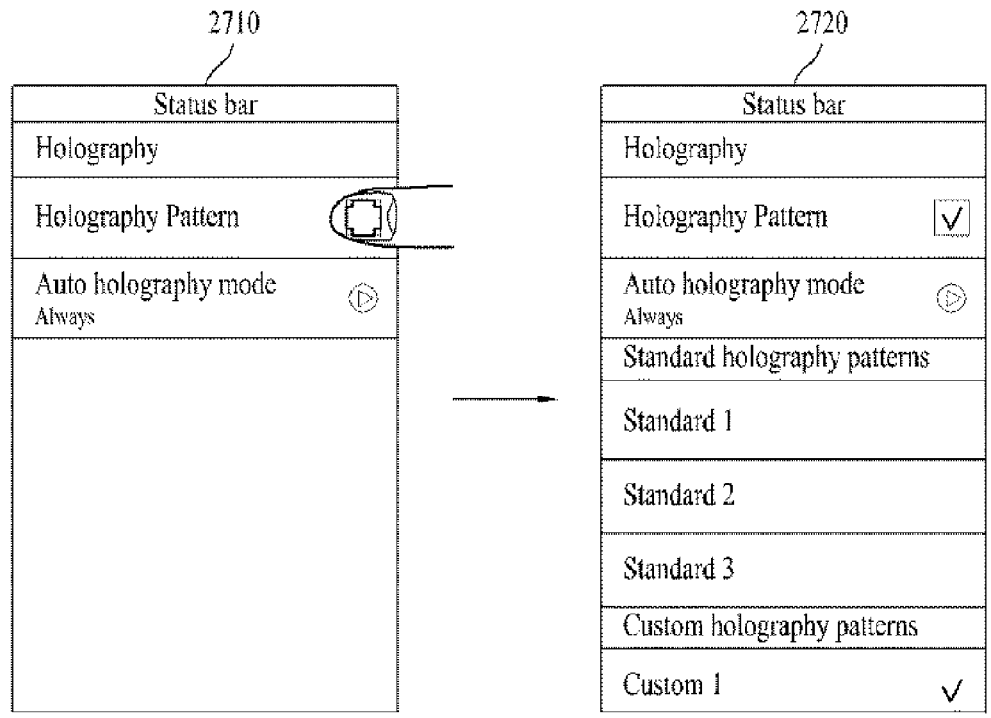
FIG. 27 is a diagram for one example of setting a holography pattern in holography manual mode according to one embodiment of the present invention.

Referring to FIG. 27A, if the menu 'None' is selected from a plurality of the menus included in the holography pattern setting menu 1710 mentioned in the foregoing description, a holography designation mode is displayed.

In doing so, a user is able to select a holography pattern menu 2710. If the holography pattern menu 2710 is selected, contents related to the holography pattern are displayed as a submenu 2720 below the holography pattern menu 2710.

In particular, standard holography patterns and user customized patterns are sorted by category and displayed below the holography pattern menu 2710.

Figure 27B:
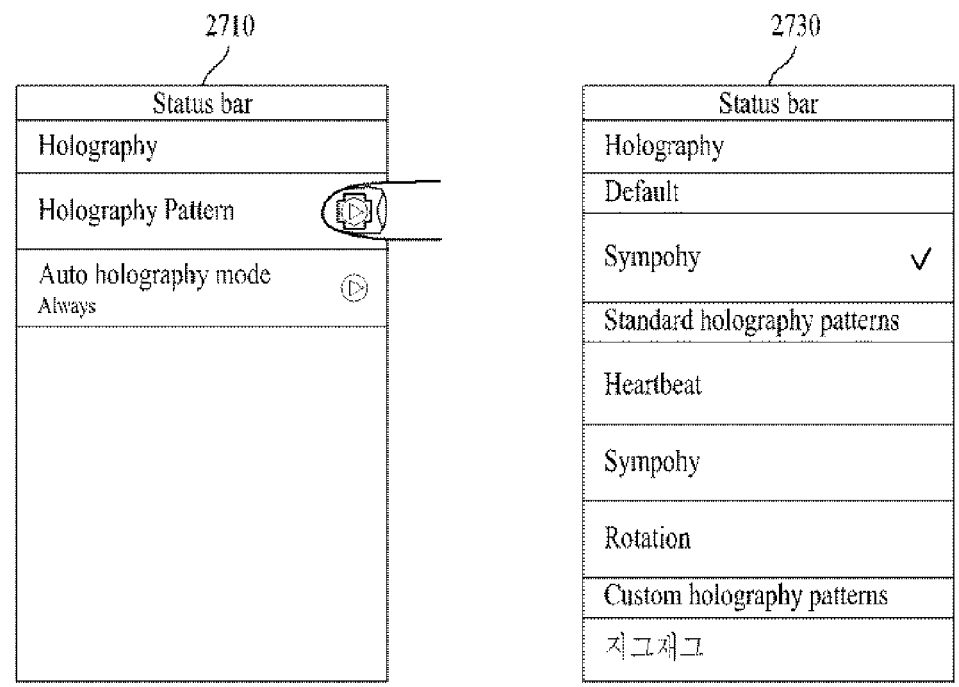

Referring to FIG. 27B, contents related to holography patterns may be displayed by activating a separate screen.

In particular, instead of displaying the contents related to the holography patterns below the holography pattern setting menu 2710, a separate screen 2730 is activated and a plurality of the holography patterns may be displayed on the activated separate screen by being sorted by category.

In doing so, the displayed holography patterns may be represented as thumbnails.

Figure 27C:
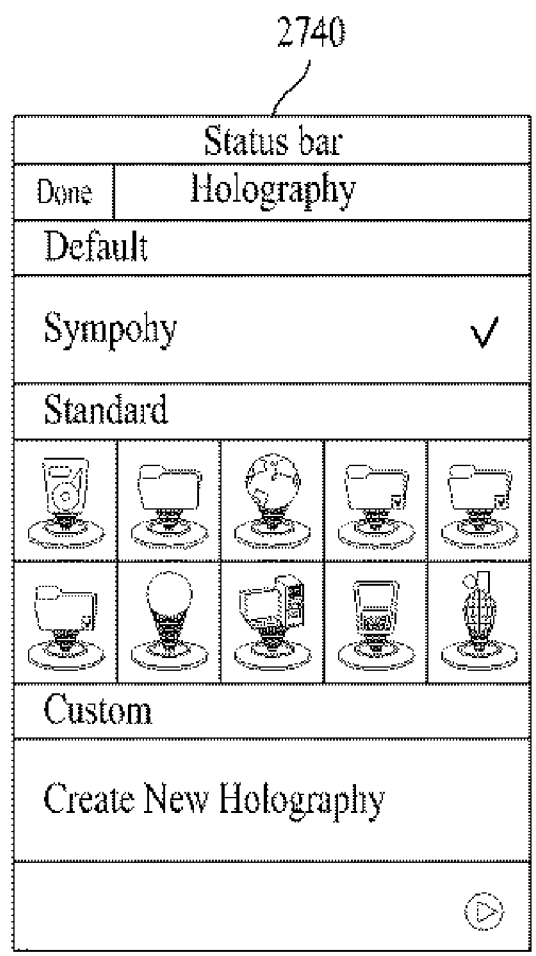

This is shown in FIG. 27C.

Referring to FIG. 27C, holography patterns 2740, which can be set by a user, are displayed in a manner of being arranged as thumbnails. If so, since a user is facilitated to visually recognize the holography patterns, the holography pattern setting may be further facilitated.

In the above description, a user separately activates a holography pattern setting menu and then sets a holography pattern, which is just exemplary. Alternatively, a user may be able to set a holography pattern while activating a specific application.

For instance, a holography pattern is settable when a specific target is registered to a phonebook. This is shown in FIG. 27D.

Figure 27D:
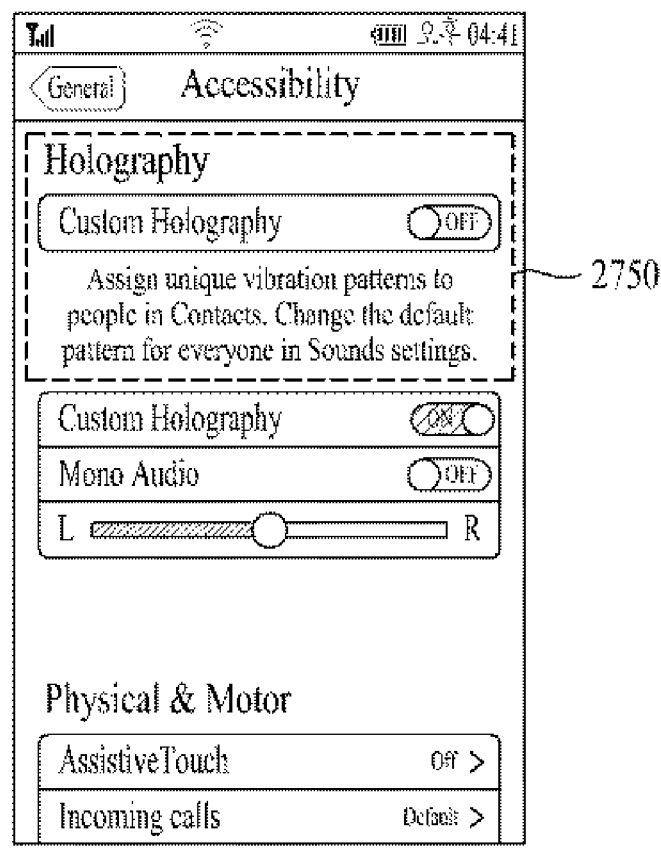

Referring to FIG. 27D, when a specific target is registered to a phonebook, a user determines whether to set a holography pattern and also determines a type of the holography pattern to set, via a prescribed menu 2750.

Meanwhile, according to one embodiment of the present invention, a holography pattern may be modified or added by a user.

In the following description, one example of adding a holography pattern is explained with reference to FIG. 28.

FIG. 28 is a diagram for one example of adding a holography pattern in holography manual mode according to one embodiment of the present invention.

Figure 28A:
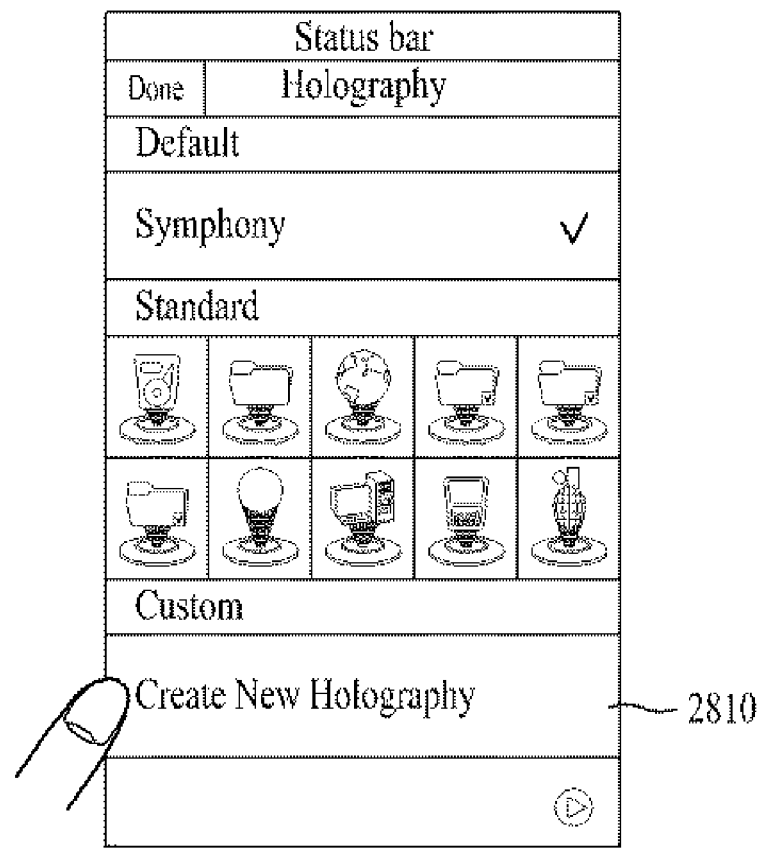
FIG. 28 is a diagram for one example of adding a holography pattern in holography manual mode according to one embodiment of the present invention.

Referring to FIG. 28A, a user is able to select a holography pattern creating menu 2810.

Figure 28B:
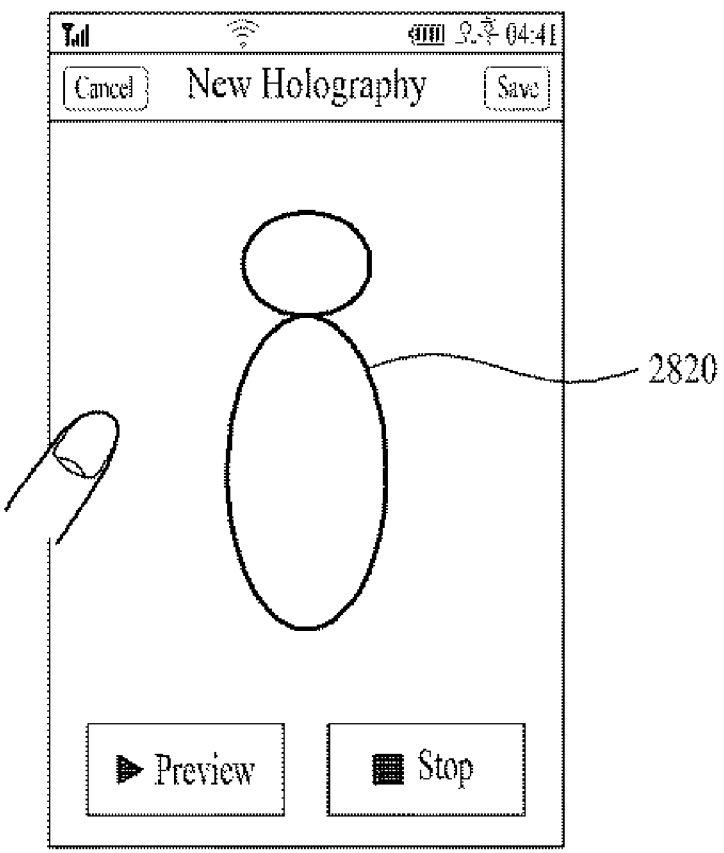

If the holography pattern creating menu 2810 is selected, referring to FIG. 28B, a mode for the user to designate a holography pattern is activated.

In the active mode, a user is able to input a pattern 2820 of snowman to a touchscreen.

Figure 28C:
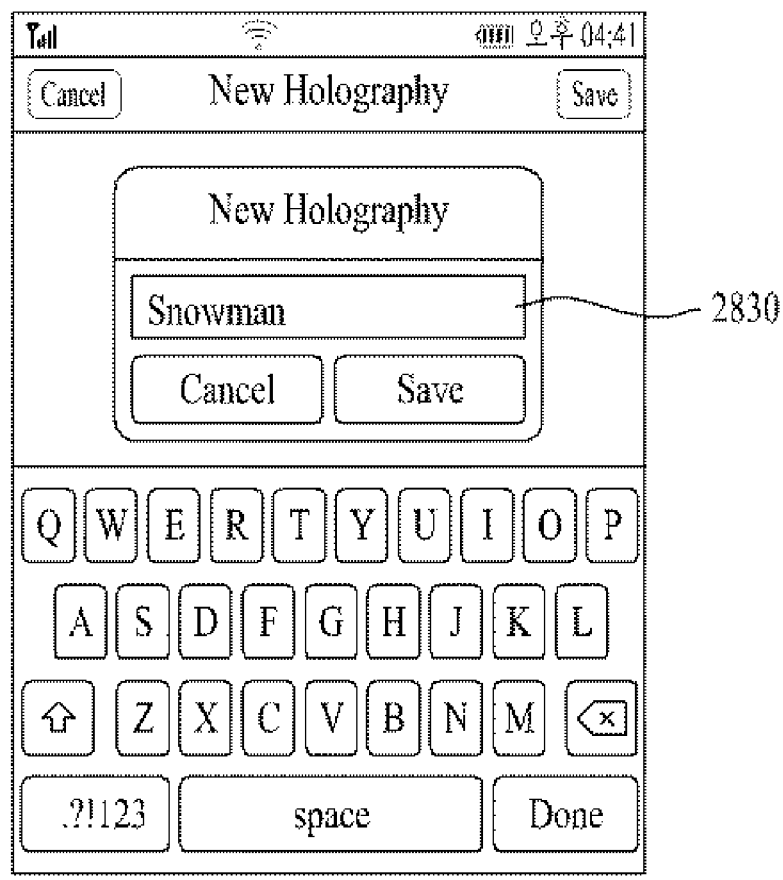

After the pattern 2820 of the snowman has been added, referring to FIG. 28C, a name of the new holography pattern may be designated. In FIG. 28C, the new holography pattern 2830 named 'snowman' is added.

Thereafter, if a holography pattern setting menu is activated, referring to FIG. 28D, the new holography pattern 2840 named 'snowman' is displayed together with previous holography patterns.

Thus, a user is facilitated to add a new holography pattern or modify previous holography patterns.

Meanwhile, according to one embodiment of the present invention, if a trigger event including a user-designated event or a system event occurs, a holography image may be provided to a user in accordance with a preset holography pattern.

This is described in detail with reference to FIGS. 29 to 34 as follows.

FIG. 29 is a diagram for one example of projecting a holography image in accordance with a holography pattern according to one embodiment of the present invention.

Figure 29A:
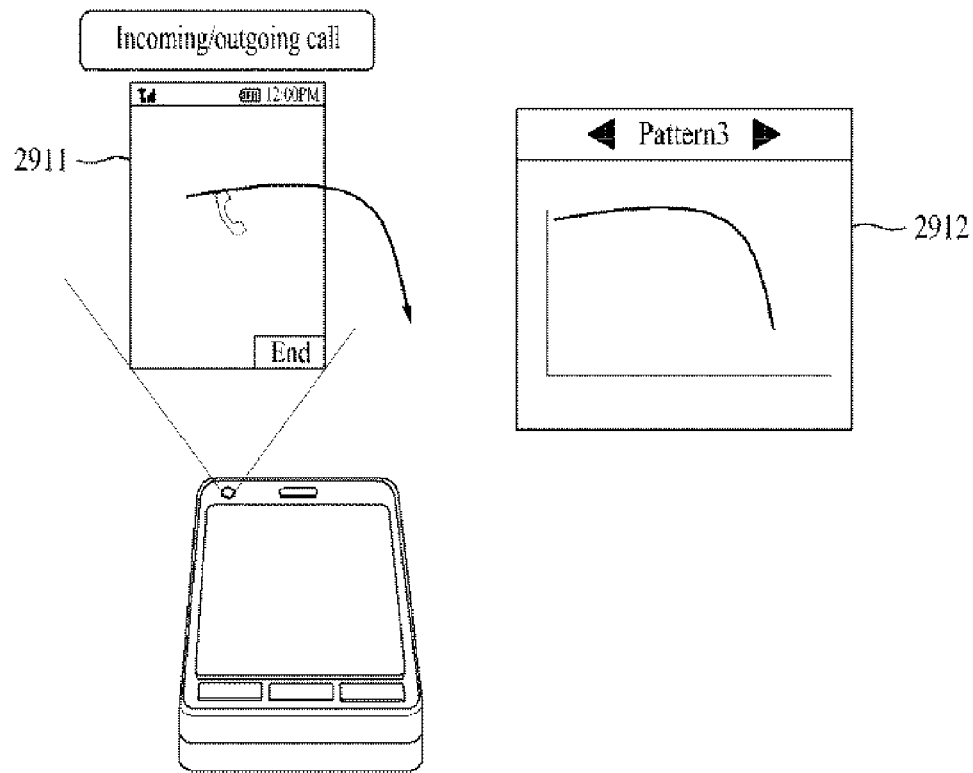
FIG. 29 is a diagram for one example of projecting a holography image in accordance with a holography pattern according to one embodiment of the present invention.

Referring to FIG. 29A, assume that an event of transmitting a call connection signal to an external device or an event of receiving a call connection signal from an external device is set as a trigger event.

If a call connection signal is transmitted to or received from an external device, the controller 180 may be able to project a holography image 2911 in accordance with a preset holography pattern 2912.

Figure 29B:
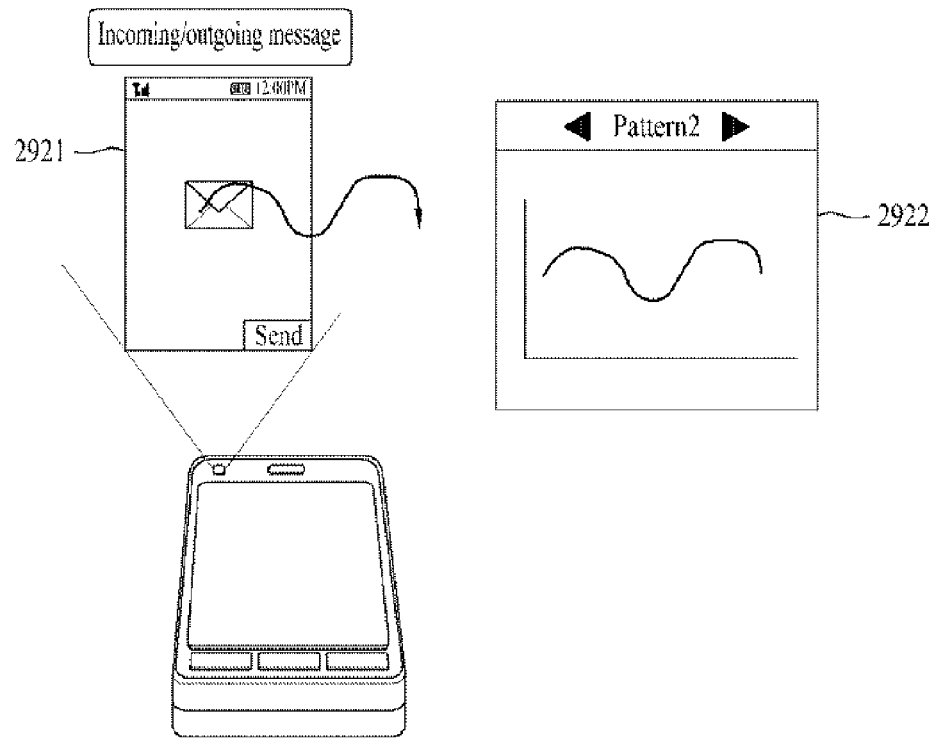

Referring to FIG. 29B, assume that an event of transmitting a message to an external device or an event of receiving a message from an external device is set as a trigger event.

If a message is transmitted to or received from an external device, the controller 180 may be able to project a holography image 2921 in accordance with a preset holography pattern 2922.

Meanwhile, an application, which is previously set to correspond to each trigger event, is activated in case that a corresponding trigger event occurs. A result of the activation of the application may be projected as a holography image in accordance with a holography pattern.

FIG. 30 is a diagram for one example of projecting a holography image in accordance with a holography pattern in case of a specific event occurrence according to one embodiment of the present invention.

Figure 30A:
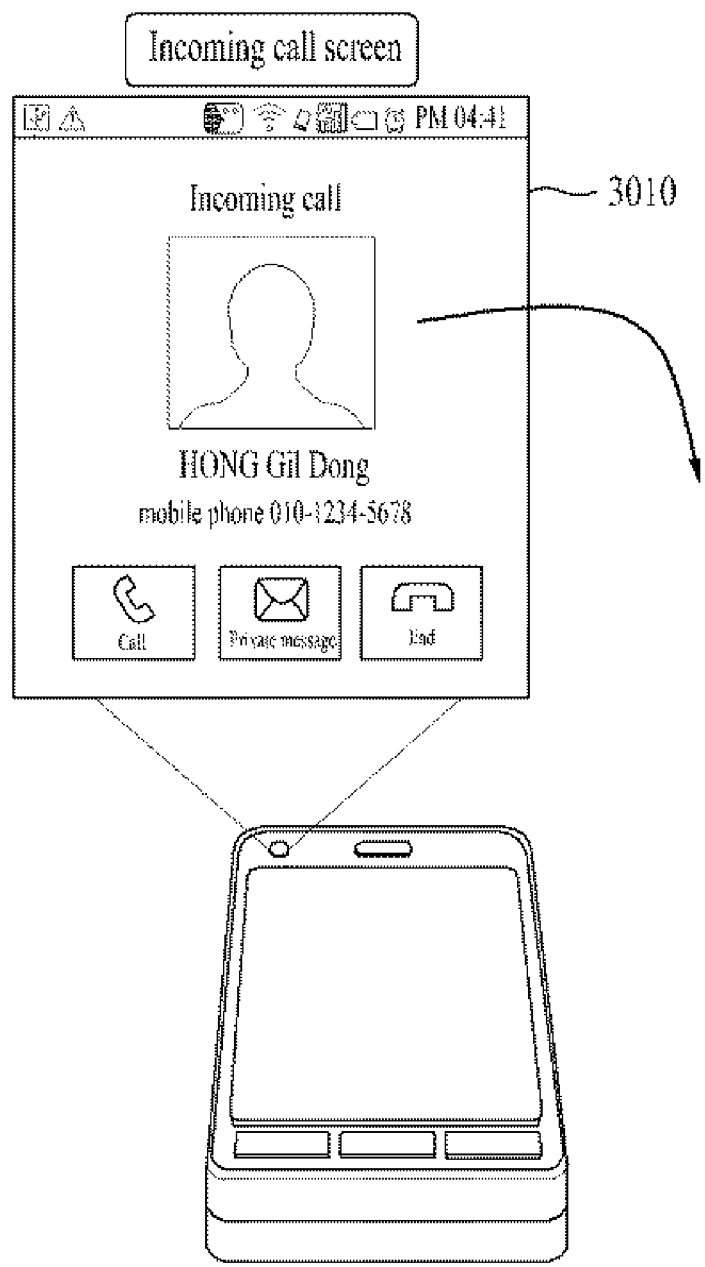
FIG. 30 is a diagram for one example of projecting a holography image in accordance with a holography pattern in case of a specific event occurrence according to one embodiment of the present invention.

Referring to FIG. 30A, assume that an event of receiving a call connection signal from an external device is set as a trigger event. If an application related to a communication is activated to correspond to the trigger event, assume that a corresponding result screen is projected as a holography image.

If a call connection signal is received from an external device, the controller 180 activates an application related to a communication, determines a result screen as a holography image 3010, and then projects the determined image in accordance with a preset holography pattern.

Figure 30B:
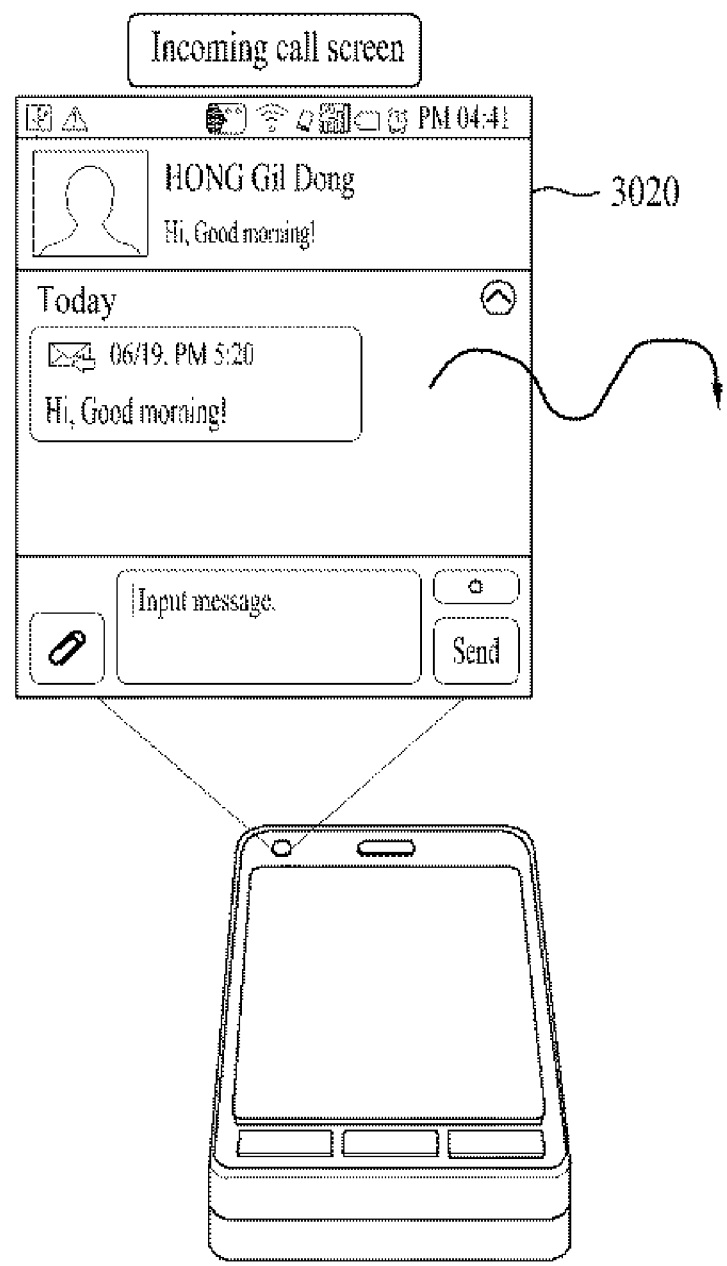

Referring to FIG. 30B, assume that an event of receiving a message from an external device is set as a trigger event. And, assume that the received message is set to be projected as a holography image to correspond to the trigger event.

If a message is received from an external device, the controller 180 determines the received message as a holography image 3020 and then projects the determined holography image in accordance with a preset holography pattern.

FIG. 31 is a diagram for one example of projecting a holography image in accordance with a holography pattern in case of an alarm event occurrence according to one embodiment of the present invention.

Figure 31A:
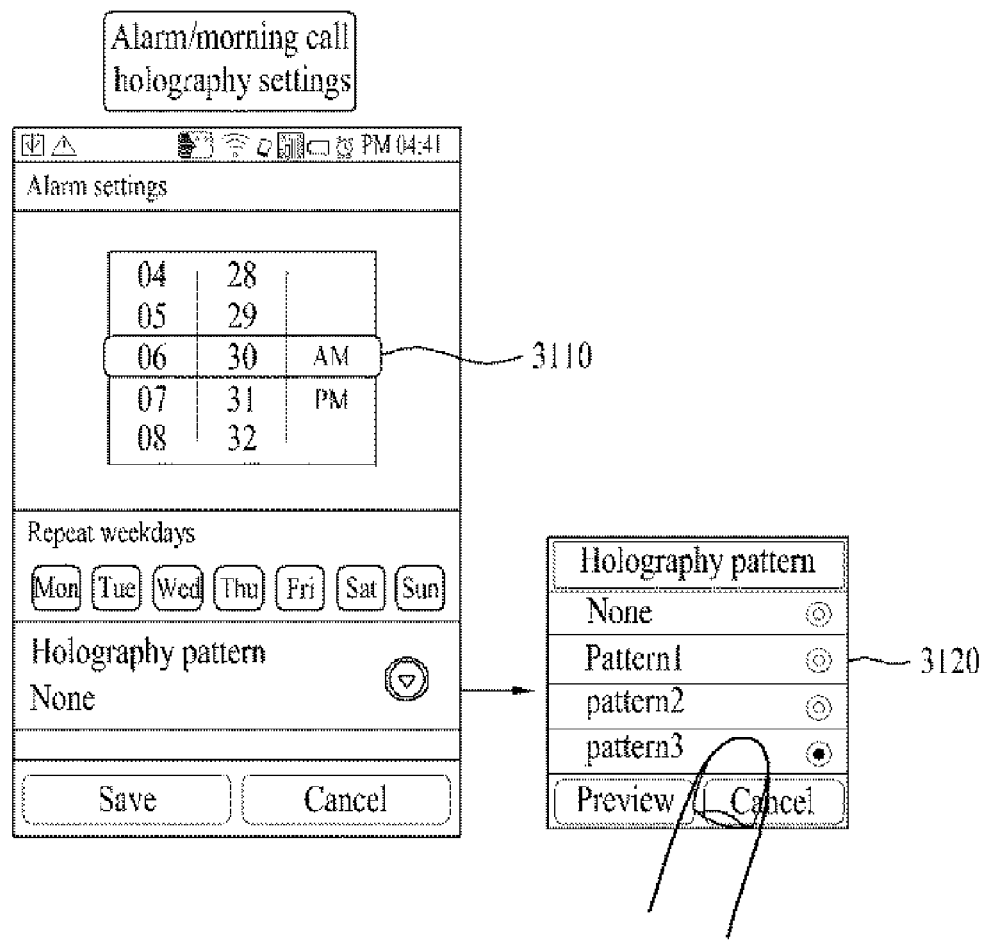
FIG. 31 is a diagram for one example of projecting a holography image in accordance with a holography pattern in case of an alarm event occurrence according to one embodiment of the present invention.

Referring to FIG. 31A, an alarm time 3110 of a trigger event is set to 06:30 and a holography pattern 3120 corresponding to the trigger event may be designated.

Figure 31B:
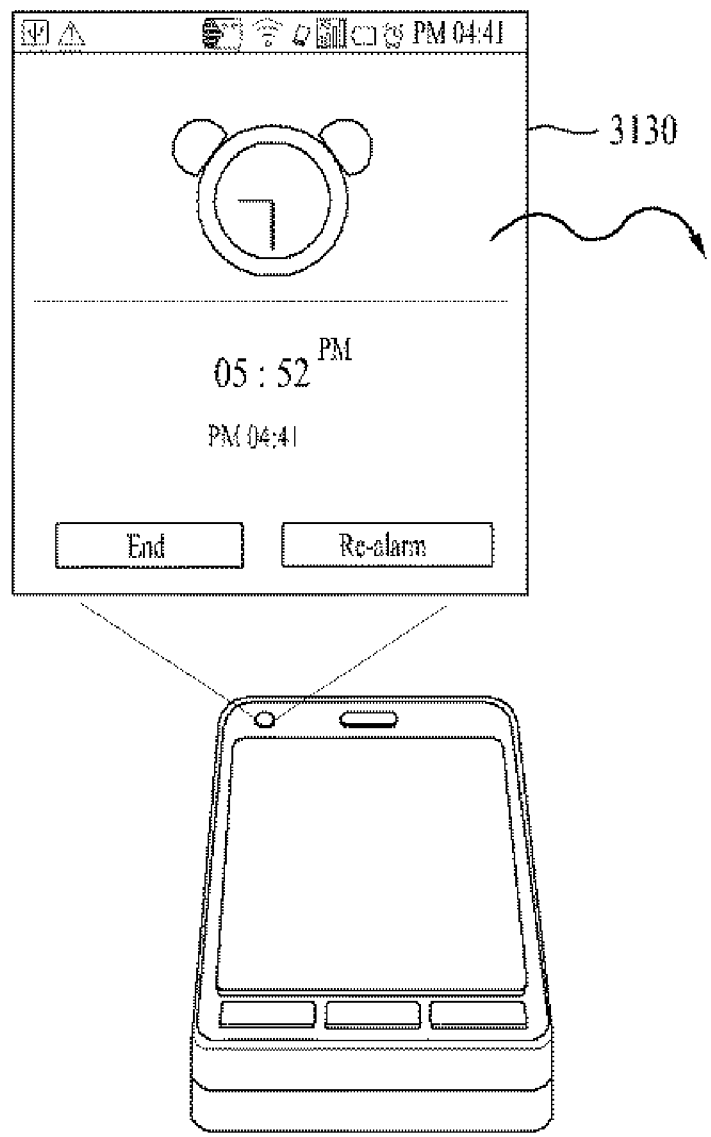

If the alarm time 3110 becomes 06:30, referring to FIG. 31B, the controller 180 projects a holography image 3130 externally in accordance with a designated pattern.

In doing so, like FIG. 30, if a specific application (e.g., weather application) is set in association with the alarm event, an activated result of the set application may be projected as a holography image.

FIG. 32 is a diagram for one example of projecting a holography image in accordance with a holography pattern in case of activating a weather application according to one embodiment of the present invention.

Figure 32A:
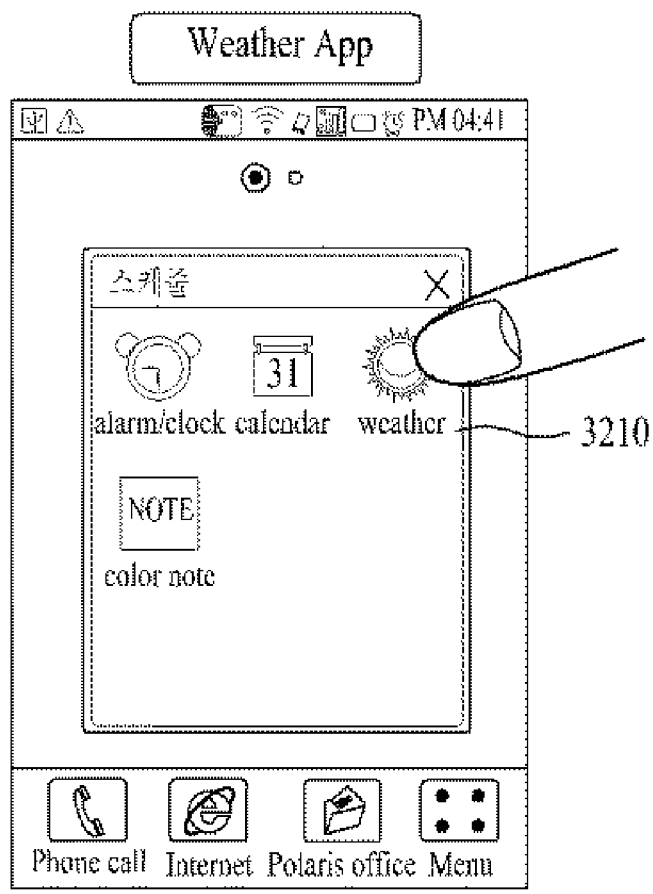
FIG. 32 is a diagram for one example of projecting a holography image in accordance with a holography pattern in case of activating a weather application according to one embodiment of the present invention.

Referring to FIG. 32A, a weather application 3210 may be activated as a trigger event in accordance with a user selection.

Figure 32B:
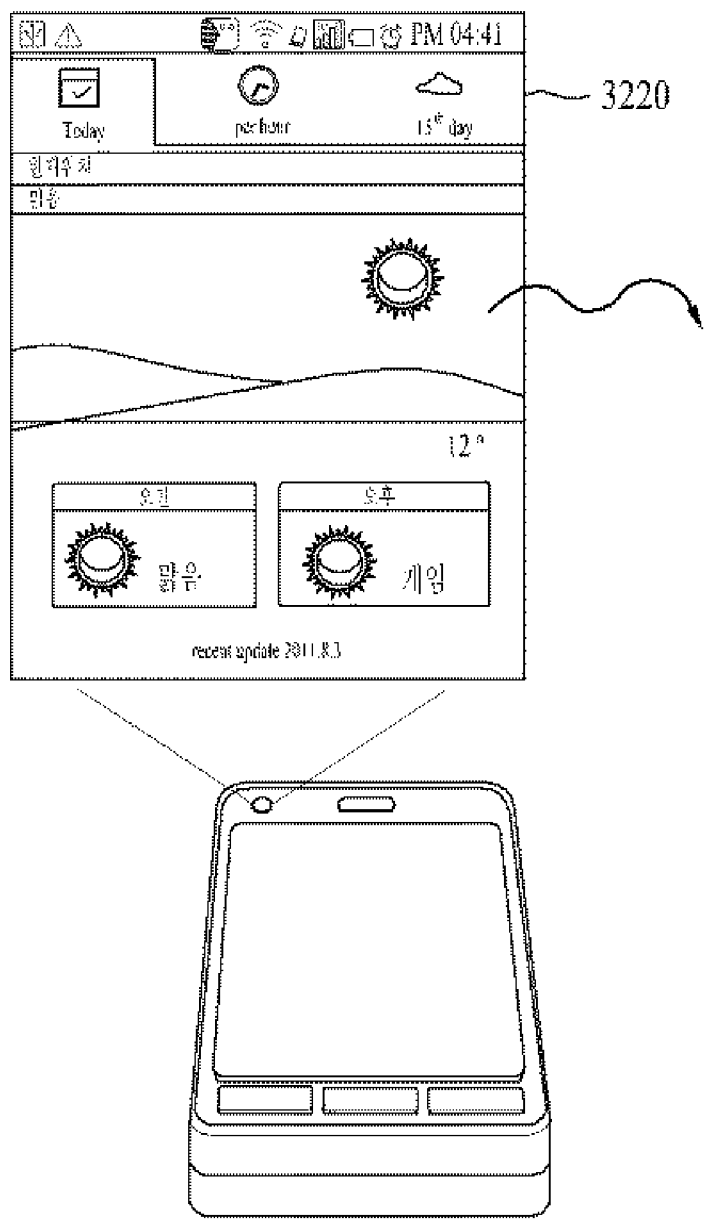

Referring to FIG. 32B, an activated result of the weather application 3210 may be projected as a holography image 3220 in accordance with a previously designated holography pattern.

FIG. 33 is a diagram for one example of projecting a holography image in accordance with a holography pattern in case of displaying a photo or video according to one embodiment of the present invention.

Figure 33A:
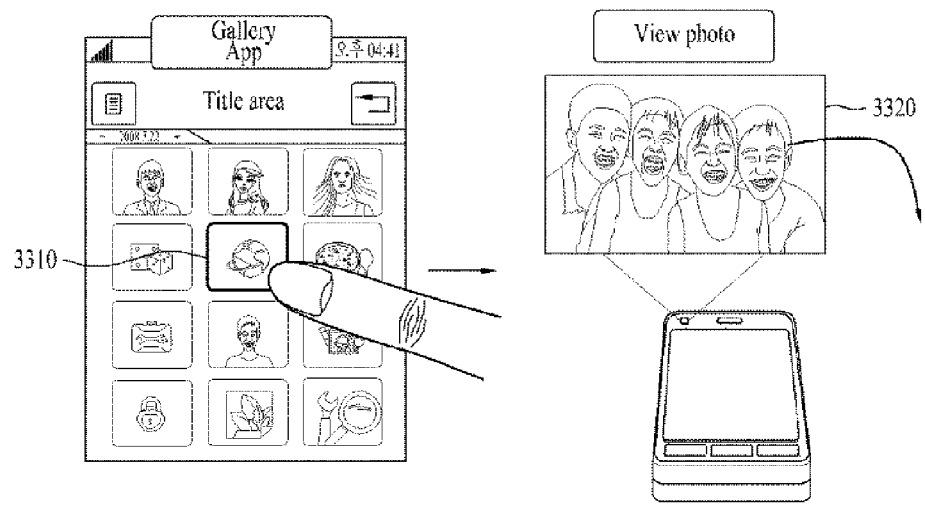
FIG. 33 is a diagram for one example of projecting a holography image in accordance with a holography pattern in case of displaying a photo or video according to one embodiment of the present invention.

Referring to FIG. 33A, a prescribed image 3310 may be activated as a trigger event in accordance with a user selection.

The selected image 3310 may be then projected as a holography image 3220 in accordance with a previously designated holography pattern.

Figure 33B:
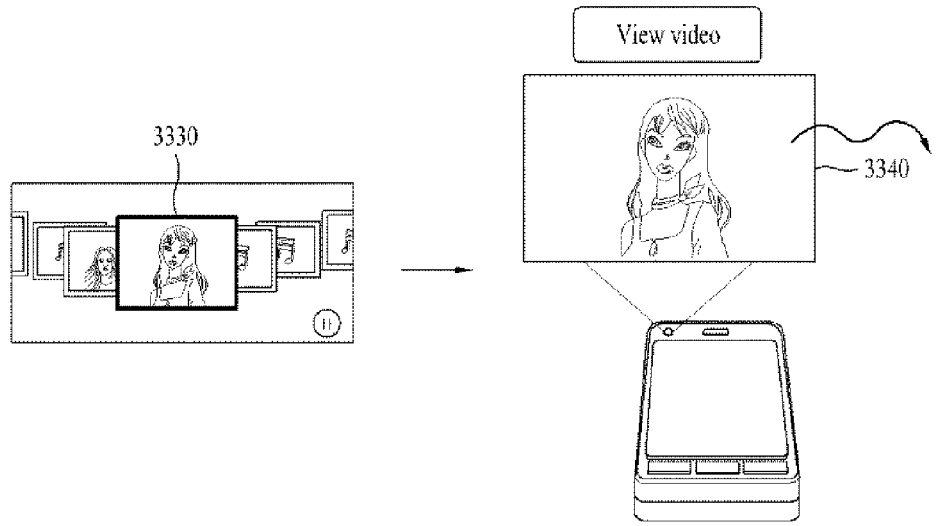

Referring to FIG. 33B, a prescribed video 3330 may be activated as a trigger event in accordance with a user selection.

The selected video 3330 may be then projected as a holography image 3340 in accordance with a previously designated holography pattern.

FIG. 34 is a diagram for one example of projecting a holography image in accordance with a holography pattern in case of activating a slide show of images according to one embodiment of the present invention.

Unlike FIG. 33A, when a plurality of images are activated as a slide show 3410 instead of one image, FIG. 34 shows one example of applying the present invention.

Figure 34A:
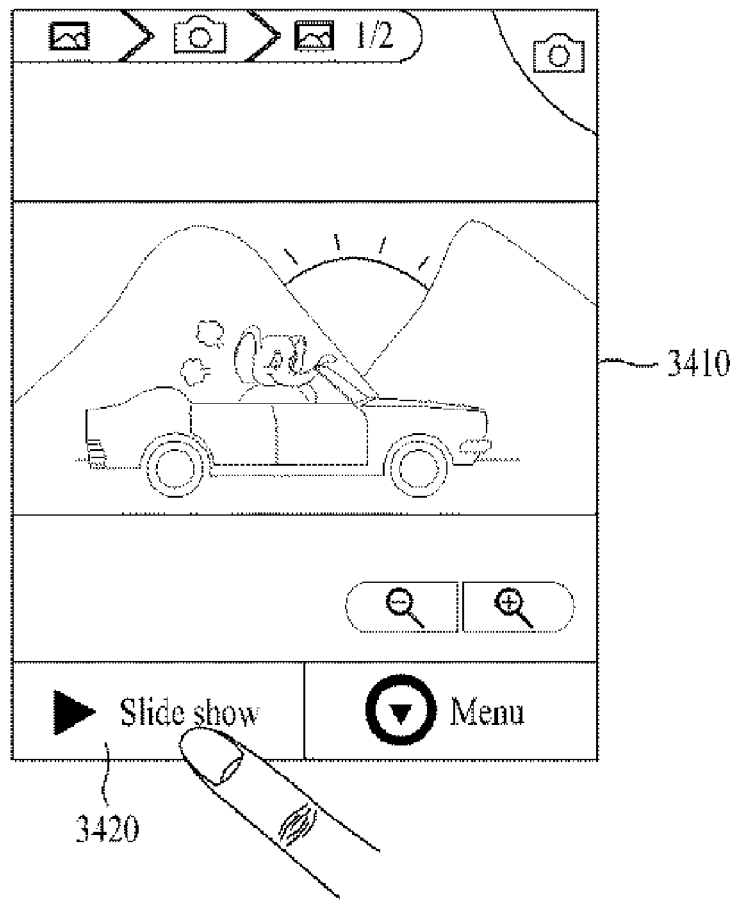
FIG. 34 is a diagram for one example of projecting a holography image in accordance with a holography pattern in case of activating a slide show of images according to one embodiment of the present invention.

Referring to FIG. 34A, a user may be able to select a slide show activating menu 3420 through a prescribed manipulation.

If the slide show activating menu 3420 is selected, the controller 180 checks a holography pattern 3430 of a previously designated rotation.

Figure 34B:
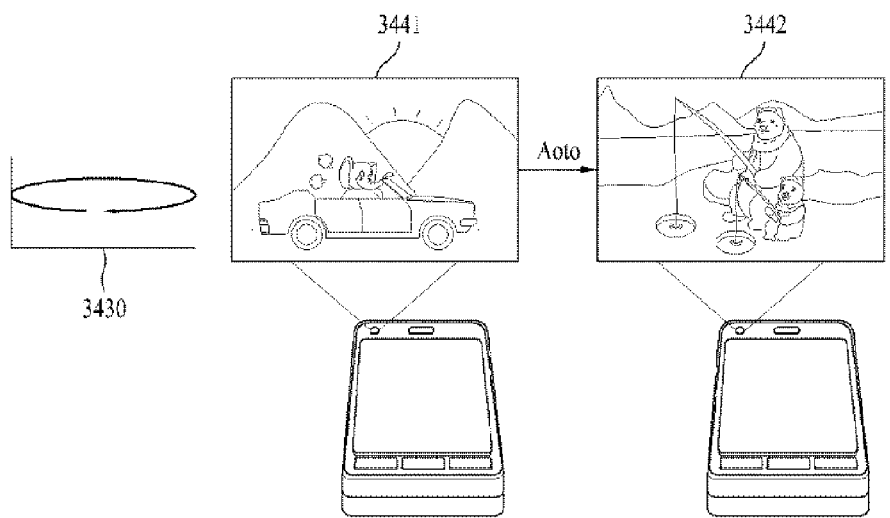

Referring to FIG. 34B, each image is projected as a holography image 3441 and 3442 in a manner of being changed in accordance with the holography pattern 3430 designated with a prescribed time interval in-between.

Therefore, a user may conveniently view a plurality of images in accordance with a previously designated holography pattern.

Figure 35:
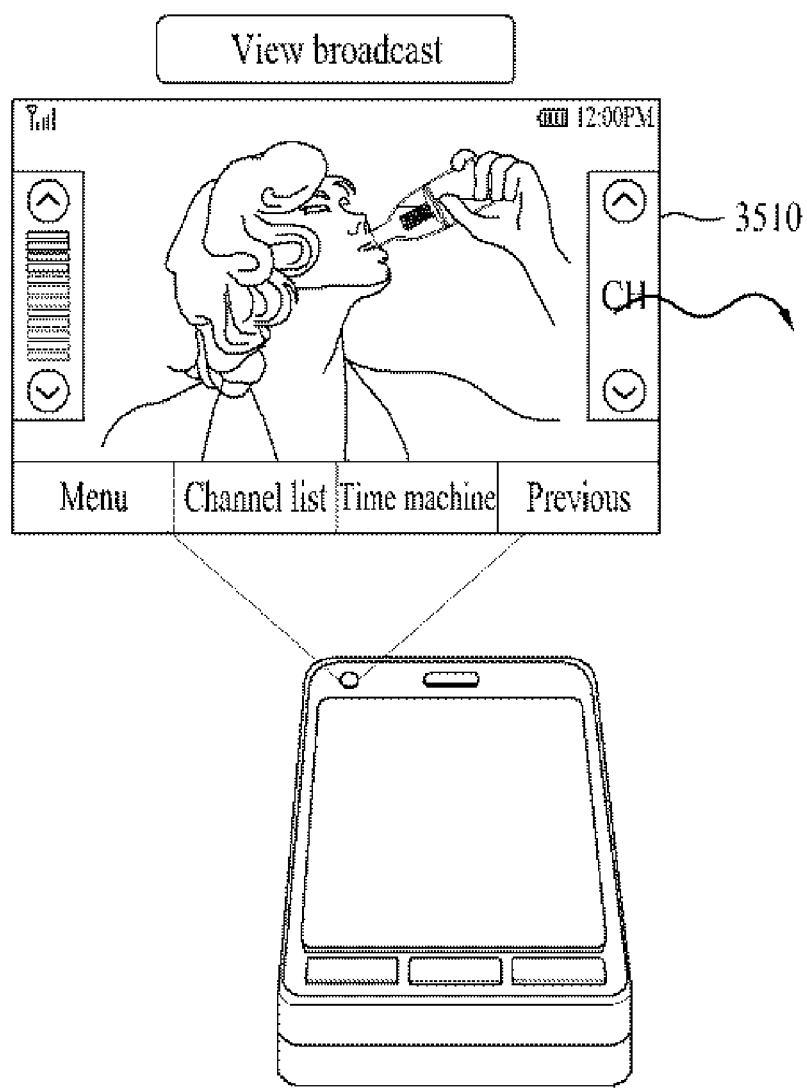
FIG. 35 is a diagram for one example of projecting a holography image by giving a holography pattern in accordance with a broadcast channel according to one embodiment of the present invention.

FIG. 35 is a diagram for one example of projecting a holography image by giving a holography pattern in accordance with a broadcast channel according to one embodiment of the present invention.

In FIG. 35, an activation of a broadcast application is a trigger event and a holography image is projected in a manner of applying a holography pattern differing in accordance with a type of an activated broadcast channel.

Referring to FIG. 35, a user is able to watch various broadcast channels via a terminal using a broadcast channel switching menu 3510.

In doing so, a different holography pattern may be set in accordance with a type of a broadcast channel watched by a user and a corresponding holography image is projected.

Therefore, a user is facilitated identify a currently-watched broadcast channel using the projected holography pattern.

Figure 36:
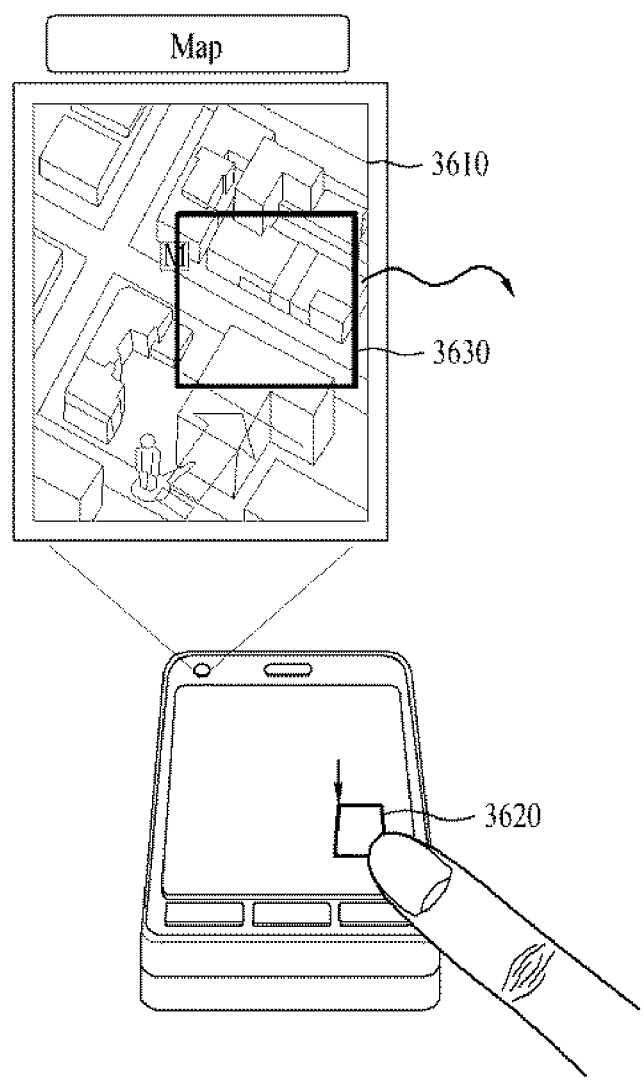
FIG. 36 is a diagram for one example of projecting a holography image by giving a holography pattern to a specific region on a map according to one embodiment of the present invention.

FIG. 36 is a diagram for one example of projecting a holography image by giving a holography pattern to a specific region on a map according to one embodiment of the present invention.

While an activated result of a map application is being projected as a holography image, FIG. 36 shows one example of applying a separate holography pattern in accordance with a user selection.

Referring to FIG. 36, a user activates a map application and an activated result screen may be displayed as a holography image 3610.

In doing so, a user may be able to select a partial region 3620 of a whole region of a displayed map via a touchscreen of a terminal.

Correspondingly, the controller 180 may project a region 3630, which corresponds to the region selected from the touchscreen by the user, among the whole region 3610 of the projected holography image as a separate holography image in accordance with a preset holography pattern.

FIG. 37 is a diagram for one example of capturing and saving a projected image in accordance with a holography pattern according to one embodiment of the present invention.

Figure 37A:
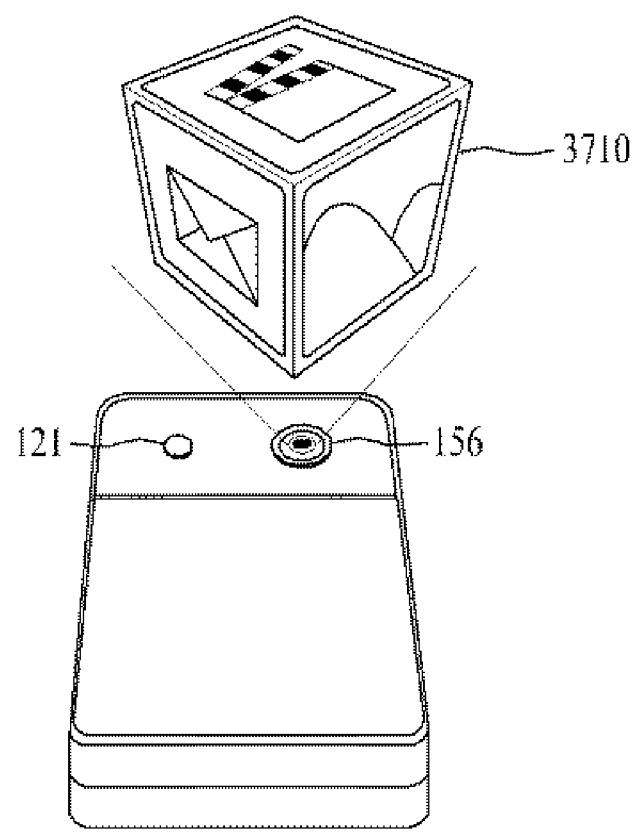
FIG. 37 is a diagram for one example of capturing and saving a projected image in accordance with a holography pattern according to one embodiment of the present invention.

Referring to FIG. 37A, a camera 121 and a holography module 156 may be installed in a terminal in a manner of facing the same direction.

If a holography image 3710 is projected via the holography module 156, the projected image is captured as a photo or video content via the camera 121 and may be then saved in the memory 160.

Figure 37B:
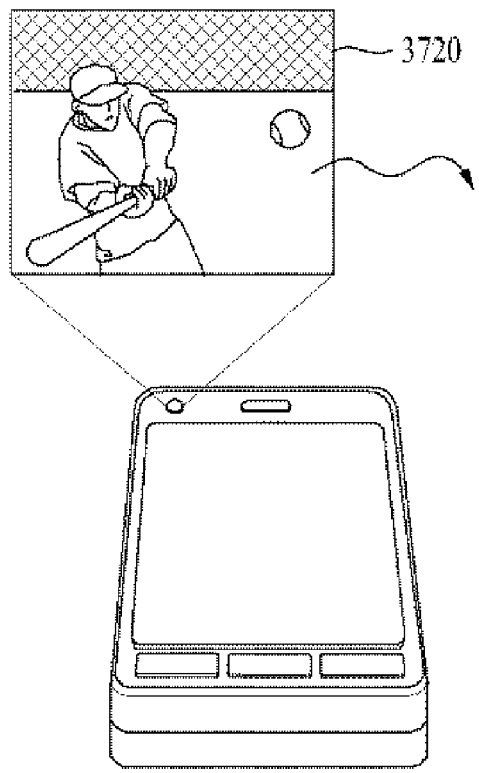

Referring to FIG. 37B, the image saved in the memory may be projected as a holography image 3720 again.

Therefore, a user is facilitated to capture and save a projected holography image.

Meanwhile, according to one embodiment of the present invention, a method of performing a communication with a specific object by applying a holography pattern may be provided.

In particular, a holography pattern attribute set for a terminal may be transmitted to a counterpart together with a call connection attempt signal or a message.

Moreover, a user may be able to transmit a holography pattern attribute in the course of a voice or video call communication with a counterpart.

And, a holography pattern attribute set for a terminal may be shared with other external devices via the wireless communication unit 110.

This is described in detail with reference to FIGS. 38 to 41 as follows.

FIG. 38 is a diagram for one example of transmitting a holography pattern attribute together with a call connection attempt signal according to one embodiment of the present invention.

In FIG. 38, assume that a call connection to a character object 'HONG Gil Dong' is attempted. Assume that a holography pattern is set for the character object 'HONG Gil Dong'. And, assume that an indicator is displayed as a visual effect to indicate the setting of the holography pattern.

Figure 38A:
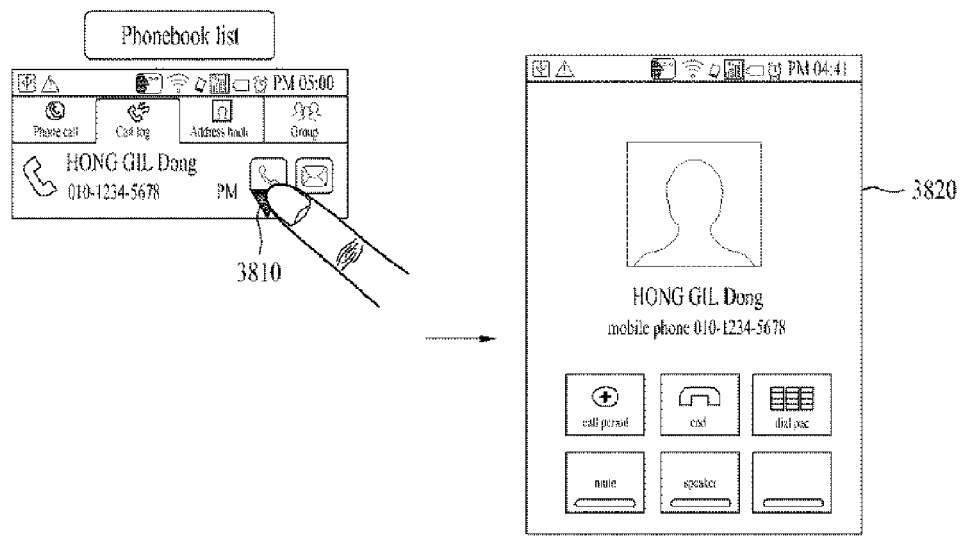
FIG. 38 is a diagram for one example of transmitting a holography pattern attribute together with a call connection attempt signal according to one embodiment of the present invention.

Referring to FIG. 38A, while a user performs a call connection attempt on a character object 'HONG Gil Dong', the user may select an indicator 3810 to designate that a holography pattern 3820 attribute is transmitted together.

Figure 38B:
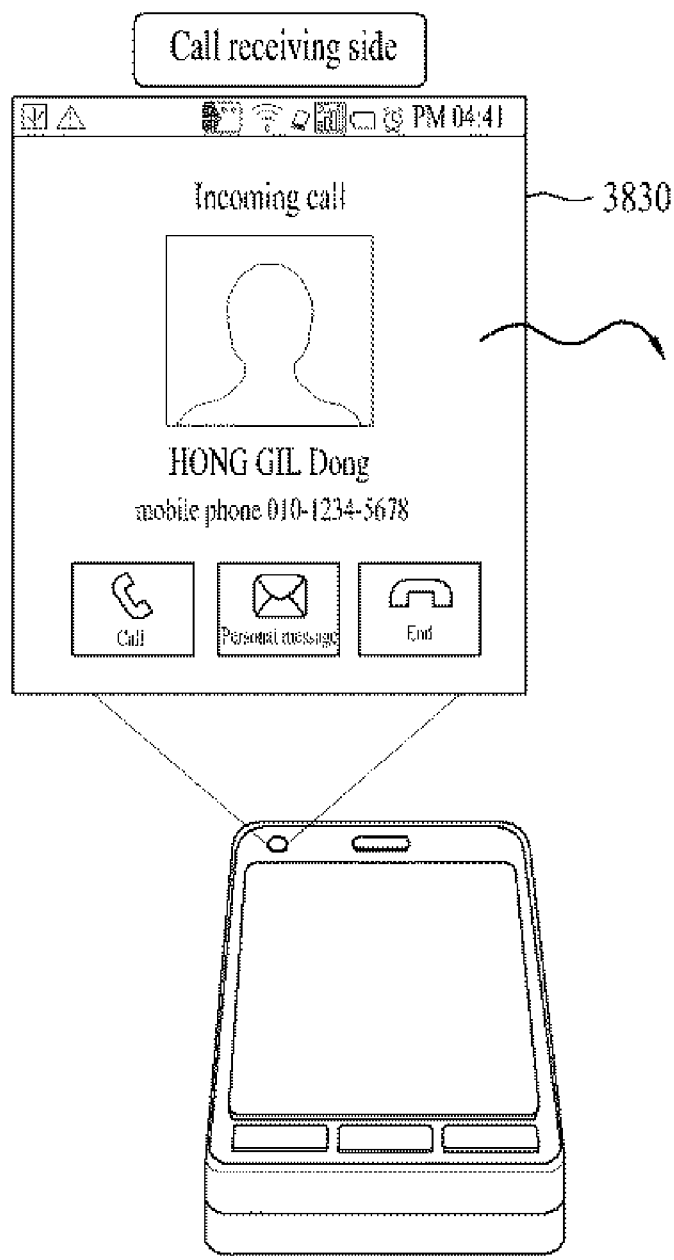

Meanwhile, referring to FIG. 38B, a counterpart terminal receives the call connection attempt from the terminal and then displays a holography image 3830 in accordance with a holography pattern set up by the calling side.

Therefore, a user may be able to transmit a holography pattern attribute to an external device together with a call connection signal. In the above description, a user is assumed as a calling side. Yet, in case that a user becomes a receiving side and receives a call connection signal having a holography pattern attribute set therein, it is apparent that a holography image may be projected in accordance with a holography pattern set up by a counterpart.

FIG. 39 is a diagram for one example of transmitting a holography pattern attribute together with a message according to one embodiment of the present invention.

In FIG. 39, assume that a message is sent to a character object 'HONG Gil Dong'.

Figure 39A:
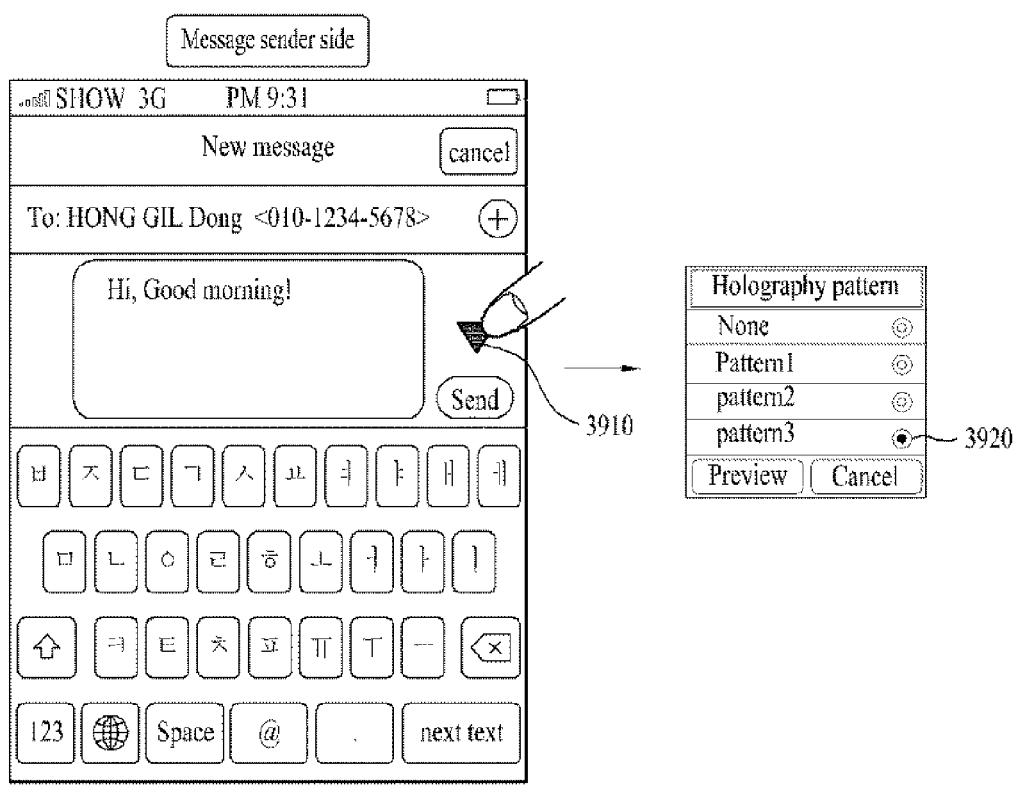
FIG. 39 is a diagram for one example of transmitting a holography pattern attribute together with a message according to one embodiment of the present invention.

Referring to FIG. 39A, while a user sends a message to a character object 'HONG Gil Dong', the user may select an indicator 3910 to designate a holography pattern 3920 to transmit together with the message.

Figure 39B:
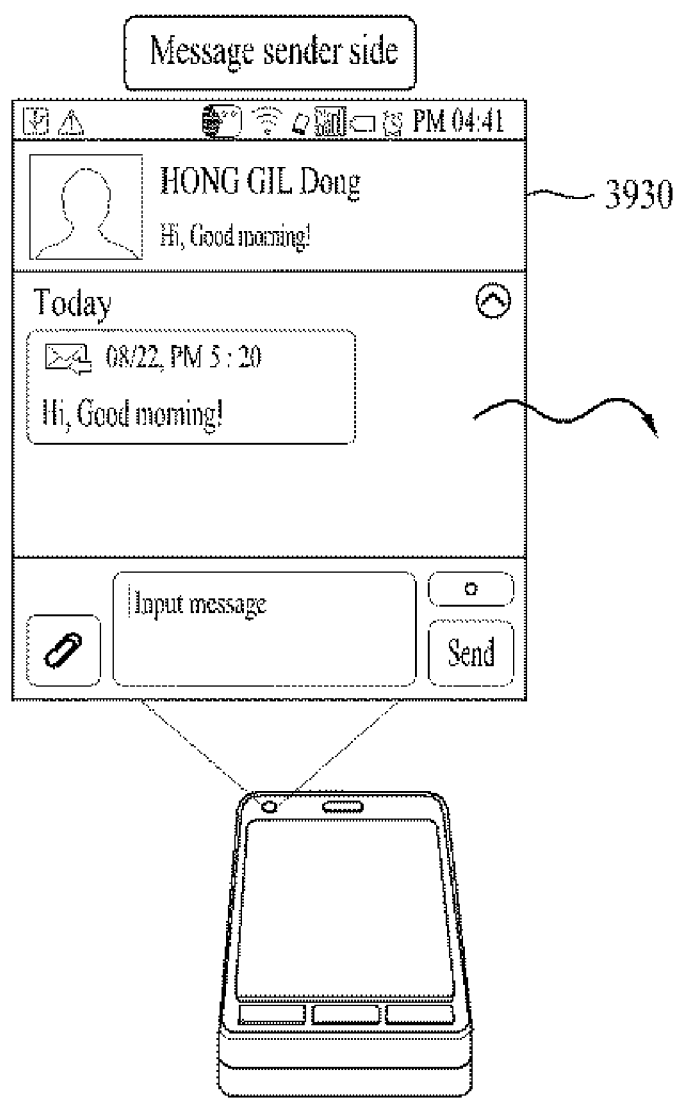

Referring to FIG. 39B, a counterpart terminal receives the message from the user terminal and then projects the message as a holography image 3930 in accordance with a holography pattern set up by the calling side.

Therefore, a user may be able to transmit a holography pattern attribute to an external device together with a message. In the above description, a user is assumed as a calling side. Yet, in case that a user becomes a receiving side and receives a message having a holography pattern attribute set therein, a holography image may be projected in accordance with a holography pattern set up by a counterpart.

FIG. 40 is a diagram for one example of transmitting a holography pattern attribute in the course of a phone call according to one embodiment of the present invention.

Figure 40A:
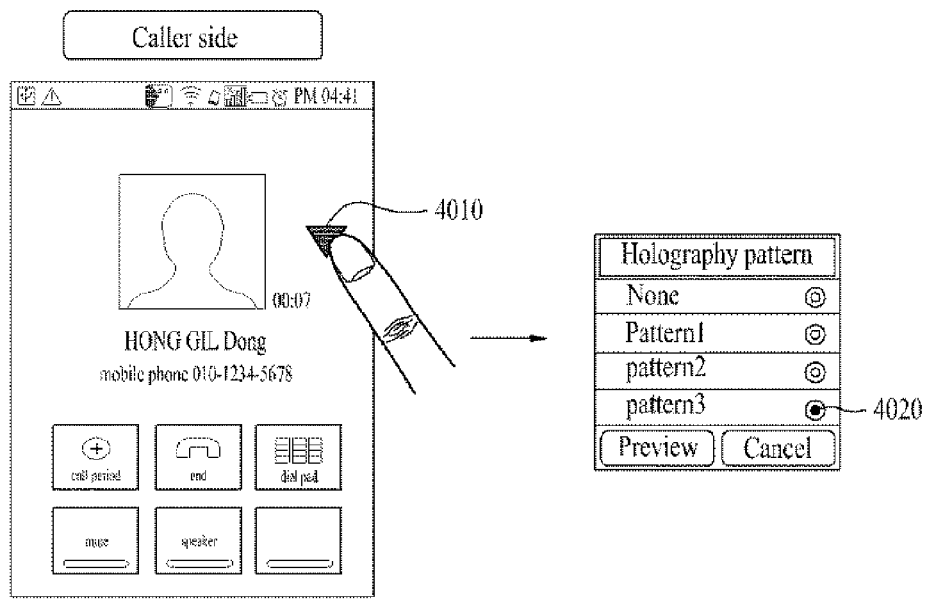
FIG. 40 is a diagram for one example of transmitting a holography pattern attribute in the course of a phone call according to one embodiment of the present invention.

Referring to FIG. 40A, a user selects a holography pattern indicator 4010 in the course of continuing a voice call and may be then able to direct a holography pattern 4020 attribute to be transmitted to a counterpart.

Thus, the user may control a selected holography pattern 4020 to be transmitted to a counterpart device.

Figure 40B:
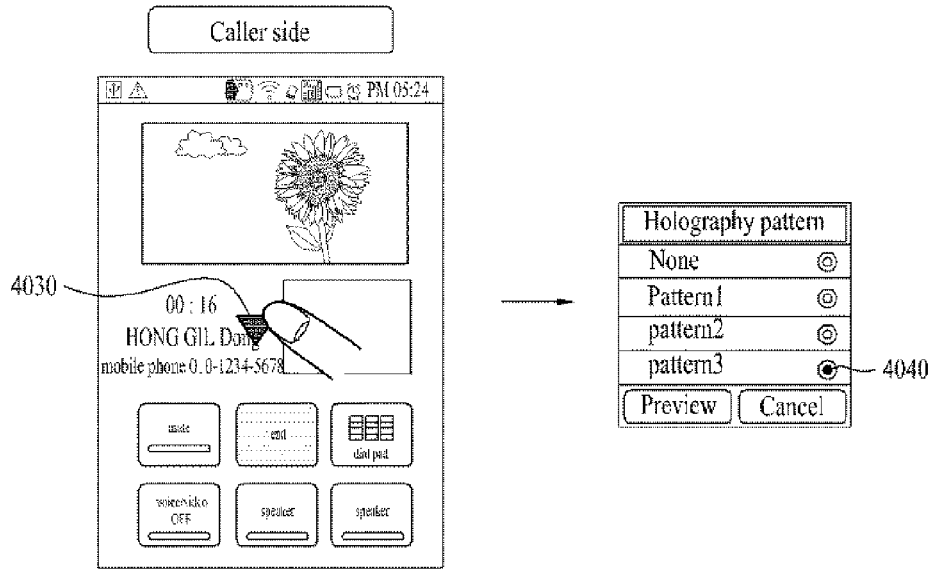

Referring to FIG. 40B, a holography pattern may be transmitted to a counterpart in the course of continuing a video call as well as a voice call.

In particular, a user selects a holography pattern indicator 4030 in the course of continuing a video call and may control a selected holography pattern 4040 to be transmitted to a counterpart device.

Figure 40C:
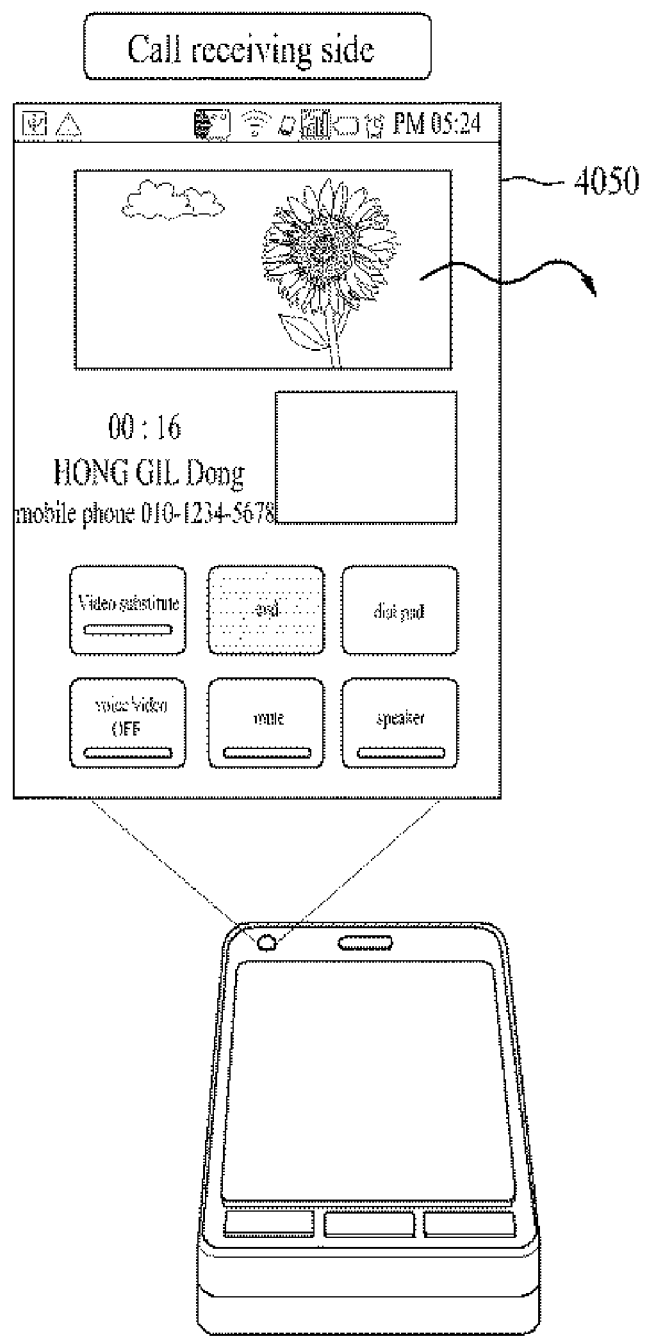

Thereafter, referring to FIG. 40C, a counterpart terminal receives the holography pattern from the terminal and then displays a holography image 4050 in accordance with the holography pattern set by a transmitting side.

Therefore, a user may be able to transmit a holography pattern attribute to an external device in the course of continuing a call. In the above description, a user is assumed as a transmitting side. Yet, in case that the user becomes a receiving side and receives a holography pattern attribute, a holography image may be projected in accordance with a holography pattern set up by a counterpart.

Figure 41:
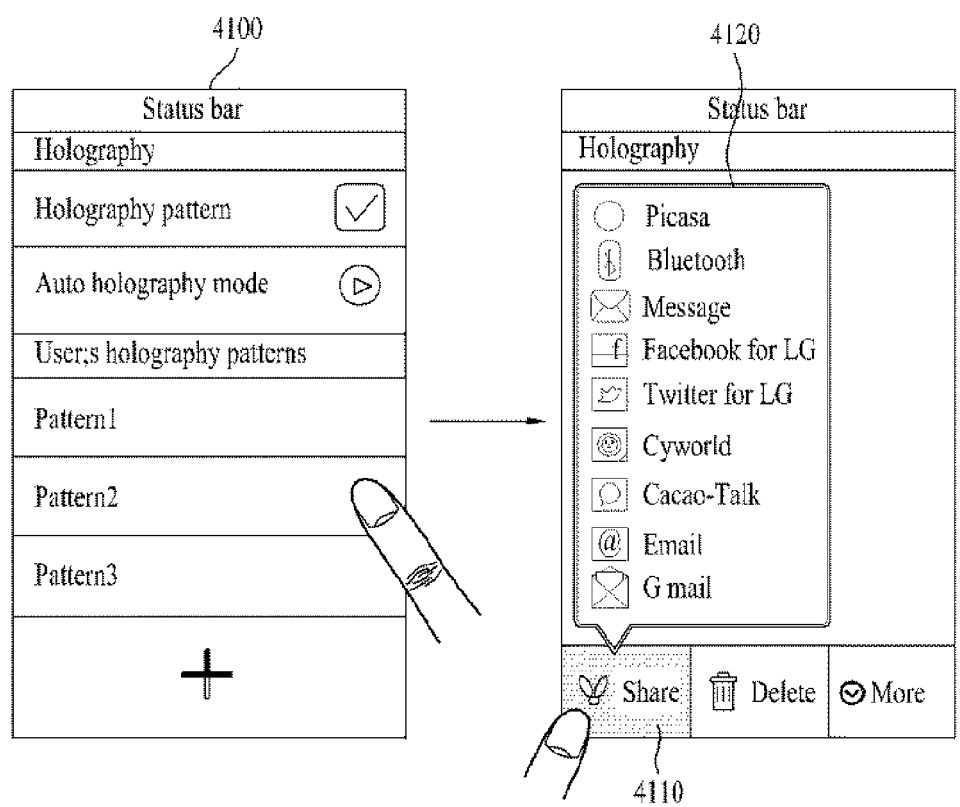
FIG. 41 is a diagram for one example of sharing a holography pattern attribute according to one embodiment of the present invention.

FIG. 41 is a diagram for one example of sharing a holography pattern attribute according to one embodiment of the present invention.

Referring to FIG. 41, a user may be able to share a holography pattern attribute with various external devices using a holography setting menu 4100 and a share menu 4110.

In particular, the user touches to select the share menu 4110. And, the controller 180 may display a prescribed list 4120 of a plurality of external devices, with which data can be shared via the wireless communication unit 110, to correspond to the selected share menu 4110.

The user selects at least one external device from the list 4120 and then shares various holography pattern attributes, which are set for the terminal, with the selected at least one external device.

Meanwhile, according to the present invention, the above-described methods can be implemented in a program recorded medium as computer-readable codes. Computer-readable media include ROM, RAM, CD-ROM, magnetic tapes, floppy discs, optical data storage devices, and the like for example and also include carrier-wave type implementations (e.g., transmission via Internet).

The aforementioned embodiments for a mobile terminal including a display unit configured to display a stereoscopic image are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention may be applicable to such a system as a terminal, implemented as a multimedia player provided with composite functions such as photographing of photos or videos, playback of music or video files, game play, broadcast reception and the like for example. In particular the present invention may be applicable to a wireless mobile communication apparatus used for a cellular system.

The invention claimed is:
1. A mobile terminal comprising:
 a wireless communication unit;
 a holography storing medium configured to record an interference pattern generated by interference of light;
 a holography output module configured to output a holography image attributed to a diffraction between the light applied to the holography storing medium and the interference pattern;
 a user input unit configured to designate at least one holography pattern corresponding to each of a plurality of keywords; and
 a controller configured to:
 control the holography output module to output the holography image in accordance with at least one previously set holography pattern in response to an event occurring on the mobile terminal, and
if at least one of the plurality of the keywords is included in message information received via the wireless communication unit or caller information in a call connection attempt received via the wireless communication unit, control the holography image to be output in accordance with the holography pattern corresponding to the included keyword,
wherein the at least one holography pattern is automatically determined in accordance with a change of a preset condition, and the preset condition varies in accordance with time.

2. The mobile terminal of claim 1, wherein the at least one holography pattern is further determined by at least one of a distance difference between the holography output module and the output holography image and a shape of the output holography image, and
wherein each of the distance difference and the shape of the output holography image varies in accordance with time.

3. The mobile terminal of claim 1, further comprising:
a display unit,
wherein if the event occurs in association with a user-designated object to be displayed as the holography image, the controller is further configured to control the holography output module to output the object as the holography image.

4. The mobile terminal of claim 3, wherein the controller is further configured to display a visual effect on a prescribed region of the display unit to indicate that the previously designated object is output as the holography image.

5. The mobile terminal of claim 1, wherein the event includes at least one of a location event, a time event, an alarm event, a touch input event of a specific pattern, a reception or transmission event of a call connection signal, a reception or transmission event of a message, a preset application activating event, and a preset content activating event.

6. The mobile terminal of claim 1, further comprising:
a display unit,
wherein if a partial region of the display unit is designated as a first region for a holography output via the user input unit, the controller is further configured to control the holography output module to output the first region as the holography image.

7. The mobile terminal of claim 1,
wherein if at least one of a plurality of contents is designated as a first content for a holography output via the user input unit, the controller is further configured to control the holography output module to output the first content as the holography image.

8. The mobile terminal of claim 1, wherein the controller is further configured to automatically determine the at least one holography pattern in accordance with either a frequency change of sound externally output via an output unit or a screen brightness change.

9. The mobile terminal of claim 1, wherein the controller is further configured to:
receive information on a holography pattern from an external device via the wireless communication unit together with a call connection signal or a message, and
control the holography output module to output the holography image in accordance with the received holography pattern.

10. The mobile terminal of claim 1,
wherein the controller is further configured to:
receive a call connection signal or transmit a message to an external device via the wireless communication unit, and
transmit information on the at least one holography pattern together with the call connection signal or the message to the external device via the wireless communication unit.

11. The mobile terminal of claim 1, further comprising:
a display unit;
wherein the controller is further configured to:
establish a data path to a plurality of external devices via the wireless communication unit,
display a first list of a plurality of the external devices on the display unit, and
if at least one external device is selected from the first list via the user input unit, transmit or receive information on the at least one holography pattern from the selected external device via the established data path.

12. A mobile terminal comprising:
a holography storing medium configured to record an interference pattern generated by interference of light;
a holography output module configured to output a holography image attributed to a diffraction between the light applied to the holography storing medium and the interference pattern; and
a controller configured to control the holography output image to output the holography image in accordance with at least one previously set holography pattern in response to an event occurring on the mobile terminal,
wherein the at least one holography pattern is determined by at least one selected from the group consisting of shift, rotation, color change, size change and flickering of the output holography image, and
wherein each of the shift, the rotation, the color change, the size change and the flickering varies in accordance with time.

13. A mobile terminal comprising:
a holography storing medium configured to record an interference pattern generated by interference of light;
a holography output module configured to output a holography image attributed to a diffraction between the light applied to the holography storing medium and the interference pattern; and
a controller configured to control the holography output module to output the holography image in accordance with at least one previously set holography pattern in response to an event occurring on the mobile terminal,
wherein the at least one holography pattern is determined by at least one of a distance difference between the holography output module and the output holography image and a shape of the output holography image,
wherein each of the distance difference and the shape of the output holography image varies in accordance with time, and
wherein the at least one holography pattern applies to a preset partial region of the output holography image.

14. A mobile terminal comprising:
a wireless communication unit;
a holography storing medium configured to record an interference pattern generated by interference of light;
a holography output module configured to output a holography image attributed to a diffraction between the light applied to the holography storing medium and the interference pattern; and a controller configured to control the holography output module to output the holography image in accordance with at least one previously set holography pattern in response to an event occurring on the mobile terminal, and automatically determine the at least one holography pattern to be automatically determined in accordance with one of a change of a preset condition, a transmission complete ratio variation of data and message transmitted to an external device via the wireless communication unit, wherein the preset condition varies in accordance with time.

15. A method of controlling a mobile terminal, the method comprising:

recording an interference pattern generated by interference of light in a holography storing medium;

outputting a holography image attributed to a diffraction between the light applied to the holography storing medium and the interference pattern;

designating at least one holography pattern corresponding to each of a plurality of keywords;

outputting the holography image in accordance with at least one previously set holography pattern in response to an event occurring on the mobile terminal; and if at least one of the plurality of the keywords is included in message information received via a wireless communication unit or caller information in a call connection attempt received via the wireless communication unit, outputting the holography image in accordance with the holography pattern corresponding to the included keyword, wherein the at least one holography pattern is automatically determined in accordance with a change of a preset condition, and the preset condition varies in accordance with time.

16. The method of claim 15, wherein the at least one holography pattern is further determined by at least one of a distance difference between a holography output module and the output holography image and a shape of the output holography image, and wherein each of the distance difference and the shape of the output holography image varies in accordance with time.

17. The method of claim 15, further comprising:

designating at least one of a plurality of objects via a user input unit, wherein if the at least one event among a plurality of the trigger events occurs in association with an object previously designated to be displayed as the holography image, the object is output as the holography image.

* * * * *